(12) United States Patent
Ishihara et al.

(10) Patent No.: US 12,162,806 B2
(45) Date of Patent: Dec. 10, 2024

(54) MANUFACTURING METHOD FOR DISPERSION BODY AND MANUFACTURING METHOD FOR CERAMIC SINTERED BODY

(71) Applicants: THE SCHOOL CORPORATION KANSAI UNIVERSITY, Suita (JP); DENSO CORPORATION, Kariya (JP)

(72) Inventors: Mikio Ishihara, Kariya (JP); Kouhei Suzuki, Kariya (JP); Hideki Yamamoto, Suita (JP)

(73) Assignees: THE SCHOOL CORPORATION KANSAI UNIVERSITY, Osaka (JP); DENSO CORPORATION, Kariya (JP)

( * ) Notice: Subject to any disclaimer, the term of this patent is extended or adjusted under 35 U.S.C. 154(b) by 281 days.

(21) Appl. No.: 17/896,127

(22) Filed: Aug. 26, 2022

(65) Prior Publication Data

US 2022/0402829 A1 Dec. 22, 2022

Related U.S. Application Data

(63) Continuation of application No. PCT/JP2021/007395, filed on Feb. 26, 2021.

(30) Foreign Application Priority Data

Feb. 28, 2020 (JP) ................. 2020-034361

(51) Int. Cl.
| | | |
|---|---|---|
| C04B 38/00 | (2006.01) | |
| C04B 35/117 | (2006.01) | |
| C04B 35/14 | (2006.01) | |
| C04B 35/20 | (2006.01) | |
| C04B 35/626 | (2006.01) | |

(Continued)

(52) U.S. Cl.
CPC ........ *C04B 38/0038* (2013.01); *C04B 35/117* (2013.01); *C04B 35/14* (2013.01); *C04B 35/20* (2013.01); *C04B 35/6264* (2013.01); *C04B 35/6303* (2013.01); *C04B 38/0006* (2013.01); *B28B 3/20* (2013.01); *B28B 2003/203* (2013.01); *C04B 2235/3217* (2013.01); *C04B 2235/3418* (2013.01); *C04B 2235/3445* (2013.01)

(58) Field of Classification Search
None
See application file for complete search history.

(56) References Cited

U.S. PATENT DOCUMENTS 6,241,940 B1 * 6/2001 Beall ................ C04B 35/195
264/630
6,368,992 B1 4/2002 Beall et al.

FOREIGN PATENT DOCUMENTS

| JP | 2015 113 367 A | * | 6/2015 |
| JP | WO2019012917 A1 | * | 5/2020 |
| WO | 2019012917 A1 | | 1/2019 |

* cited by examiner

*Primary Examiner* — Mohammad M Ameen
(74) *Attorney, Agent, or Firm* — Nixon & Vanderhye P.C.

(57) ABSTRACT

In a manufacturing method for manufacturing a dispersion body, a plurality of types of solid particles, water, and a liquid other than water are mixed. The solid particles and the liquid are selected such that Hansen spheres of at least two types of the solid particles and a Hansen sphere of at least one type of the liquid mutually overlap, and a Hansen solubility parameter distance to water of at least one type of the solid particles of which the Hansen spheres overlap that of the liquid is greatest among all solid particles used in manufacturing of the dispersion body, and used to manufacture the dispersion body.

14 Claims, 25 Drawing Sheets

(51) Int. Cl.
*C04B 35/63* (2006.01)
*B28B 3/20* (2006.01)

FIG. 4(a) COMPARATIVE EXAMPLE 1

COMPARATIVE EXAMPLE 2

COMPARATIVE EXAMPLE 3

COMPARATIVE EXAMPLE 4

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

COMPARATIVE EXAMPLE 5

COMPARATIVE EXAMPLE 6

COMPARATIVE EXAMPLE 7

COMPARATIVE EXAMPLE 8

EXAMPLE 12

EXAMPLE 13

EXAMPLE 14

EXAMPLE 15

MANUFACTURING METHOD FOR DISPERSION BODY AND MANUFACTURING METHOD FOR CERAMIC SINTERED BODY

CROSS-REFERENCE TO RELATED APPLICATIONS

The present application is a continuation application of International Application No. PCT/JP2021/007395, filed on Feb. 26, 2021, which claims priority to Japanese Patent Application No. 2020-034361, filed on Feb. 28, 2020. The contents of these applications are incorporated herein by reference in their entirety.

BACKGROUND

Technical Field

The present disclosure relates to a manufacturing method for a dispersion body in which solid particles are dispersed in water and a manufacturing method for a ceramic sintered body.

Related Art

In a manufacturing process for a product that includes a ceramic sintered body, solid particles that serve as a ceramic raw material are dispersed in a liquid, so that a dispersion body, such as a slurry, a paste, or a green body, is manufactured. This dispersion body is molded and fired, so that the ceramic sintered body is manufactured.

SUMMARY

One aspect of the present disclosure provides a manufacturing method for manufacturing a dispersion body by mixing a plurality of types of solid particles, water, and a liquid other than water. In the manufacturing method, the solid particles and the liquid are selected such that Hansen spheres of at least two types of the solid particles and a Hansen sphere of at least one type of the liquid mutually overlap, and a Hansen solubility parameter distance to water of at least one type of the solid particles of which the Hansen spheres overlap that of the liquid is greatest among all solid particles used in manufacturing of the dispersion body, and used to manufacture the dispersion body.

DESCRIPTION OF THE EMBODIMENTS

Figure 1:
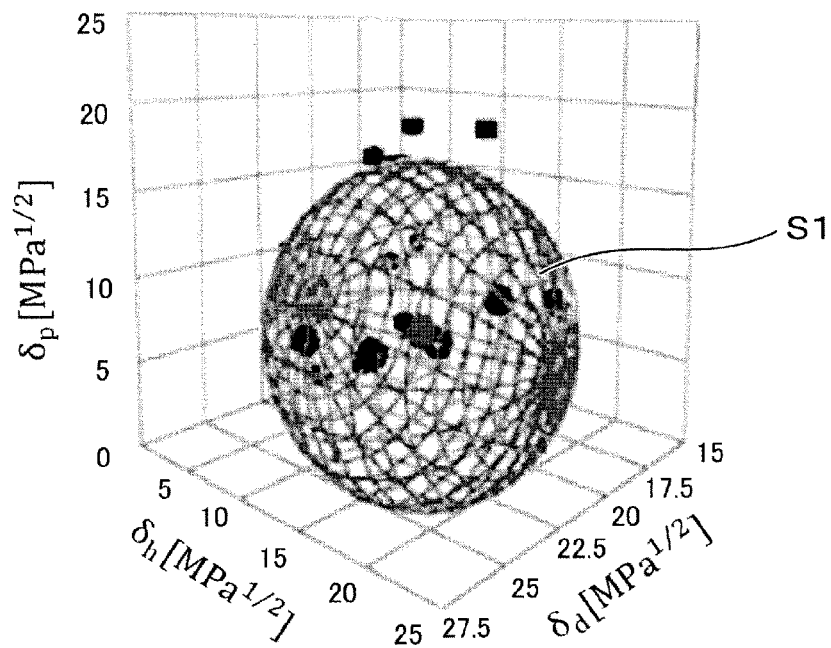
FIG. 1 is an explanatory diagram of a Hansen sphere for solid particles.

In a manufacturing process for a product that includes a ceramic sintered body, a dispersion body, such as a slurry, a paste, or a green body, is manufactured by solid particles that serve as a ceramic raw material being dispersed in a liquid. The ceramic sintered body is manufactured by this dispersion body being molded and fired. From a perspective of preventing breakage due to temperature difference during firing in the ceramic sintered body that has a large mass or volume and the like, as the liquid, use of an organic solvent is avoided and water is used.

When water is used, an issue regarding dispersibility arises. Dispersibility is unstable in a dispersion body that is composed of solid particles, a liquid dispersant, water, and the like that have been selected based on past ideas and theories. That is, tendencies in dispersibility differ depending on combinations of raw materials. In addition, even when types of raw materials are fixed, the tendencies in dispersibility may change if a manufacturer, a lot, or the like changes. When the dispersibility changes, even if firing is performed under same firing conditions, for example, defects such as cracks may occur in the ceramic sintered body. The dispersibility may be temporarily improved and a high-dispersion state may be achieved by a mixing time during manufacturing of the dispersion body being increased. However, the high-dispersion state tends to be lost over time. As disclosed in Japanese Patent Publication No. 4782282, for improvement in dispersibility, use of a Hansen solubility parameter (that is, HSP) theory is proposed.

In general, research into the HSP theory relates to optimal selection of a solvent other than water or an optimal selection of a combination of a plurality of solvents for a single raw material. Under a premise that a plurality of solid raw materials and water are used, combinations of solid particles and liquids are limitless depending on objectives and purposes. That is, indicators for improving dispersibility are not technically established for cases in which water and a plurality of solid particles are mixed. Therefore, in actuality, the combination is determined through reliance on intuition or know-how of a worker or through trial and error in experiments.

The present disclosure provides a manufacturing method for a dispersion body that has favorable dispersibility and a manufacturing method for a ceramic sintered body using the dispersion body.

A first exemplary embodiment of the present disclosure provides a manufacturing method for a dispersion body that is a method for manufacturing a dispersion body by mixing a plurality of types of solid particles, water, and a liquid other than water, in which the solid particles and the liquid are selected such that Hansen spheres of at least two types of the solid particles and a Hansen sphere of at least one type of the liquid mutually overlap, and a Hansen solubility parameter distance to water of at least one type of the solid particles of which the Hansen spheres overlap that of the liquid is greatest among all solid particles used in manufacturing of the dispersion body, and used in the manufacturing of the dispersion body.

A second exemplary embodiment of the present disclosure provides a manufacturing method for a dispersion body that is a method for manufacturing a dispersion body by mixing a plurality of types of solid particles, water, and a liquid other than water, in which at least two types of solid particles are selected from a solid particle candidate group of which a Hansen solubility parameter distance to water is equal to or greater than 28 MPa$^{1/2}$, and the solid particles and the liquid are selected such that Hansen spheres of the solid particles and a Hansen sphere of at least one type of the liquid from a liquid candidate group mutually overlap, and used in manufacturing of the dispersion body.

A third exemplary embodiment of the present disclosure provides a manufacturing method for a ceramic sintered body in which the solid particles are a ceramic raw material, the manufacturing method including molding and firing a dispersion body that is obtained by the above-described manufacturing method.

In the above-described manufacturing methods for a dispersion body according to the first and second exemplary embodiments, a combination that is suitable for high dispersion is selected as the solid particles and the liquid. Therefore, as a result of the above-described manufacturing methods, a dispersion body that has favorable dispersibility while containing water can be manufactured. Consequently, for example, variations in density in the dispersion body can be reduced.

In the above-described manufacturing method for a ceramic sintered body according to the third exemplary embodiment, because the dispersion body is molded, variations in density in a molded body can be reduced. Consequently, occurrence of defects, such as breakage, in the ceramic sintered body can be prevented.

As described above, according to the above-described aspects, a manufacturing method for a dispersion body that has favorable dispersibility and a manufacturing method for a ceramic sintered body using the dispersion body can be provided.

Here, reference numbers within the parentheses in the scope of claims indicate corresponding relationships with specific means according to embodiments described hereafter, and do not limit the technical scope of the present disclosure.

The above-described exemplary embodiments of the present disclosure will be further clarified through the detailed description herebelow, with reference to the accompanying drawings.

First Embodiment

An embodiment related to a manufacturing method for a dispersion body will be described. The dispersion body is manufactured by solid particles, water, and a liquid being mixed. The liquid is a liquid other than water. In the manufacturing of the dispersion body, two or more types of solid particles and one or more types of liquids are used. Specifically, the solid particles are powder and, for example, are composed of inorganic material. For example, the liquid is composed of liquid organic matter and is that which is referred to as a dispersant, a lubricant, a binder, or the like. Such a liquid is referred to, hereafter, as a "non-aqueous liquid," as appropriate.

As the solid particles and the non-aqueous liquid that are used in the manufacturing of the dispersion body, those of which Hansen spheres of the at least two types of solid particles and a Hansen sphere of the at least one type of non-aqueous liquid mutually overlap are selected. For example, when the Hansen spheres of the two types of solid particles mutually overlap and at least one of these Hansen spheres overlap the Hansen sphere of the non-aqueous liquid, this means that the Hansen spheres mutually overlap. In addition, when the Hansen sphere of one of the two types of solid particles and the Hansen sphere of the non-aqueous liquid mutually overlap, and either of these Hansen spheres overlap the Hansen sphere of the other of the two types of solid particles, this also means that the Hansen spheres mutually overlap. Furthermore, when the three Hansen spheres of the two types of solid particles and the non-aqueous liquid mutually overlap, this also means that the Hansen spheres mutually overlap. That is, when two or more sections of overlap in the three Hansen spheres are present, this means that the Hansen spheres of the at least two types of solid particles and the Hansen sphere of the at least one type of non-aqueous liquid mutually overlap. Here, if the Hansen spheres at least are in point-contact, this means that the Hansen spheres overlap each other. When the Hansen spheres share a portion of volume of each other or one Hansen sphere is inside another Hansen sphere as well, this also means that the Hansen spheres overlap each other.

In addition, at least the solid particles that is one type among the solid particles of which the Hansen spheres overlap that of the non-aqueous liquid, of which a Hansen solubility parameter distance Ra is greatest among all solid particles used in the manufacturing of the dispersion body are selected and used in the manufacturing of the dispersion body. The Hansen solubility parameter distance Ra is a distance between a Hansen solubility parameter of water and a Hansen solubility parameter of the solid particles. In subsequent descriptions, the Hansen solubility parameter is denoted as "HSP," as appropriate.

Therefore, in the manufacturing of the dispersion body, the solid particles and the non-aqueous liquid that meet condition A and condition B, below, can be used in combination.

Condition A: From a solid particle candidate group and a non-aqueous liquid candidate group, a combination of solid particles and non-aqueous liquid in which the Hansen spheres of at least two types of solid particles and the Hansen sphere of at least one type of non-aqueous liquid mutually overlap is determined.

Condition B: One of the solid particles that meet condition A has the HSP distance Ra to water that is the greatest among all solid particles used in the manufacturing of the dispersion body.

The solid particle candidate group and the non-aqueous liquid candidate group are determined based on the dispersion body to be fabricated. For example, when the dispersion body is used in a ceramic sintered body, the solid particle candidate group can be determined such that, for example, raw materials of the solid particles chemically react to each other after firing and a ceramic sintered body that has a desired material property is obtained. The solid particle candidate group can include solid particles that are of differing manufacturers, lots, extraction locations, and the like. For example, the non-aqueous liquid candidate group can include liquid solvents, dispersants, lubricants, binders, and the like that are used for dispersion of the solid particles.

The material property of the solid particles is not particularly limited and, for example, is determined based on intended use of the dispersion body. For example, the solid particles include a ceramic raw material. For example, when the dispersion body is used in manufacturing of a honeycomb structure for an exhaust gas purification filter or a sealing portion for sealing an end surface of the honeycomb structure, as the solid particles, silica, aluminum hydroxide, talc, kaolin, alumina, a pore-forming material, and the like can be used. When the dispersion body is used in manufacturing of a honeycomb structure for a monolith carrier that is used to carry an exhaust gas purification catalyst, as the solid particles, kaolin, aluminum hydroxide, silica, alumina, talc, a pore-forming material, and the like can be used. When the dispersion body is used in manufacturing of a honeycomb structure that has a catalytic function (specifically, a promoter function of a noble metal catalyst), as the solid particles, ceria, zirconia, a ceria-zirconia solid solution, alumina, and the like can be used. In addition to the foregoing, the dispersion body is used in manufacturing of separators and electrodes of solid-state batteries, solid electrolyte bodies of sensors, insulators, and the like. In this case, as the solid particles, a solid electrolyte, alumina, and the like can be used. As the non-aqueous liquid, an active solvent such as an amphoteric solvent, an acidic solvent, or a basic solvent, an inert solvent, and the like are used.

Properties and viscosity of the dispersion body are not particularly limited. The dispersion body is a concept that is referred to as a slurry, a paste, a green body, and the like and includes a mixture of water, a non-aqueous liquid other than water, and solid particles. For example, in the dispersion body, the solid particles and the non-aqueous liquid other than water are dispersoids, and water is a dispersion medium.

In the manufacturing of the dispersion body, the Hansen spheres of the solid particles and the non-aqueous liquid, and the Hansen solubility parameter distance Ra between water and the solid particles are determined. Hereafter, the Hansen spheres and the HSP distance Ra will be described.

First, the HSP theory will be described. In general, in this theory, surface energies of solutes, solvents, and gases are quantified and classified based on three items. Three energies are London dispersion force $\delta_d$, dipole-dipole force $\delta_p$, and hydrogen bonding force $\delta_h$. The unit of each energy is $MPa^{1/2}$. That is, an HSP value is expressed as coordinates within a three-dimensional space that is referred to as a Hansen space in which the London dispersion force $\delta_d$, the dipole-dipole force $\delta_p$, and the hydrogen bonding force $\delta_h$ are each a coordinate axis.

For example, a case in which solubility of a solute A and a solvent B is studied will be examined based on the HSP theory. When the HSP value of the solute A is ($\delta_{dA}$, $\delta_{pA}$, $\delta_{hA}$) and the HSP value of the solvent B is ($\delta_{aB}$, $\delta_{pB}$, $\delta_{hB}$), the distance between these HSP values (that is, an HSP distance $Ra_1$) is expressed by expression I, below.

$$Ra_1 = \{4 \cdot (\delta_{dA} - \delta_{aB})^2 + (\delta_{pA} - \delta_{pB})^2 + (\delta_{hA} - \delta_{hB})^2\}^{1/2} \quad \text{Expression I}$$

The solute is more easily dissolved in the solvent as the HSP distance $Ra_1$ decreases. In a case of a solute that is not dissolved, the solvent serves as the dispersion medium, the solute serves as the dispersoid, and the dispersoid is easily dispersed in the dispersion medium. In the case of the dispersion medium and the dispersoid, a high-dispersion state can be achieved when $Ra_1 \leq 5$ and an ultrahigh-dispersion state can be achieved when $Ra_1 \leq 2$.

Regarding the above-described HSP theory, in the present disclosure, focus is placed on the overlap of the Hansen spheres, and the HSP distance Ra between the solid particles and water. That is, in mixing of at least two types of solid particles, the non-aqueous liquid, and water, dispersibility is evaluated based on the overlap of the Hansen spheres and the HSP distance Ra. A dispersion body that is in a high-dispersion state can be obtained as a result. The HSP distance Ra is calculated based on expression I by using the HSP value of water as the HSP value of the solvent B. Here, the HSP value of water is $\delta_d$: 15.5, $\delta_p$: 16.0, and $\delta_h$: 42.3.

Measurement of the Hansen spheres and the HSP values of the solid particles and the non-aqueous liquid is performed by reagents of at least 14 types of pure solvents of which the HSP values are already known being classified into good solvent and poor solvent.

For example, the Hansen spheres and the HSP values are determined by analysis software. As the analysis software, a software HSPiP Version 5.2.05 developed by Dr. Hansen can be used. Details of HSPiP are described at https://www.hansen-solubility.com. First, classification results of the solvent reagents are given scores. Next, the scores are inputted to the analysis software. Specifically, a good solvent can be given a score 1 and a poor solvent can be given a score 0. As a result, in the analysis software, the Hansen sphere can be drawn in the three-dimensional Hansen space in which the London dispersion force $\delta_d$, the dipole-dipole force $\delta_p$, and the hydrogen bonding force $\delta_h$ are each a coordinate axis. FIG. 1 shows an example of the Hansen sphere S1 of a certain solid particle. The Hansen sphere S2 of the non-aqueous liquid is also drawn in the Hansen space in a manner similar to that in FIG. 1. The HSP value is determined as a center (specifically, center coordinates) of the Hansen sphere. Here, in cases in which the above-described analysis software or version is not available, the Hansen spheres and the HPS values can be determined by another software or another version that is available and in which similar measurement principles are used, or by calculation using similar measurement principles.

The classification into good solvent and poor solvent can be determined based on a threshold of a certain measurement value. In cases in which the above-described analysis software is used, the threshold can be determined by a fitting value being confirmed. The fitting value being closer to 1 means that the Hansen sphere is more correctly drawn. Therefore, the threshold can be determined such that the fitting value is 1 or a maximum numeric value that is less than 1. Here, although this is an empirical determination based on past experiments, sufficient measurement accuracy may not be achieved when the fitting value is less than 0.8. Therefore, in this case, the solvent reagent is preferably reselected and measured.

The classification into good solvent and poor solvent for determining the Hansen spheres and the HSP values of the solid particles is performed based on (1) confirmation of a precipitation state by a visual observation method, (2) a measurement value of particle size by Stokes' method, (3) a measurement value of particle size by a concentrated particle size analyzer, or (4) a measurement value of a contact angle by a permeation speed method. When (1) classification by the visual observation method cannot be performed, (2) measurement of the particle size by the Stokes' method is selected. When (2) measurement of the particle size by the Stokes' method cannot be performed, (3) measurement of the particle size by the concentrated particle size analyzer is selected. When (3) measurement of the particle size by the concentrated particle size analyzer cannot be performed, (4) measurement of the contact angle by the permeation speed method is selected. Specific methods will be described below. Here, the classification and measurements are performed under a room-temperature condition (specifically, a temperature of 20° C. to 25° C.).

(1) Visual Observation Method

The precipitation in the solvent reagent is visually confirmed. For example, specific steps are as in (1-1) to (1-3), described below.

(1-1) Prepare at least 14 types of solvent reagents of which the HSP values are already known.

(1-2) Place 0.05 g of the solid particles to be measured in 20 ml of each solvent reagent and shake 30 times. After the solid particles are dispersed in the solvent reagent as a result, let stand.

(1-3) Visually confirm the precipitation state of the solid particles in the solvent reagent after 15 minutes of standing. Determine the solvent reagent to be a poor solvent when precipitation is observed. Determine the solvent reagent to be a good solvent when precipitation is not observed. Perform the foregoing operations for the at least 14 types of solvent reagents.

(2) Stokes' Method

The particle size of the solid particles can be measured by the Stokes' method, and the classification into good solvent and poor solvent can be performed based on the particle size. The solvent reagent is considered a better solvent as the particle size decreases. For example, specific steps are as in (2-1) to (2-5), described below.

(2-1) Prepare at least 14 types of solvent reagents of which the HSP values are already known.

(2-2) Place 2 g of the solid particles to be measured in a 25 mL measuring cylinder. Next, pour the solvent reagent into the measuring cylinder up to the 20 mL line. After shaking the measuring cylinder 30 times, let stand. Here, after standing, if the solid particles promptly precipitate in the solvent reagent in a visually observable manner, the measurement of the particle size described hereafter is not necessarily required to be performed. The solvent reagent can be determined to be a poor solvent that has poor dispersibility.

(2-3) Measure a height of an interface between a clear layer and a deposited layer three times each, at 5 minutes after, 10 minutes after, 15 minutes after, 20 minutes after, and 25 minutes after standing. Calculate average values thereof. As a result, the average value of the interface height after the elapse of each amount of time is obtained. Calculate a sedimentation rate ν (unit: cm/s) from the average values of the interface height and the elapsed times.

(2-4) Calculate a particle size $D_p$ (unit: cm) by Stokes' law that is expressed in expression II, below. In expression II, η: a coefficient of viscosity of the reagent (unit: cm·s), ν: sedimentation rate (unit: cm/s), $ρ_p$: density of the particles (unit: $g/cm^3$), $ρ_0$: density of the reagent (unit: $g/cm^3$), and g: acceleration of gravity. The density of the particles $ρ_p$ is measured using a pycnometer. The acceleration of gravity g is 980 $cm/s^2$. Perform the measurement of particle size $D_p$ for the at least 14 types of solvent reagents. The particle size $D_p$ is an average particle size.

(2-5) Classify the solvent reagents into good solvent and poor solvent based on a threshold of the particle size $D_p$. A method for determining the threshold is as described above. Here, for example, the classification can be facilitated by the solvent reagents being arranged in order from that with the smallest particle size $D_p$.

$$D_p = \sqrt{\frac{18\eta v}{(\rho_p - \rho_0)g}}$$ Expression II (3) Concentrated Particle Size Analyzer The particle size (specifically, the average particle size) of the solid particles can be measured using a concentrated particle size analyzer, and the classification into good solvent and poor solvent can be performed based on the particle size. For example, for the measurement, a concentrated particle analyzer "FPAR-100," manufactured by Otsuka Electronics Co., Ltd., is used. The solvent reagent is a better solvent as the particle size decreases. For example, specific steps are as in (3-1) to (3-4), described below.

(3-1) Prepare at least 14 types of solvent reagents of which the HSP values are already known.

(3-2) Fabricate a dispersion liquid that has a particle concentration of $5.0×10^{-4}$ g/cc using the solid particles to be measured and the solvent reagent.

(3-3) Place the dispersion liquid in the concentrated particle size analyzer and measure the particle size. Perform the measurement of the particle size for the at least 14 types of solvent reagents.

(3-4) Classify the solvent reagents into good solvent and poor solvent based on a threshold of the particle size. A method for determining the threshold is as described above. Here, for example, the classification can be facilitated by the solvent reagents being arranged in order from that with the smallest particle size.

(4) Permeation Speed Method

Figure 2:
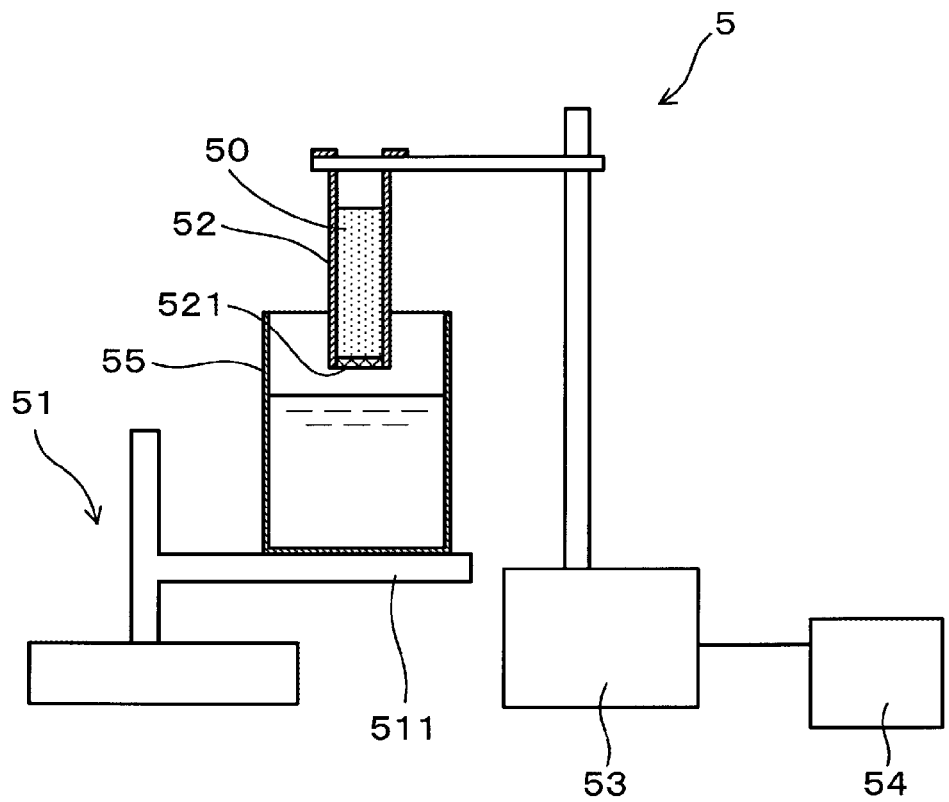
FIG. 2 is a schematic diagram of a configuration of an apparatus for measuring a contact angle by a permeation speed method.

A contact angle between the solid particles and the solvent reagent can be measured by the permeation speed method, and the classification into good solvent and poor solvent can be performed based on the contact angle. The measurement is performed by a measurement apparatus 5 shown in FIG. 2. As shown in FIG. 2, the measurement apparatus 5 is configured by a lifting/lowering apparatus 51, an iron column 52, an electronic scale 53, and a recording apparatus 54. The lifting/lowering apparatus 51 includes a lifting/lowering base 511. A beaker 55 that contains the solvent reagent is arranged on the lifting/lowering base 511. The iron column 52 and the electronic scale 53 are connected. Weight inside the iron column 52 can be measured by the electronic scale. A lower surface of the iron column 52 is composed of a paper filer 521. The inside of the iron column 52 is filled with powder 50 of the solid particles to be measured. The iron column 52 is hung above the beaker 55. For example, the recording apparatus 54 is a computer and records measurement results of the electronic scale 53. For example, the measurement of the contact angle using this measurement apparatus 5 and the classification are specifically performed by steps (4-1) to (4-4), described below.

(4-1) Prepare at least 14 types of solvent reagents of which the HSP values are already known.

(4-2) Place the solvent reagent in the beaker 55. Fill the iron column 52 with the powder 50 of the solid particles to be measured.

(4-3) Operate the lifting/lowering apparatus 51 and immerse a lower surface side of the iron column 52 in the solvent reagent inside the beaker 55. As a result, the solvent reagent permeates the powder 50 of the solid particles inside the iron column 52. After immersion, measure a permeation weight every second through the electronic scale 53, and record the measurement results by the recording apparatus 54. The permeation weight refers to a weight of the solvent reagent that permeates a filling powder (specifically, the powder 50) inside the iron column 52.

(4-4) Calculate a contact angle θ (unit: °) by Washburn's equation that is expressed in expression III, below. In expression III, l: permeation height of the liquid (unit: m), t: permeation time (unit: s), r: capillary radius of the filling powder (unit: m), γ: surface tension of the liquid (unit: mN/m), and η: viscosity of the liquid (unit: mPa·s). Here, volume of the liquid (specifically, the solvent reagent) that permeates the inside of the column can be calculated from the density and the permeation weight of the liquid. The permeation height l can be calculated from the volume and a cross-sectional area of the container. Perform the measurement of the contact angle θ for the at least 14 types of solvent reagents.

$l^2/t = r·γ \cos θ/2η$ Expression III (4-5) Classify the solvent reagents into good solvent and poor solvent based on a threshold of the contact angle. The contact angle being smaller means that permeation of the solvent reagent into the filling power is faster. The solvent reagent is a better solvent as the permeation becomes faster. Meanwhile, a larger contact angle means that permeation of the solvent into the filling powder is slower. The solvent reagent is a poorer solvent as the permeation becomes slower. A method for determining the threshold is as described above. Here, for example, the classification can be facilitated by the solvent reagent being arranged in order from that with the smallest contact angle θ.

accuracy as a number of solvent reagents increases. However, calculations can be performed with sufficiently high accuracy with 14 to 20 types. Measurement results hardly change by the number being increased any further. Use of at least 14 types of solvent reagents is sufficient. Table 1 shows the solvent reagents of which the HSP values are already known and the HSP values thereof. The Hansen spheres and the HSP values can be determined by at least 14 types of solvent reagents being used from a list shown in Table 1.

TABLE 1

| Reagent | | | HSP value | | |
|---|---|---|---|---|---|
| Category | No. | Solvent reagent | $\delta_d$ [MPa$^{1/2}$] | $\delta_p$ [MPa$^{1/2}$] | $\delta_h$ [MPa$^{1/2}$] |
| First Group | R1 | 1-Butanol | 16.0 | 5.7 | 15.8 |
| First Group | R2 | Tetrahydrofuran (THF) | 16.8 | 5.7 | 8.0 |
| First Group | R4 | 1,4-Dioxane | 17.5 | 1.8 | 9.0 |
| First Group | R6 | Ethanol | 15.8 | 8.8 | 19.4 |
| First Group | R9 | Dimethyl Sulfoxide (DMSO) | 18.4 | 16.4 | 10.2 |
| First Group | R12 | Acetone | 15.5 | 10.4 | 7.0 |
| First Group | R13 | Toluene | 18.0 | 1.4 | 2.0 |
| First Group | R14 | Methyl Ethyl Ketone (MEK) | 16.0 | 9.0 | 5.1 |
| First Group | R15 | Ethyl Acetate | 15.8 | 5.3 | 7.2 |
| Second Group | R3 | Acetic Acid | 14.5 | 8.0 | 13.5 |
| Second Group | R5 | Dimethyl Formamide (DMF) | 17.4 | 13.7 | 11.3 |
| Second Group | R7 | N-Methyl Formamide | 17.4 | 18.8 | 15.9 |
| Second Group | R8 | 2-Propanol | 15.8 | 6.1 | 16.4 |
| Second Group | R10 | Methyl Isobutyl Ketone (MIBK) | 15.3 | 6.1 | 4.1 |
| Second Group | R11 | Cyclohexane | 16.8 | 0.0 | 0.2 |
| Second Group | R22 | Diacetone Alcohol | 15.8 | 8.2 | 10.8 |
| Third Group | R16 | 1-Methyl Imidazole | 19.7 | 15.6 | 11.2 |
| Third Group | R17 | Benzyl Alcohol | 18.4 | 6.3 | 13.7 |
| Third Group | R18 | N-Methyl-2-Pyrrolidone (NMP) | 18.0 | 12.3 | 7.2 |
| Third Group | R19 | Hexane | 14.9 | 0.0 | 0.0 |
| Third Group | R20 | Ethylene Glycol Monomethyl Ether | 16.0 | 8.2 | 15.0 |
| Third Group | R21 | Quinoline | 20.5 | 5.6 | 5.7 |
| Third Group | R23 | Propylene Carbonate | 20.0 | 18.0 | 4.1 |
| Third Group | R24 | Ethanolamine | 17.0 | 15.5 | 21.0 |
| Third Group | R25 | o-Dichlorobenzene | 19.2 | 6.3 | 3.3 |
| Third Group | R26 | 1-Methoxy-2-Propanol | 15.6 | 6.3 | 11.6 |
| Third Group | R27 | Bromobenzene | 19.2 | 5.5 | 4.1 |
| Third Group | R28 | Pyridine | 19.0 | 8.8 | 5.9 |
| Third Group | R29 | Benzyl Benzoate | 20.0 | 5.1 | 5.2 |
| Third Group | R30 | N,N-Diethyl Formamide | 16.4 | 11.4 | 9.2 |
| Third Group | R31 | γ-Butyrolactone (GBL) | 18.0 | 16.6 | 7.4 |

For example, the classification into good solvent and poor solvent for determining the Hansen sphere of the non-aqueous liquid is performed through visual confirmation of the solubility of the non-aqueous liquid and the solvent reagent. Specifically, at least 14 types of solvent reagents of which the HSP values are already known are prepared. One ml of the non-aqueous liquid to be measured is placed in a screw tube, and 1 mL of the solvent reagent is further placed therein. After the screw tube is shaken 20 times, a state inside the tube is visually examined. The solvent reagent is determined to be a good solvent when the non-aqueous liquid is dissolved in the solvent reagent. The solvent reagent is determined to be a poor solvent when the non-aqueous liquid is not completely dissolved in the solvent reagent and a portion is separated, or the non-aqueous liquid is completely undissolved in the solvent reagent and both are completely separated. The determination is performed under room-temperature conditions (specifically, a temperature of 20° C. to 25° C.). The foregoing operation is performed on the at least 14 types of solvent reagents.

For example, as the solvent reagent that is used in the measurement of the Hansen spheres of the solid particles and the non-aqueous liquid, a pure solvent of which $\delta_d$ is 14 to 21, $\delta_p$ is 0 to 20, and $\delta_h$ is 0 to 22 is selected. The HSP values and the Hansen spheres can be measured with higher A method for selecting the solvent reagents to be used for measurement is not limited. However, a combination of reagents of which the values (that is, $\delta_d$, $\delta_p$, and $\delta_h$) of surface energy of the solvent reagents are close is preferably avoided, and a combination in which the values vary over a wide range is preferably selected.

Specifically, of the solvent reagents shown in Table 1, for example, the solvent reagents that belong to a first group can all be used, and the solvent reagents can be selectively used from a second group and a third group depending on the solid particles to be measured and the non-aqueous liquid. Regarding the non-aqueous liquid and the solid particles that can be measured by the visual observation method, a solvent reagent that belongs to the first group and a solvent reagent that belongs to the second group can be used in combination. In this case, when the fitting value is poor, a solvent reagent from the third group is preferably additionally used such that the fitting value becomes closer to 1. In addition, depending on the measurement method, there are solvent reagents of which the determination of good solvent and poor solvent cannot be made. Therefore, the solvent reagents can be selected from the second group and the third group based on the measurement method.

The Hansen spheres of the solid particles and the non-aqueous liquid can be determined as described above. In addition, the HSP value of the solid particles is determined from the Hansen spheres. From this result, the HSP distance Ra between the solid particles and water can be calculated.

As shown in FIG. 1, the Hansen sphere S1 is expressed in a three-dimensional space. In the manufacturing of the dispersion body, the solid particles and the non-aqueous liquid are selectively used such that the Hansen spheres of at least two types of solid particles and one type of non-aqueous liquid overlap. Specific examples of overlap of the Hansen spheres will be given in experiment examples.

In the manufacturing method according to the present embodiment, the dispersion body is manufactured by a plurality of types of solid particles (specifically, powder), water, and a liquid other than water being mixed. In addition, the solid particles and the liquid to be used in the manufacturing of the dispersion body are determined based on the overlap of the Hansen spheres and the HSP distance Ra to water. As a result, as the solid particles and the non-aqueous liquid, a combination that is suitable for high dispersion can be selected. Consequently, a dispersion body that has favorable dispersibility even while containing water can be manufactured. Therefore, variations in density in the dispersion body can be reduced. In addition, changes over time in viscosity of the dispersion body can also be reduced.

The solid particles of which the Hansen sphere overlaps that of the non-aqueous liquid are referred to, hereafter, as "liquid-affinity solid particles," as appropriate. The solid particles are preferably selected such that a mixing ratio of one type among the liquid-affinity solid particles is greatest among all solid particles used in the manufacturing of the dispersion body, and used in the manufacturing of the dispersion body. In this case, a dispersion body that has more favorable dispersibility can be manufactured. A reason for this is that affinity between the solid particles of which an amount used is greatest and the liquid becomes favorable. Here, the mixing ratio is mass ratio.

In addition, when, among all solid particles that are used in the manufacturing of the dispersion body, the solid particles of which the HSP distance Ra to water is the greatest is first solid particles, the first solid particles are preferably selected as the solid particles that have the greatest HSP distance Ra in the solid particle candidate group that can be used in the manufacturing of the dispersion body. In this case as well, a dispersion body that has more favorable dispersibility can be manufactured. A reason for this is that affinity between the first solid particles of which affinity with water is lowest among the solid particle candidate group and the liquid becomes favorable.

Either of the selection of the solid particles of which the HSP distance Ra is the greatest and the selection of the combination of the solid particles and the liquid of which the Hansen spheres overlap may be performed first. That is, the order of selection may be interchanged. For example, the HSP values of the solid particle candidate group are determined and the solid particle candidate group is arrayed in order from that with the greatest HSP distance Ra to water. Then, the solid particles and the liquid are selected such that the Hansen spheres of the solid particles of which the HSP distance Ra to water is great and the liquid overlap. The solid particles and the liquid can then be used in the manufacturing of the dispersion body. Meanwhile, the combinations of the solid particles and the liquids can be studied from the overlap of the Hansen spheres, first. The combination that includes the solid particles of which the HSP distance Ra to water is great can then be selected from the combinations.

Second solid particles that are solid particles other than the first solid particles among the liquid-affinity solid particles are preferably selected as the solid particles of which the HSP distance Ra is second greatest in the solid particle candidate group, and used in the manufacturing of the dispersion body. In this case as well, a dispersion body that has more favorable dispersibility can be manufactured. A reason for this is that affinity between the first solid particles of which affinity with water is lowest among the solid particle candidate group, the second solid particles, and the liquid becomes favorable.

The second solid particles that are the solid particles other than the first solid particles among the liquid-affinity solid particles are preferably selected as the solid particles of which the mixing ratio is greatest or second greatest among all solid particles used in the fabrication of the dispersion body. In this case as well, a dispersion body that has more favorable dispersibility can be manufactured. A reason for this is that affinity between the second solid particles of which the amount used is large and the liquid becomes favorable. Here, the mixing ratio is mass ratio.

As described above, according to the present embodiment, a manufacturing method for a dispersion body that has favorable dispersibility can be provided.

Second Embodiment

Another embodiment related to the manufacturing method for the dispersion body will be described. Here, reference numbers used according to the second and subsequent embodiments that are the same as the reference numbers used according to earlier embodiments indicate constituent elements and the like that are similar to those according to the earlier embodiments.

In a manner similar to the first embodiment, the dispersion body that is manufactured according to the present embodiment is manufactured by solid particles, water, and a non-aqueous liquid being mixed. The solid particles and the non-aqueous liquid that are used in the manufacturing of the dispersion body are selected in a following manner.

At least two types of solid particles are selected from a solid particle candidate group of which the HSP distance Ra to water is equal to or greater than 28 $MPa^{1/2}$. Then, the solid particles and the non-aqueous liquid are selected such that the Hansen spheres of the solid particles and the Hansen sphere of at least one type of non-aqueous liquid from a non-aqueous liquid candidate group mutually overlap. As described according to the first embodiment, for the HSP distance Ra between the solid particles and water, the respective HSP values may be measured and the distance therebetween may be calculated.

A reason for selecting the solid particles from the solid particle candidate group of which the HSP distance Ra to water is equal to or greater than 28 $MPa^{1/2}$ is as follows. When the HSP distance Ra to water is equal to or greater than 28 $MPa^{1/2}$, dispersion of the solid particles in the water does not significantly deteriorate. Therefore, a favorable dispersion body can be obtained by mechanical energy through kneading and stirring. Meanwhile, when the HSP distance Ra to water is less than 28 $MPa^{1/2}$, the solid particles are likely to form aggregates with one another in the water, and the aggregates are difficult to disperse by the above-described mechanical energy. Therefore, the solid particles are preferably selected from the solid particle candidate group of which the HSP distance Ra to water is equal to or greater than 28 $MPa^{1/2}$.

Through use of the solid particles and the non-aqueous liquid that are selected as described above, the dispersion body that has favorable dispersibility can be manufactured.

The solid particles are preferably selected such that the mixing ratio of at least one type of solid particles selected from the solid particle candidate group is greatest among all solid particles used in the manufacturing of the dispersion body, and used in the manufacturing of the dispersion body. In this case, a dispersion body that has more favorable dispersibility can be manufactured. A reason for this is that affinity between the solid particles of which the amount used is the greatest and the non-aqueous liquid become favorable. Here, the mixing ratio is mass ratio. In other respects, the present embodiment can be carried out in a manner similar to the first embodiment, and similar effects are achieved.

Third Embodiment

Figure 3:
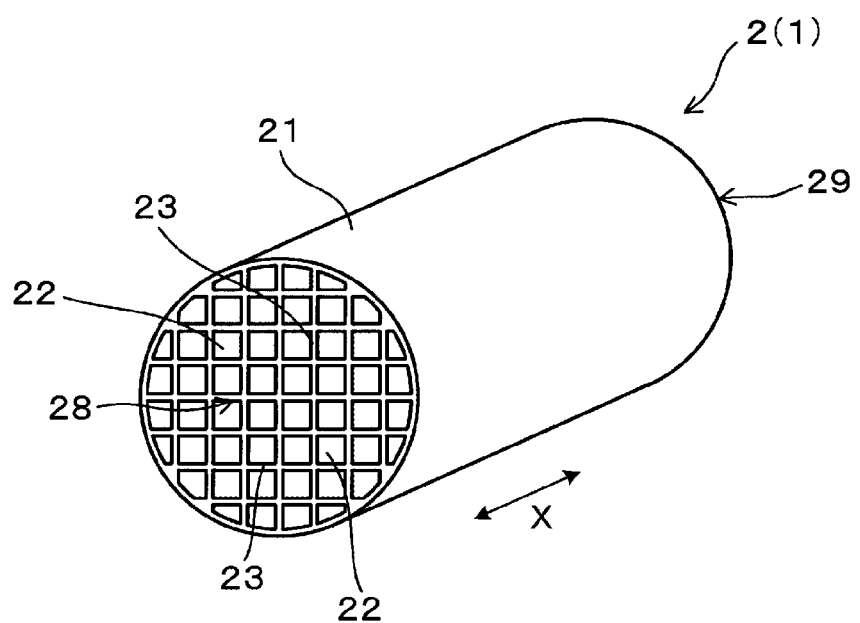
FIG. 3 is a perspective view of a honeycomb structure.
Figure 4B:
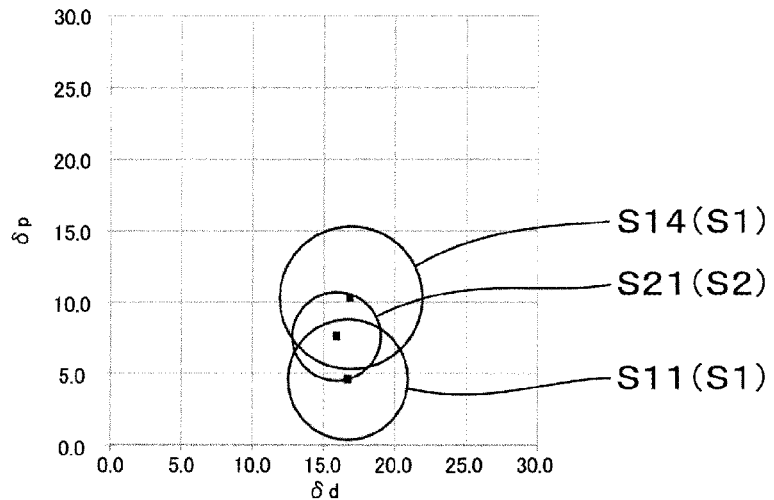
FIG. 4(*a*) is an explanatory diagram in which overlap of the Hansen spheres of solid particles and a liquid in comparative example 1 is shown on a plane defined by a London dispersion force $\delta_d$ and dipole-dipole force $\delta_p$, FIG. 4(*b*) is an explanatory diagram in which the overlap of the Hansen spheres of the solid particles and the liquid in comparative example 1 is shown on a plane defined by a dipole-dipole force $\delta_p$ and hydrogen bonding force $\delta_h$, and FIG. 4(*c*) is an explanatory diagram in which the overlap of the Hansen spheres of the solid particles and the liquid in comparative example 1 is shown on a plane defined by the London dispersion force $\delta_d$ and hydrogen bonding force $\delta_h$.
Figure 4B:
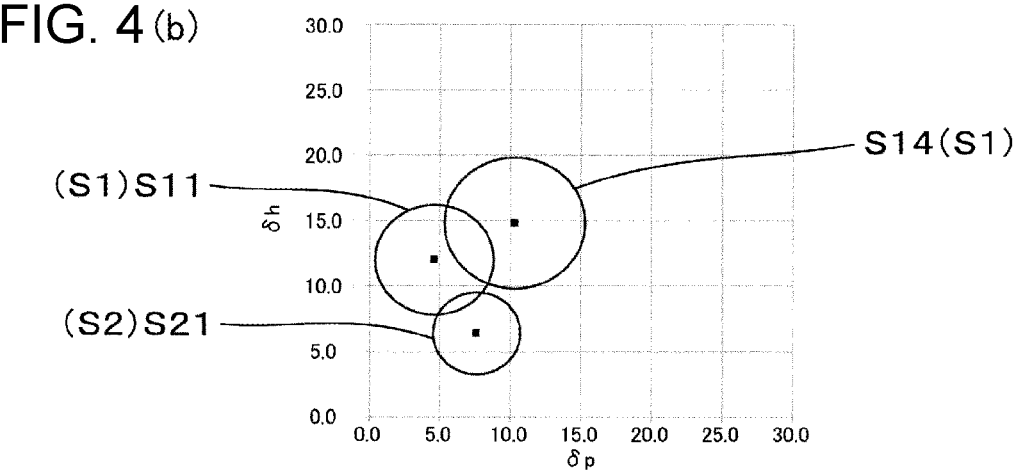
Figure 4C:
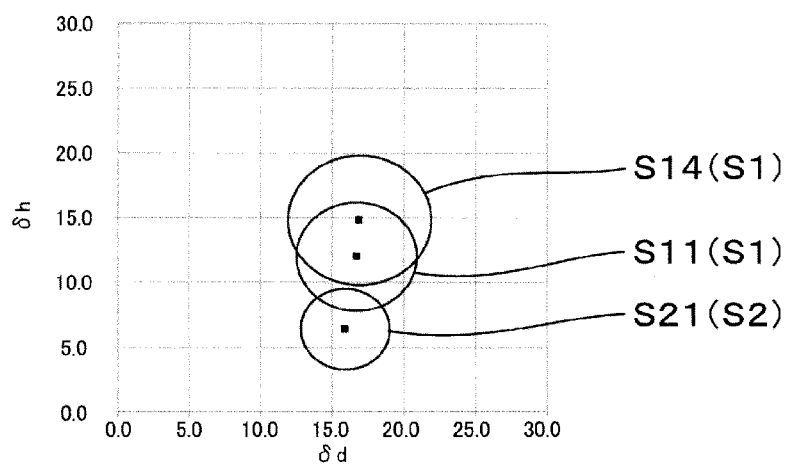
Figure 5A:
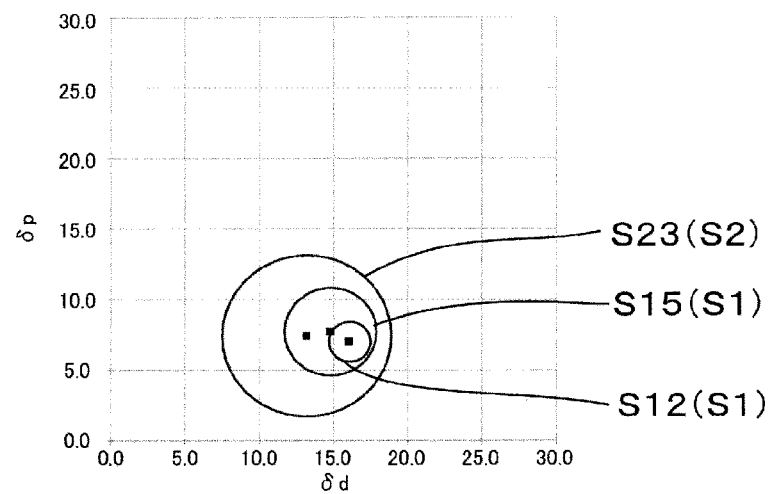
FIG. 5(*a*) is an explanatory diagram in which overlap of the Hansen spheres of solid particles and a liquid in comparative example 2 is shown on a plane defined by the London dispersion force $\delta_d$ and dipole-dipole force $\delta_p$, FIG. 5(*b*) is an explanatory diagram in which the overlap of the Hansen spheres of the solid particles and the liquid in comparative example 2 is shown on a plane defined by the dipole-dipole force $\delta_p$ and hydrogen bonding force $\delta_h$, and FIG. 5(*c*) is an explanatory diagram in which the overlap of the Hansen spheres of the solid particles and the liquid in comparative example 2 is shown on a plane defined by the London dispersion force $\delta_d$ and hydrogen bonding force $\delta_h$.
Figure 5B:
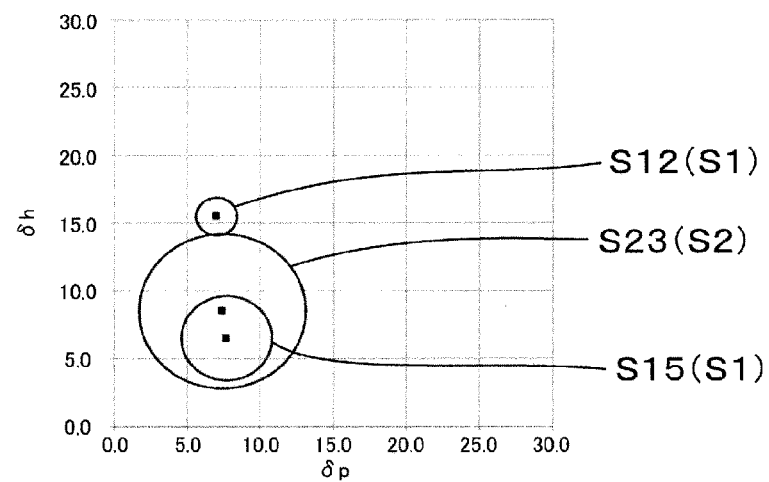
Figure 5C:
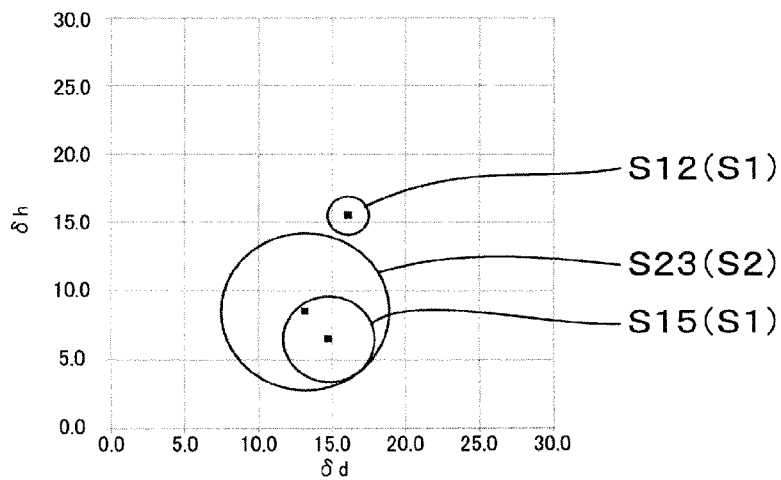
Figure 6A:
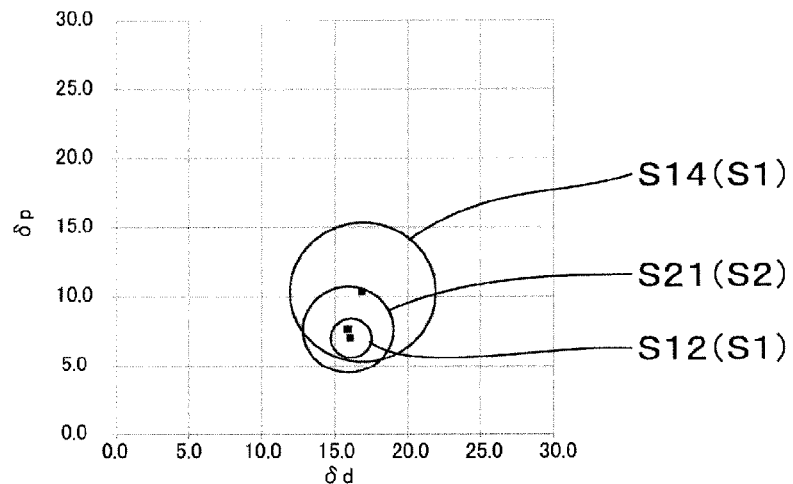
FIG. 6(*a*) is an explanatory diagram in which overlap of the Hansen spheres of solid particles and a liquid in comparative example 3 is shown on a plane defined by the London dispersion force $\delta_d$ and dipole-dipole force $\delta_p$, FIG. 6(*b*) is an explanatory diagram in which the overlap of the Hansen spheres of the solid particles and the liquid in comparative example 3 is shown on a plane defined by the dipole-dipole force $\delta_p$ and hydrogen bonding force $\delta_h$, and FIG. 6(*c*) is an explanatory diagram in which the overlap of the Hansen spheres of the solid particles and the liquid in comparative example 3 is shown on a plane defined by the London dispersion force $\delta_d$ and hydrogen bonding force $\delta_h$.
Figure 6B:
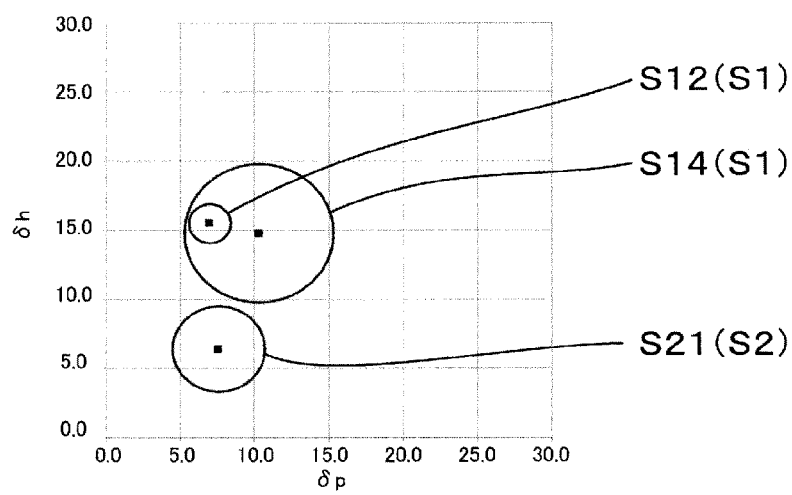
Figure 6C:
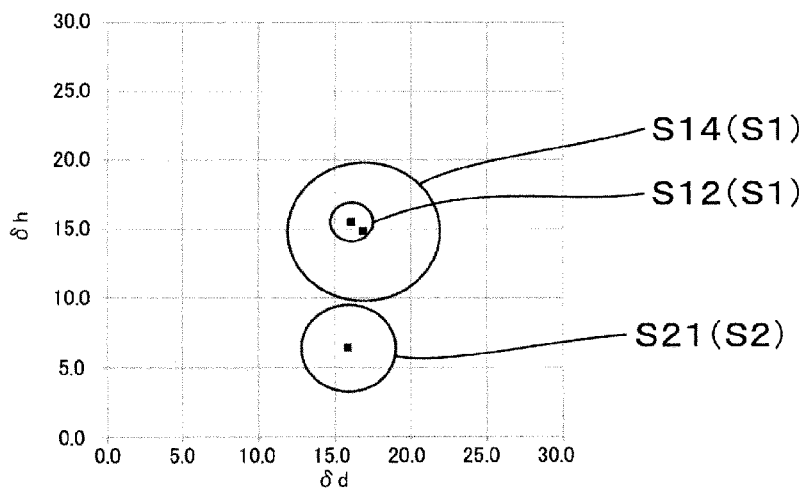
Figure 7A:
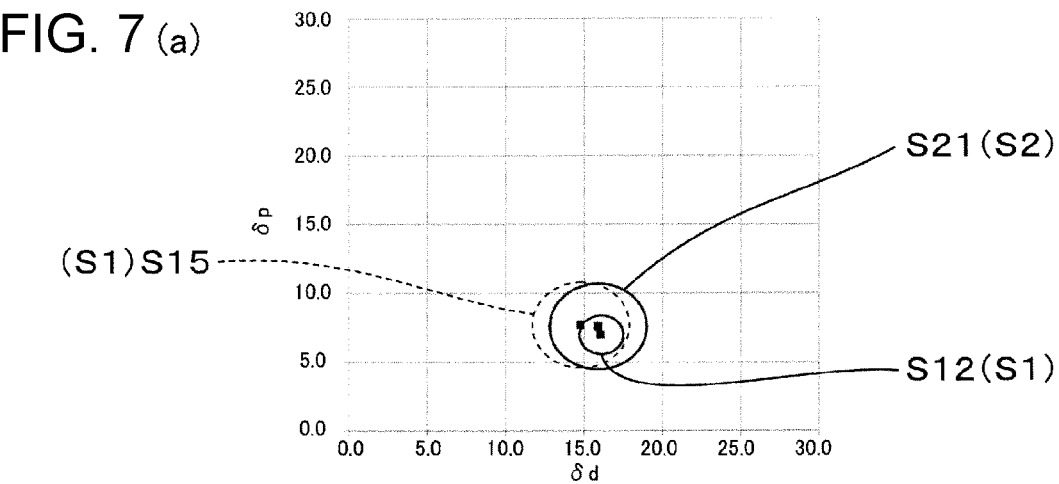
FIG. 7(*a*) is an explanatory diagram in which overlap of the Hansen spheres of solid particles and a liquid in comparative example 4 is shown on a plane defined by the London dispersion force $\delta_d$ and dipole-dipole force $\delta_p$, FIG. 7(*b*) is an explanatory diagram in which the overlap of the Hansen spheres of the solid particles and the liquid in comparative example 4 is shown on a plane defined by the dipole-dipole force $\delta_p$ and hydrogen bonding force $\delta_h$, and FIG. 7(*c*) is an explanatory diagram in which the overlap of the Hansen spheres of the solid particles and the liquid in comparative example 4 is shown on a plane defined by the London dispersion force $\delta_d$ and hydrogen bonding force $\delta_h$.
Figure 7B:
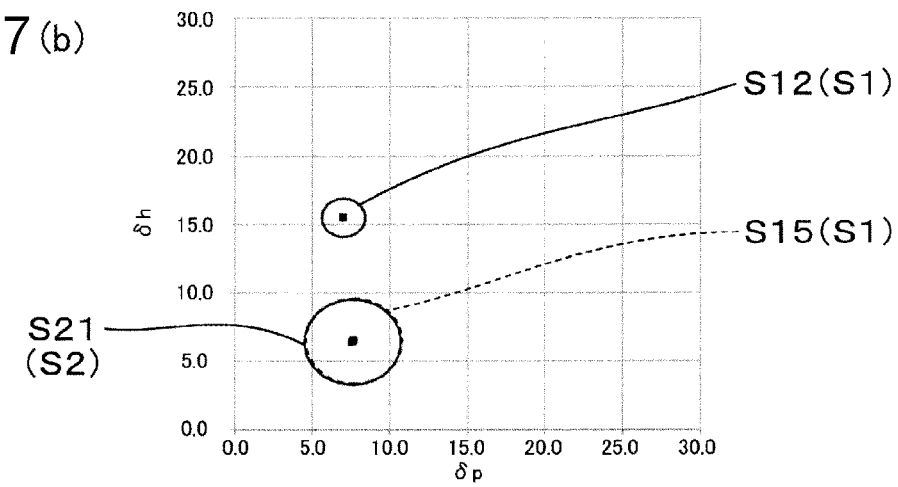
Figure 7C:
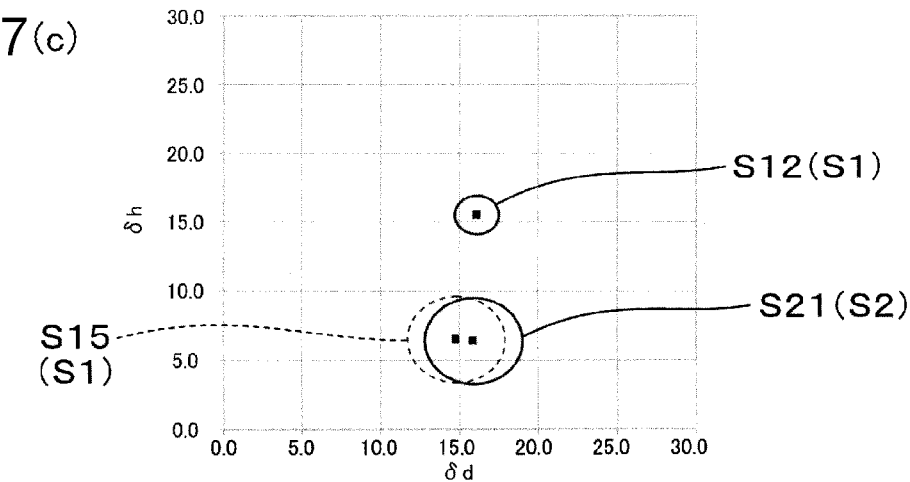
Figure 8A:
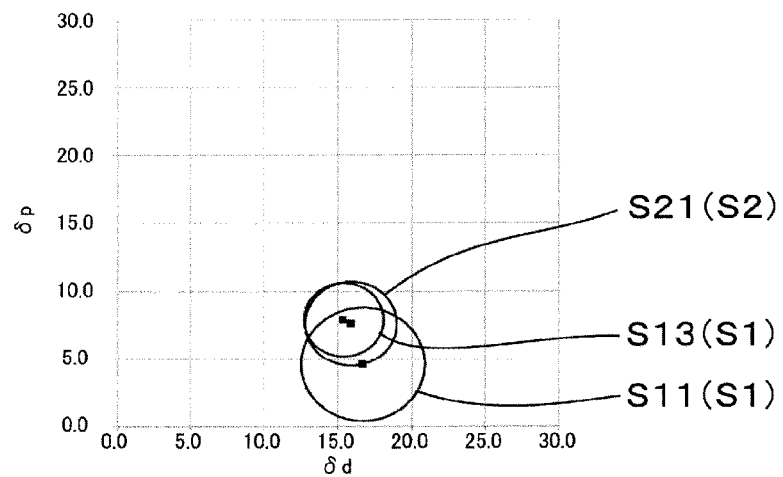
FIG. 8(*a*) is an explanatory diagram in which overlap of the Hansen spheres of solid particles and a liquid in example 1 is shown on a plane defined by the London dispersion force $\delta_d$ and dipole-dipole force $\delta_p$, FIG. 8(*b*) is an explanatory diagram in which the overlap of the Hansen spheres of the solid particles and the liquid in example 1 is shown on a plane defined by the dipole-dipole force $\delta_p$ and hydrogen bonding force $\delta_h$, and FIG. 8(*c*) is an explanatory diagram in which the overlap of the Hansen spheres of the solid particles and the liquid in example 1 is shown on a plane defined by the London dispersion force $\delta_d$ and hydrogen bonding force $\delta_h$.
Figure 8B:
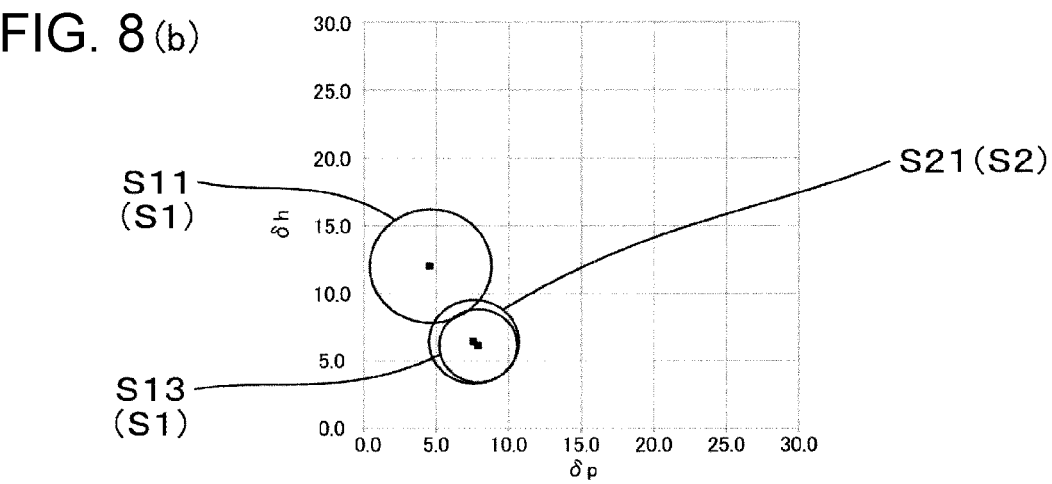
Figure 8C:
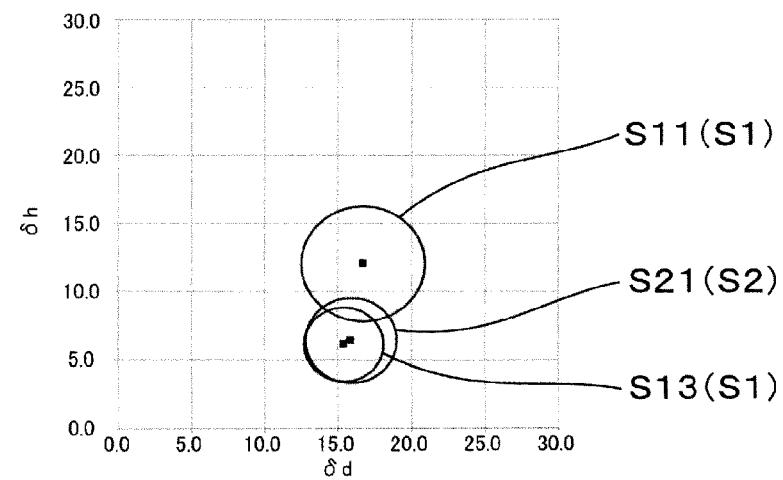
Figure 9A:
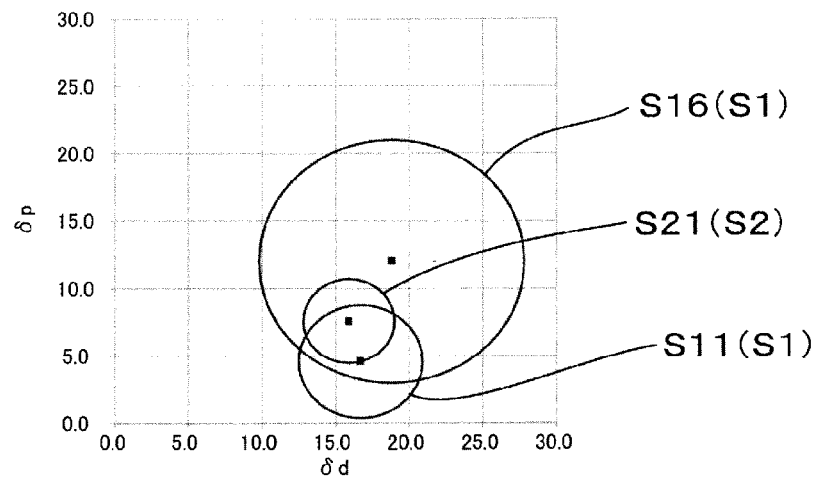
FIG. 9(*a*) is an explanatory diagram in which overlap of the Hansen spheres of solid particles and a liquid in example 2 is shown on a plane defined by the London dispersion force $\delta_d$ and dipole-dipole force $\delta_p$, FIG. 9(*b*) is an explanatory diagram in which the overlap of the Hansen spheres of the solid particles and the liquid in example 2 is shown on a plane defined by the dipole-dipole force $\delta_p$ and hydrogen bonding force $\delta_h$, and FIG. 9(*c*) is an explanatory diagram in which the overlap of the Hansen spheres of the solid particles and the liquid in example 2 is shown on a plane defined by the London dispersion force $\delta_d$ and hydrogen bonding force $\delta_h$.
Figure 9B:
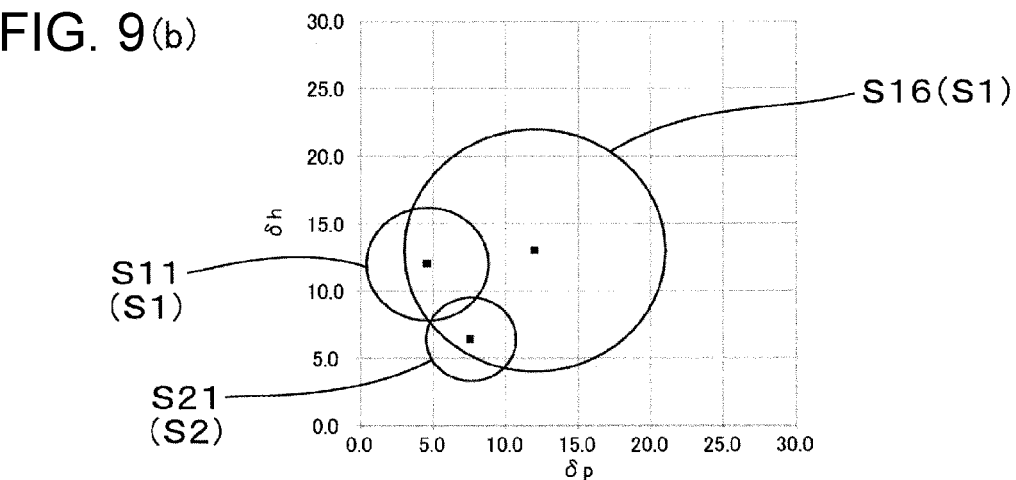
Figure 9C:
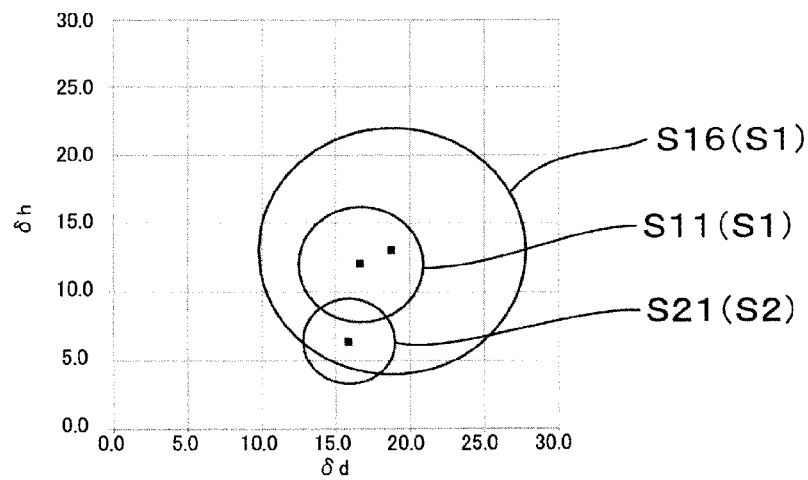
Figure 10A:
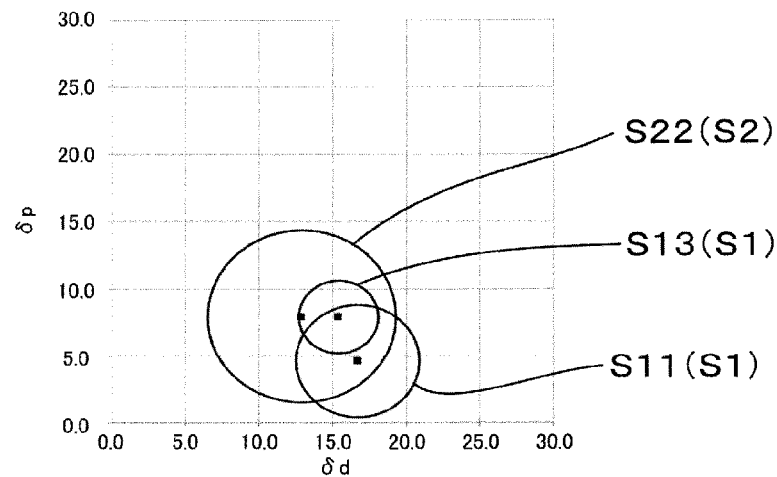
FIG. 10(*a*) is an explanatory diagram in which overlap of the Hansen spheres of solid particles and a liquid in example 3 is shown on a plane defined by the London dispersion force $\delta_d$ and dipole-dipole force $\delta_p$, FIG. 10(*b*) is an explanatory diagram in which the overlap of the Hansen spheres of the solid particles and the liquid in example 3 is shown on a plane defined by the dipole-dipole force $\delta_p$ and hydrogen bonding force $\delta_h$.
FIG. 10(c) is an explanatory diagram in which the overlap of the Hansen spheres of the solid particles and the liquid in example 3 is shown on a plane defined by the London dispersion force $\delta_d$ and hydrogen bonding force $\delta_h$.
Figure 10B:
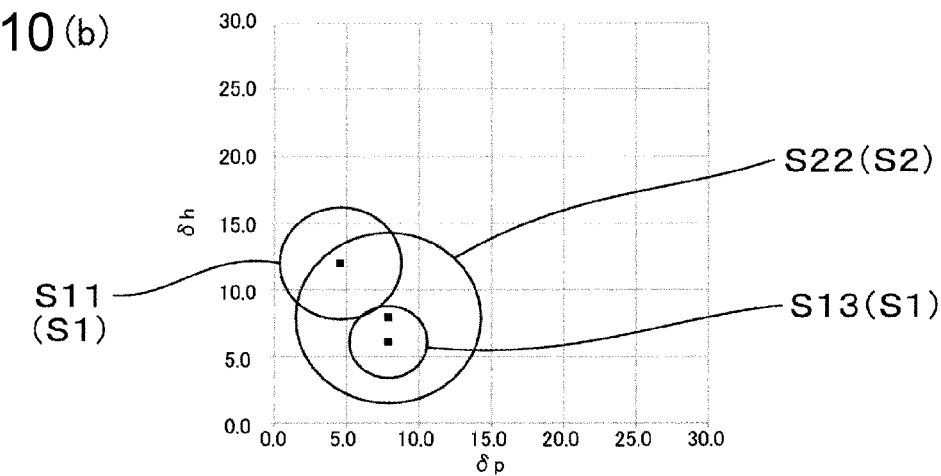
Figure 10C:
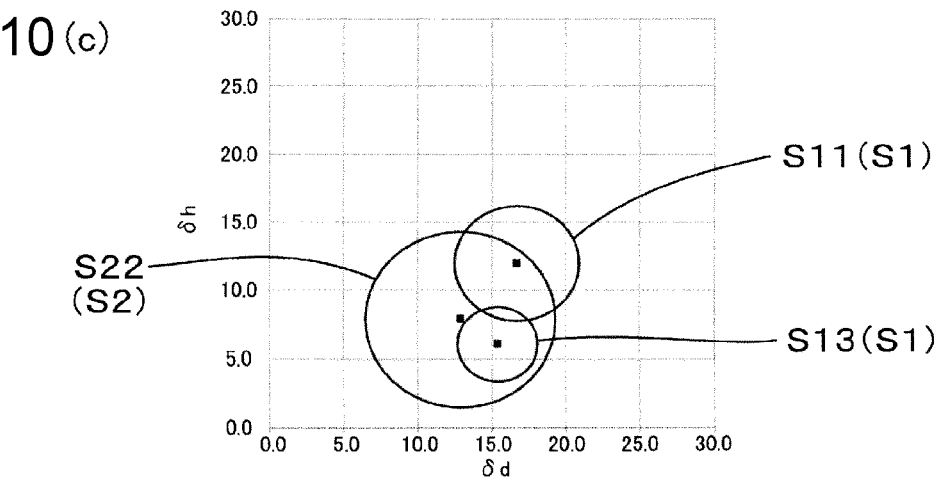
Figure 11A:
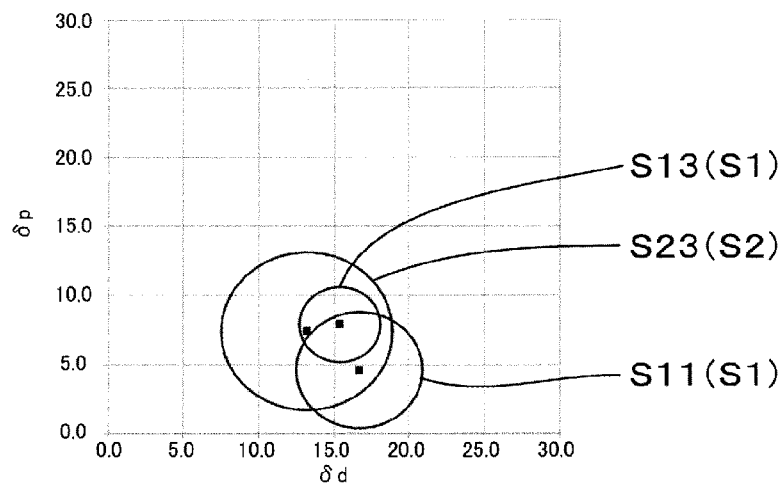
FIG. 11(a) is an explanatory diagram in which overlap of the Hansen spheres of solid particles and a liquid in example 4 is shown on a plane defined by the London dispersion force $\delta_d$ and dipole-dipole force $\delta_p$.
Figure 11B:
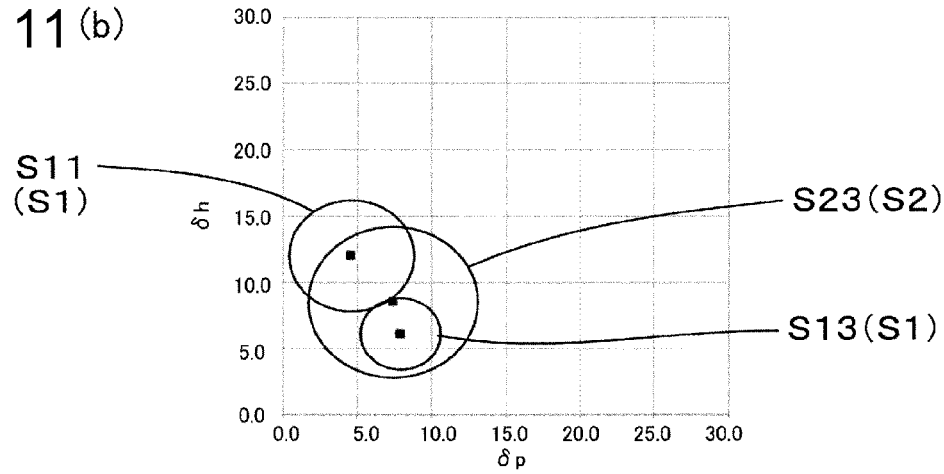
FIG. 11(b) is an explanatory diagram in which the overlap of the Hansen spheres of the solid particles and the liquid in example 4 is shown on a plane defined by the dipole-dipole force $\delta_p$ and hydrogen bonding force $\delta_h$.
Figure 11C:
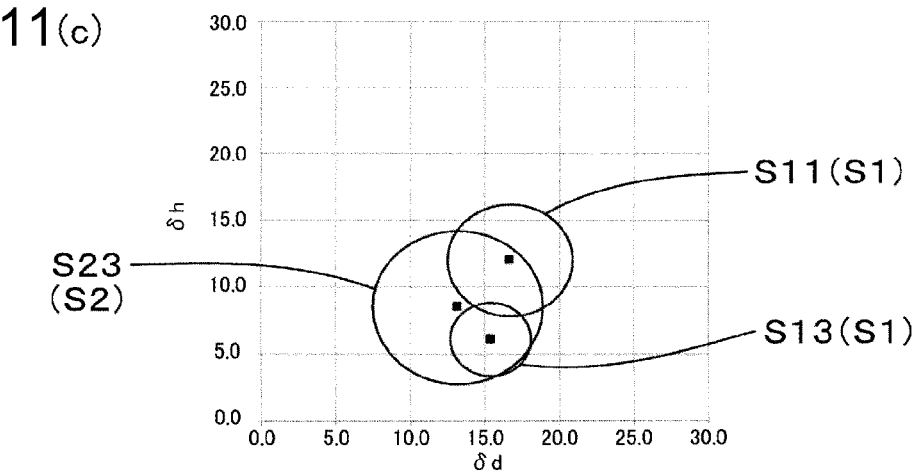
FIG. 11(c) is an explanatory diagram in which the overlap of the Hansen spheres of the solid particles and the liquid in example 4 is shown on a plane defined by the London dispersion force $\delta_d$ and hydrogen bonding force $\delta_h$.
Figure 12:
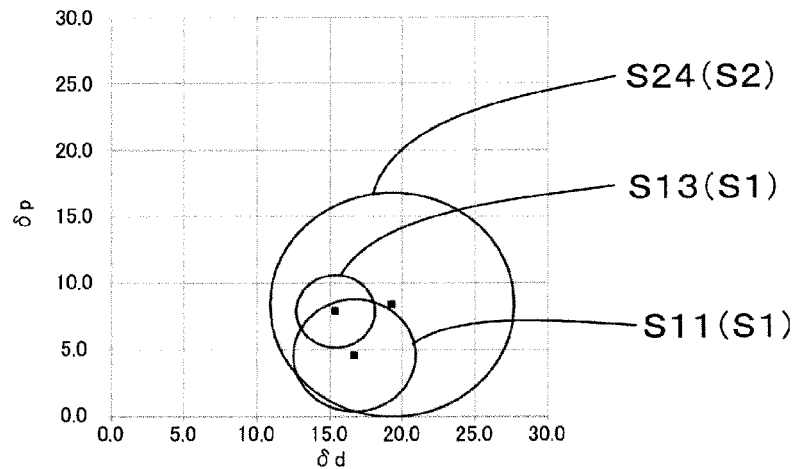
FIG. 12(a) is an explanatory diagram in which overlap of the Hansen spheres of solid particles and a liquid in example 5 is shown on a plane defined by the London dispersion force $\delta_d$ and dipole-dipole force $\delta_p$.
FIG. 12(b) is an explanatory diagram in which the overlap of the Hansen spheres of the solid particles and the liquid in example 5 is shown on a plane defined by the dipole-dipole force $\delta_p$ and hydrogen bonding force $\delta_h$ plane.
FIG. 12(c) is an explanatory diagram in which the overlap of the Hansen spheres of the solid particles and the liquid in example 5 is shown on a plane defined by the London dispersion force $\delta_d$ and hydrogen bonding force $\delta_h$.
Figure 12:
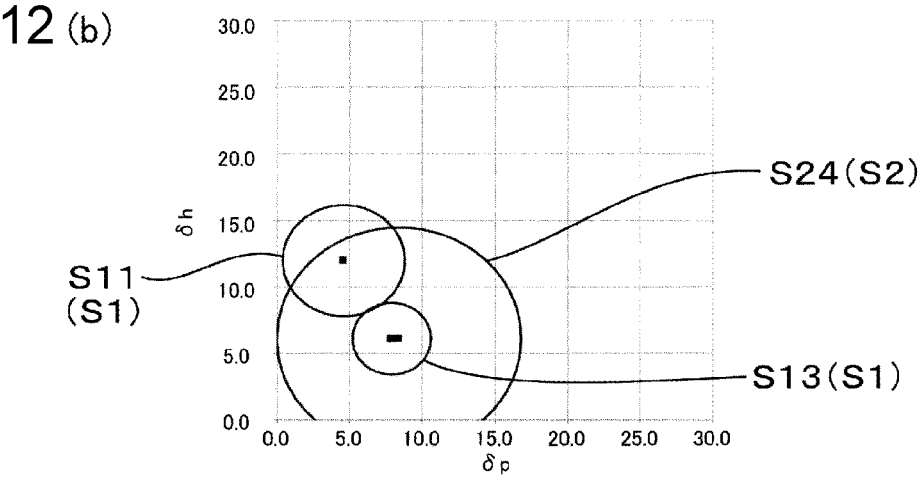
Figure 12:
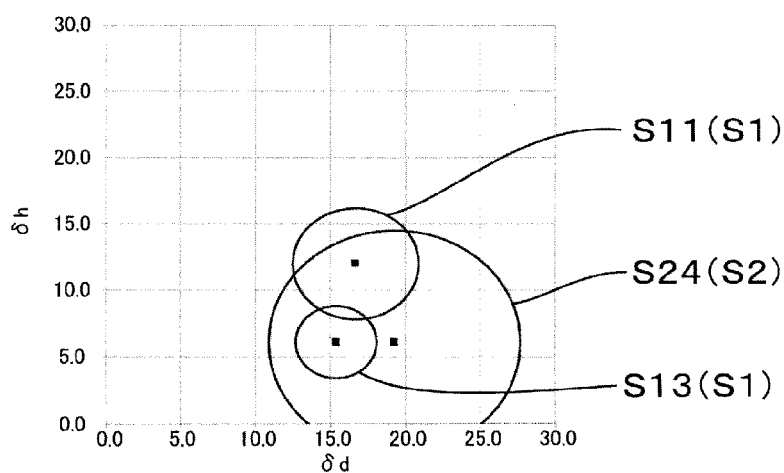
Figure 13A:
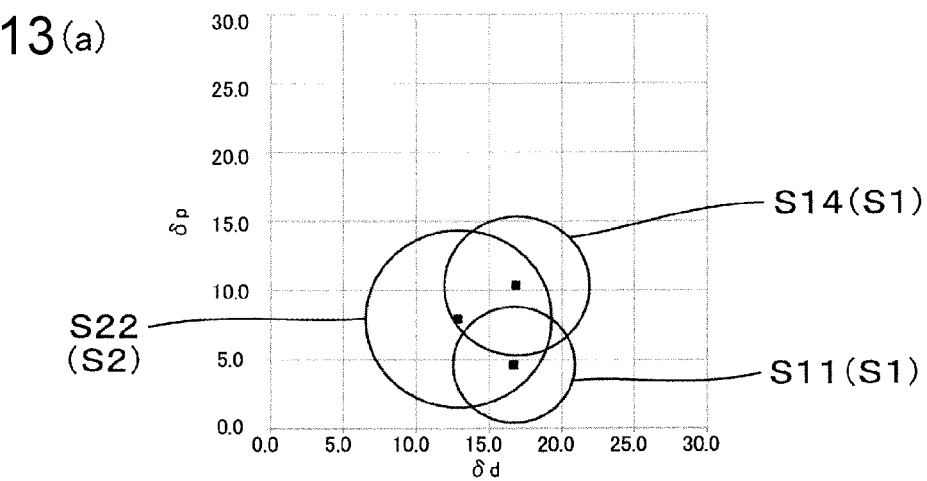
FIG. 13(a) is an explanatory diagram in which overlap of the Hansen spheres of solid particles and a liquid in example 6 is shown on a plane defined by the London dispersion force $\delta_d$ and dipole-dipole force $\delta_p$.
Figure 13B:
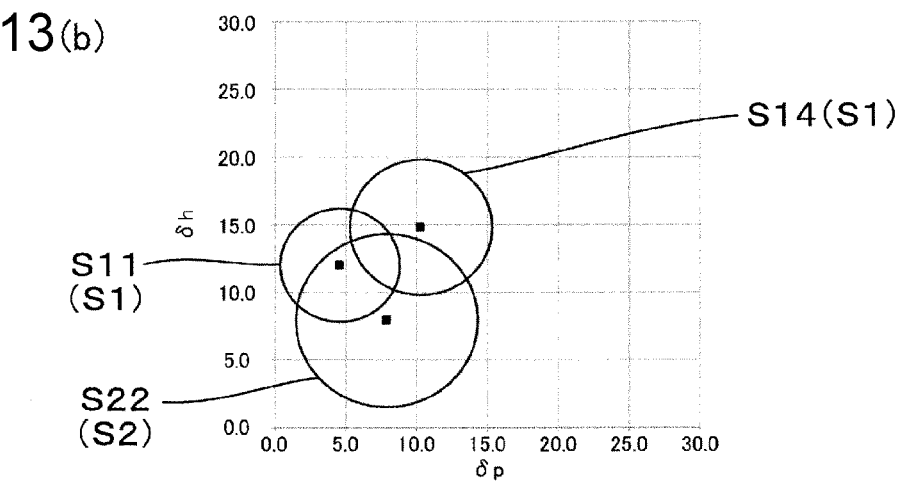
FIG. 13(b) is an explanatory diagram in which the overlap of the Hansen spheres of the solid particles and the liquid in example 6 is shown on a plane defined by the dipole-dipole force $\delta_p$ and hydrogen bonding force $\delta_h$.
Figure 13C:
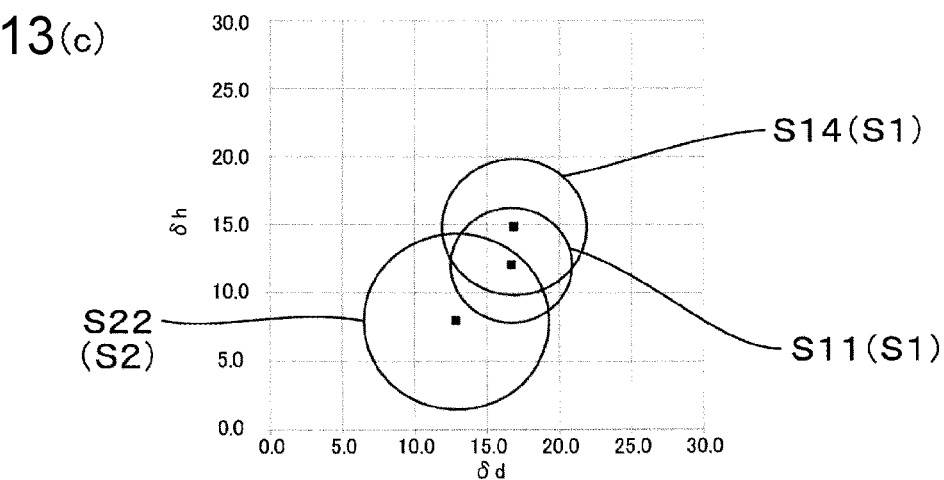
FIG. 13(c) is an explanatory diagram in which the overlap of the Hansen spheres of the solid particles and the liquid in example 6 is shown on a plane defined by the London dispersion force $\delta_d$ and hydrogen bonding force $\delta_h$.
Figure 14:
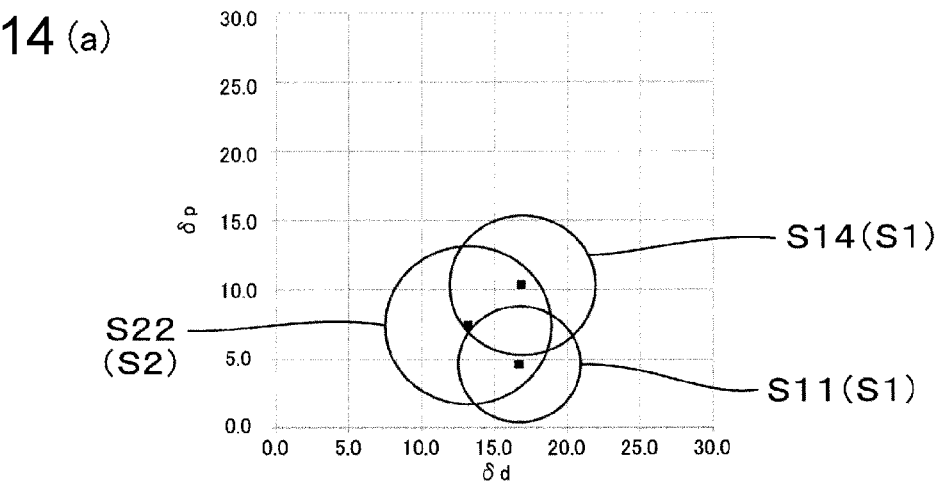
FIG. 14(a) is an explanatory diagram in which overlap of the Hansen spheres of solid particles and a liquid in example 7 is shown on a plane defined by the London dispersion force $\delta_d$ and dipole-dipole force $\delta_p$.
FIG. 14(b) is an explanatory diagram in which the overlap of the Hansen spheres of the solid particles and the liquid in example 7 is shown on a plane defined by the dipole-dipole force $\delta_p$ and hydrogen bonding force $\delta_h$.
FIG. 14(c) is an explanatory diagram in which the overlap of the Hansen spheres of the solid particles and the liquid in example 7 is shown on a plane defined by the London dispersion force $\delta_d$ and hydrogen bonding force $\delta_h$.
Figure 14:
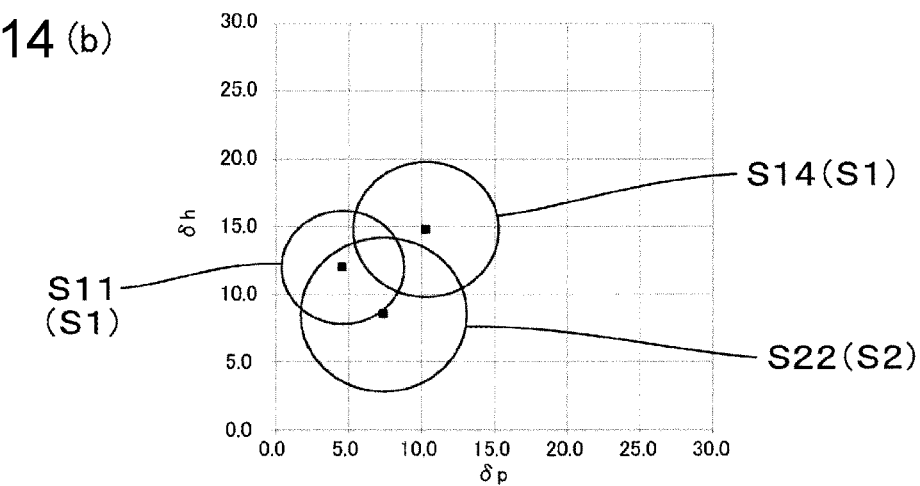
Figure 14:
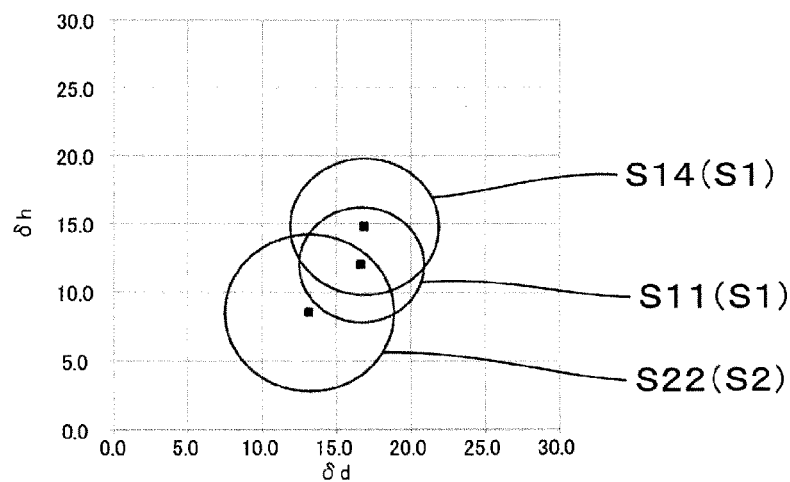
Figure 15A:
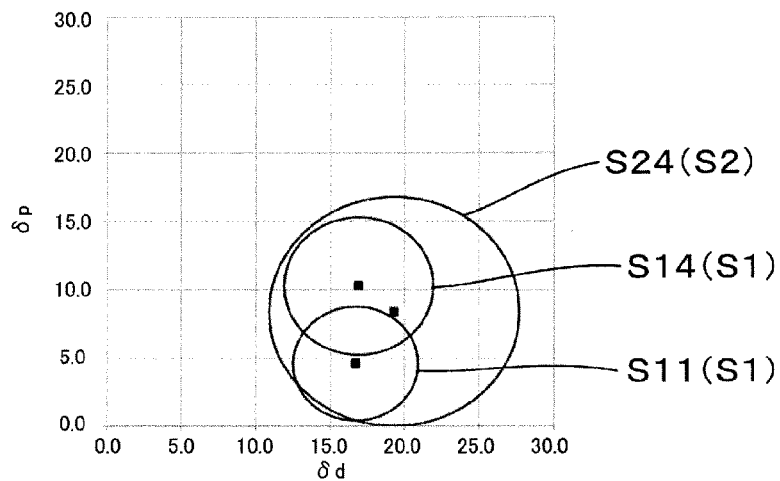
FIG. 15(a) is an explanatory diagram in which overlap of the Hansen spheres of solid particles and a liquid in example 8 is shown on a plane defined by the London dispersion force $\delta_d$ and dipole-dipole force $\delta_p$.
Figure 15B:
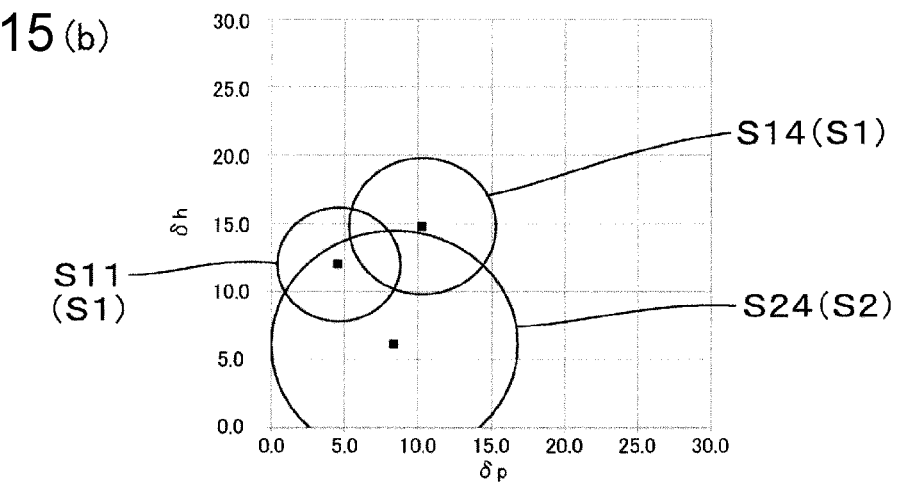
FIG. 15(b) is an explanatory diagram in which the overlap of the Hansen spheres of the solid particles and the liquid in example 8 is shown on a plane defined by the dipole-dipole force $\delta_p$ and hydrogen bonding force $\delta_h$.
Figure 15C:
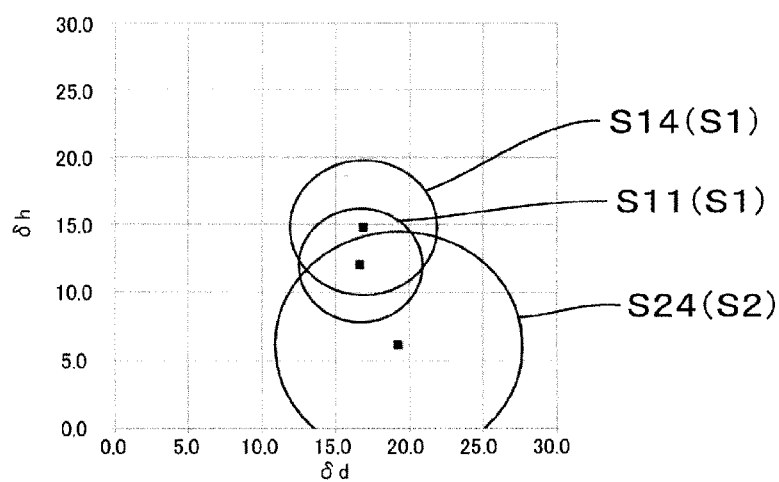
FIG. 15(c) is an explanatory diagram in which the overlap of the Hansen spheres of the solid particles and the liquid in example 8 is shown on a plane defined by the London dispersion force $\delta_d$ and hydrogen bonding force $\delta_h$.
Figure 16:
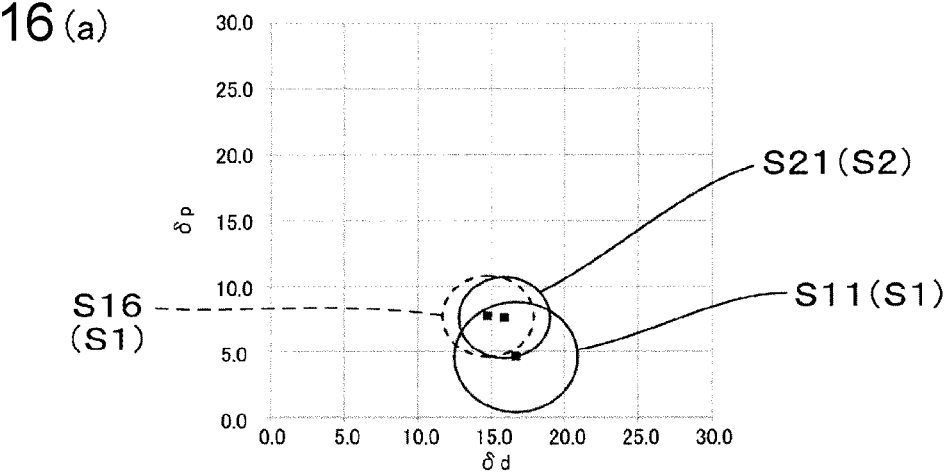
FIG. 16(a) is an explanatory diagram in which overlap of the Hansen spheres of solid particles and a liquid in example 9 is shown on a plane defined by the London dispersion force $\delta_d$ and dipole-dipole force $\delta_p$.
FIG. 16(b) is an explanatory diagram in which the overlap of the Hansen spheres of the solid particles and the liquid in example 9 is shown on a plane defined by the dipole-dipole force $\delta_p$ and hydrogen bonding force $\delta_h$.
FIG. 16(c) is an explanatory diagram in which the overlap of the Hansen spheres of the solid particles and the liquid in example 9 is shown on a plane defined by the London dispersion force $\delta_d$ and hydrogen bonding force $\delta_h$.
Figure 16:
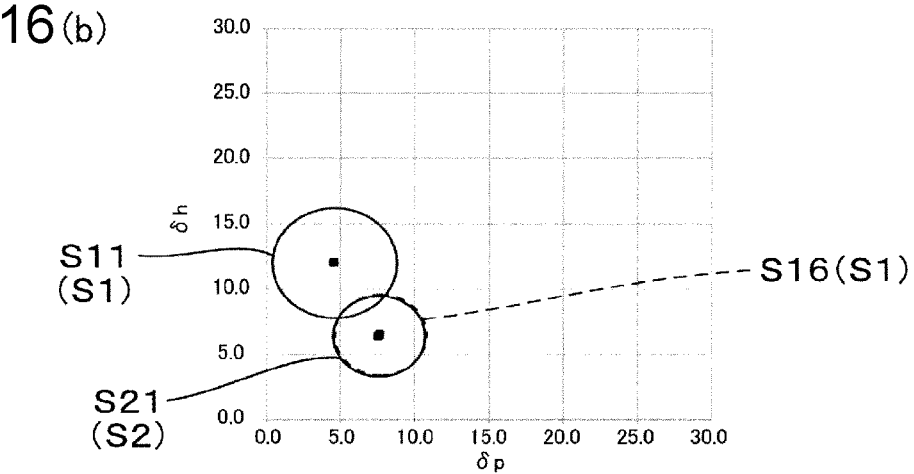
Figure 16:
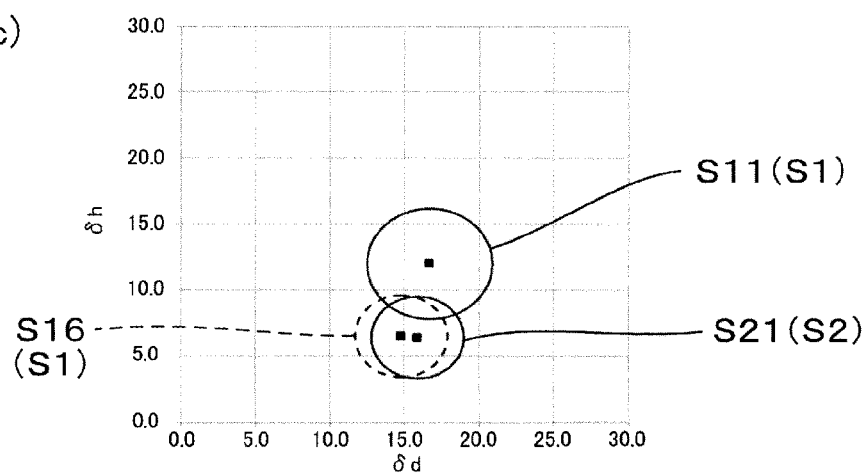
Figure 17A:
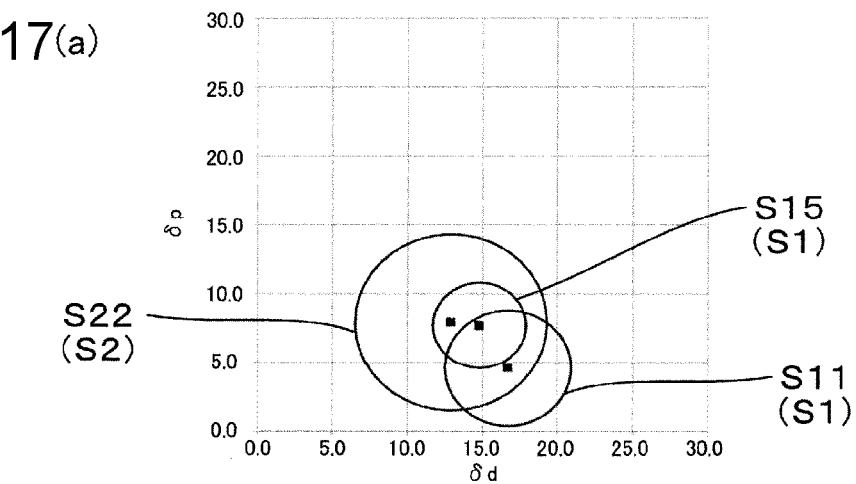
FIG. 17(a) is an explanatory diagram in which overlap of the Hansen spheres of solid particles and a liquid in example 10 is shown on a plane defined by the London dispersion force $\delta_d$ and dipole-dipole force $\delta_p$.
Figure 17B:
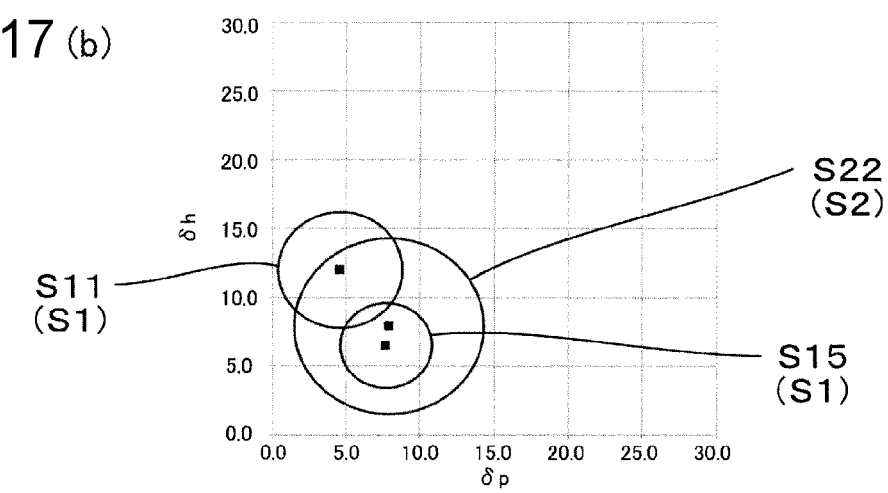
FIG. 17(b) is an explanatory diagram in which the overlap of the Hansen spheres of the solid particles and the liquid in example 10 is shown on a plane defined by the dipole-dipole force $\delta_p$ and hydrogen bonding force $\delta_h$.
Figure 17C:
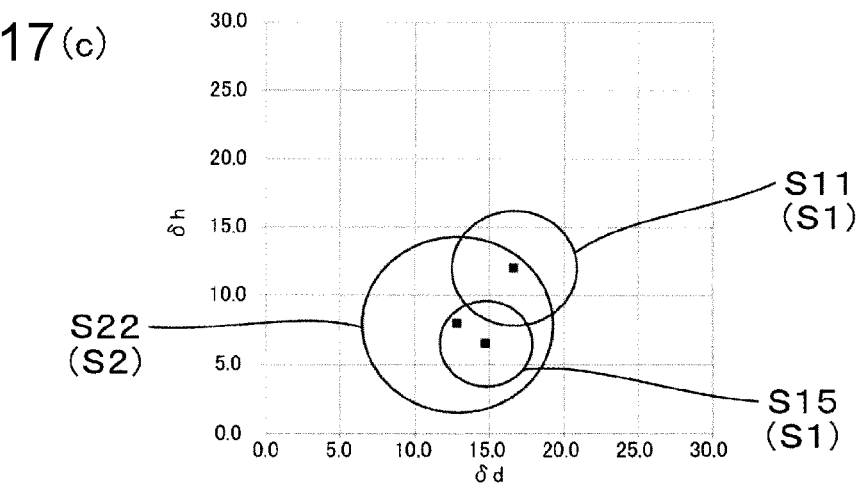
FIG. 17(c) is an explanatory diagram in which the overlap of the Hansen spheres of the solid particles and the liquid in example 10 is shown on a plane defined by the London dispersion force $\delta_d$ and hydrogen bonding force $\delta_h$.
Figure 18A:
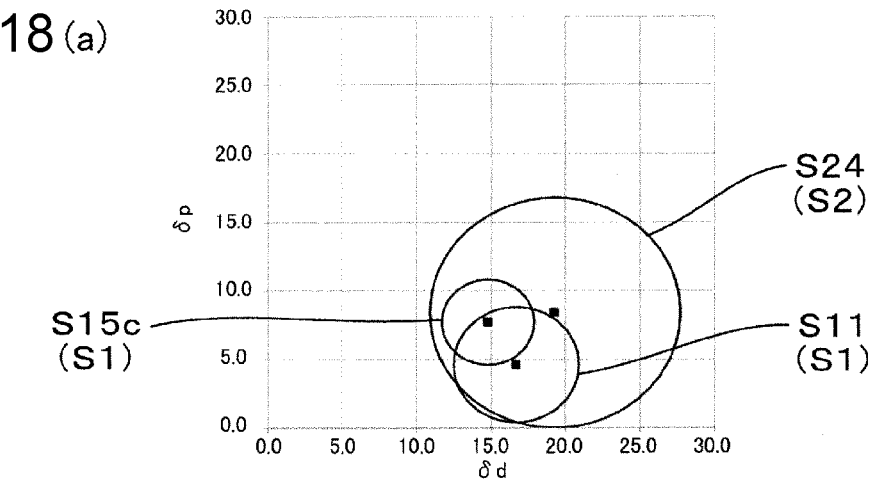
FIG. 18(a) is an explanatory diagram in which overlap of the Hansen spheres of solid particles and a liquid in example 11 is shown on a plane defined by the London dispersion force $\delta_d$ and dipole-dipole force $\delta_p$.
Figure 18B:
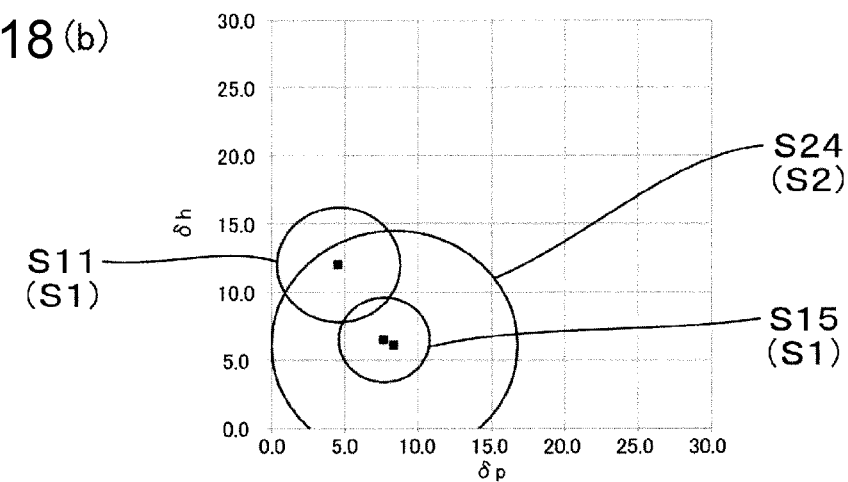
FIG. 18(b) is an explanatory diagram in which the overlap of the Hansen spheres of the solid particles and the liquid in example 11 is shown on a plane defined by the dipole-dipole force $\delta_p$ and hydrogen bonding force $\delta_h$.
Figure 18C:
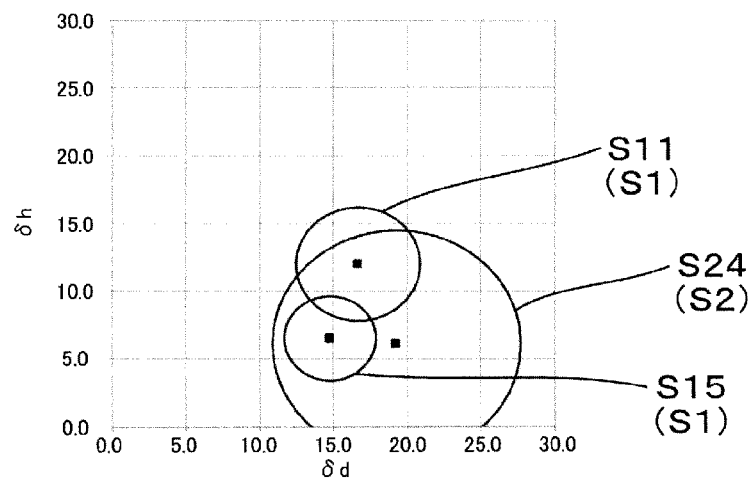
FIG. 18(c) is an explanatory diagram in which the overlap of the Hansen spheres of the solid particles and the liquid in example 11 is shown on a plane defined by the London dispersion force $\delta_d$ and hydrogen bonding force $\delta_h$.
Figure 19A:
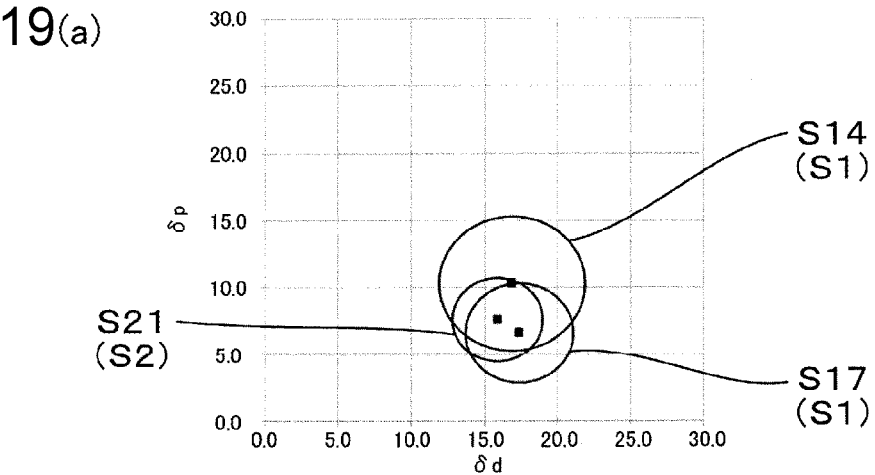
FIG. 19(a) is an explanatory diagram in which overlap of the Hansen spheres of solid particles and a liquid in comparative example 5 is shown on a plane defined by the London dispersion force $\delta_d$ and dipole-dipole force $\delta_p$.
Figure 19B:
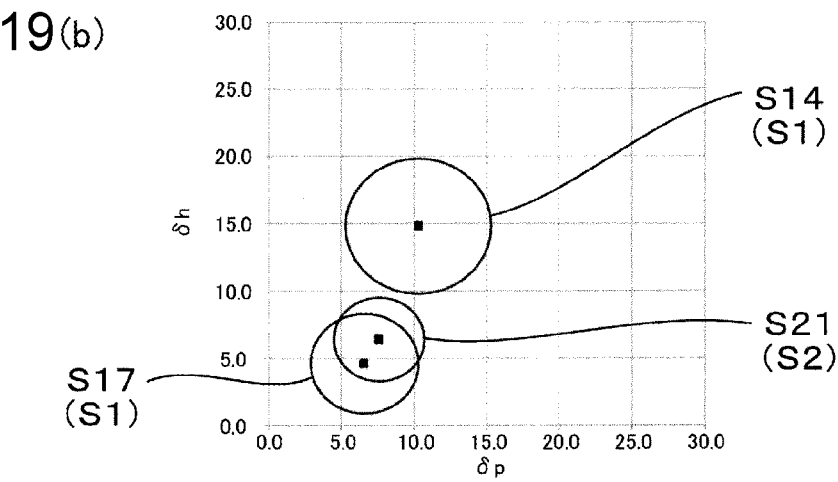
FIG. 19(b) is an explanatory diagram in which the overlap of the Hansen spheres of the solid particles and the liquid in comparative example 5 is shown on a plane defined by the dipole-dipole force $\delta_p$ and hydrogen bonding force $\delta_h$.
Figure 19C:
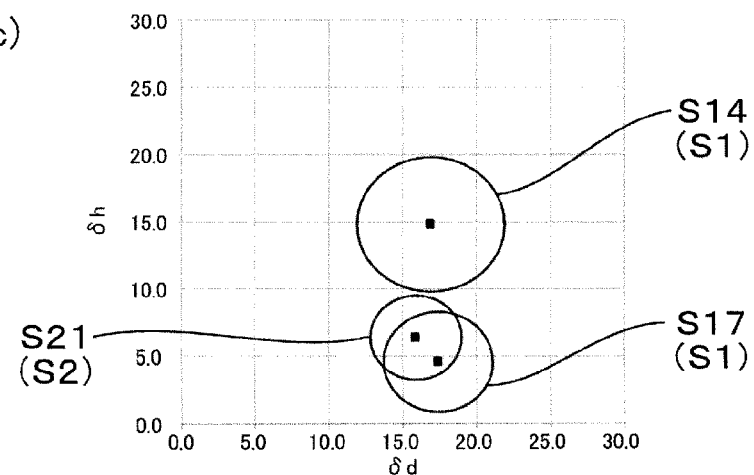
FIG. 19(c) is an explanatory diagram in which the overlap of the Hansen spheres of the solid particles and the liquid in comparative example 5 is shown on a plane defined by the London dispersion force $\delta_d$ and hydrogen bonding force $\delta_h$.
Figure 20A:
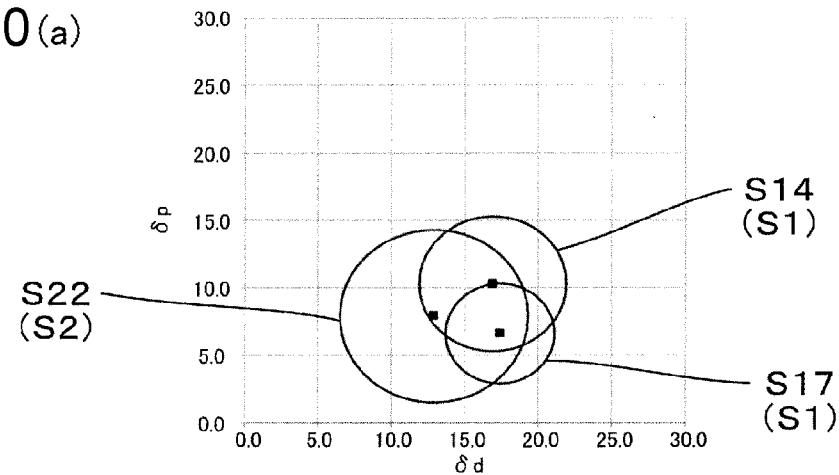
FIG. 20(a) is an explanatory diagram in which overlap of the Hansen spheres of solid particles and a liquid in comparative example 6 is shown on a plane defined by the London dispersion force $\delta_d$ and dipole-dipole force $\delta_p$.
Figure 20B:
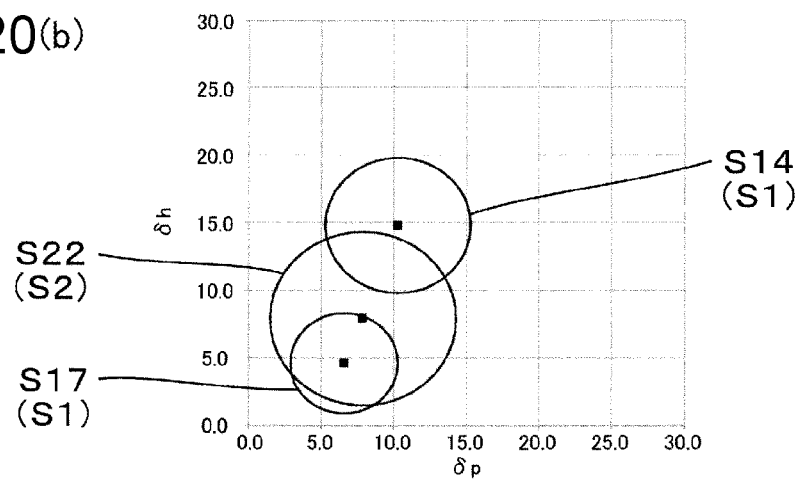
FIG. 20(b) is an explanatory diagram in which the overlap of the Hansen spheres of the solid particles and the liquid in comparative example 6 is shown on a plane defined by the dipole-dipole force $\delta_p$ and hydrogen bonding force $\delta_h$.
Figure 20C:
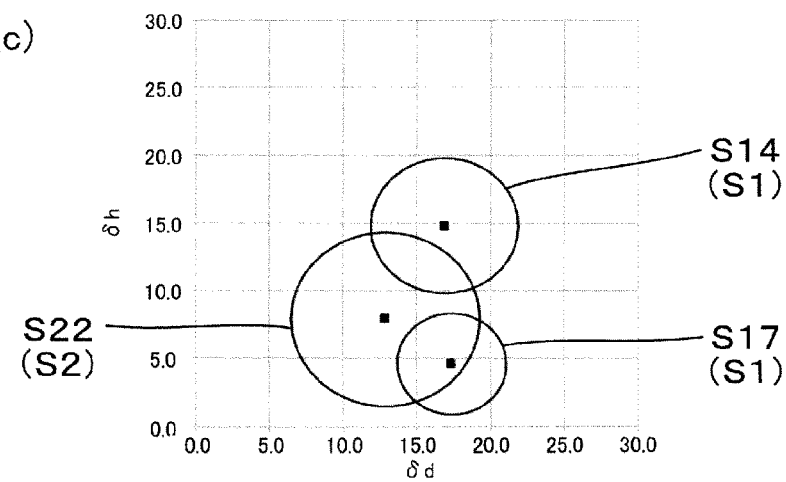
FIG. 20(c) is an explanatory diagram in which the overlap of the Hansen spheres of the solid particles and the liquid in comparative example 6 is shown on a plane defined by the London dispersion force $\delta_d$ and hydrogen bonding force $\delta_h$.
Figure 21A:
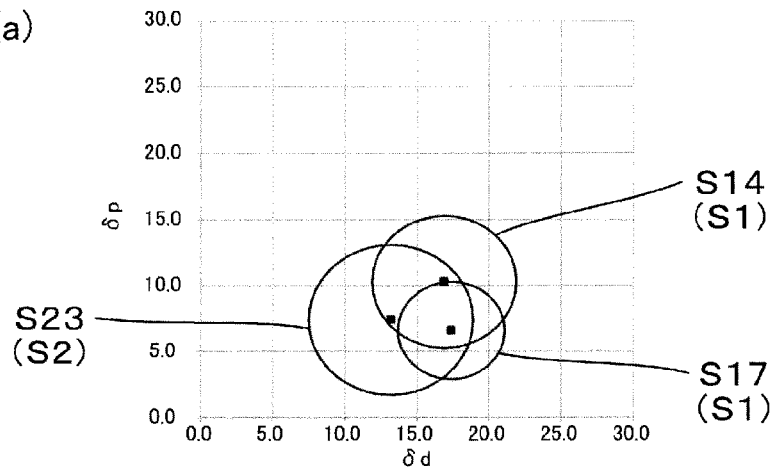
FIG. 21(a) is an explanatory diagram in which overlap of the Hansen spheres of solid particles and a liquid in comparative example 7 is shown on a plane defined by the London dispersion force $\delta_d$ and dipole-dipole force $\delta_p$.
Figure 21B:
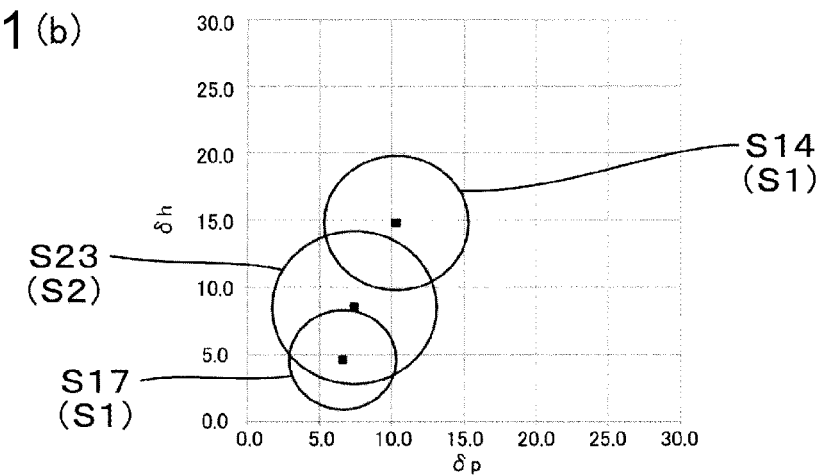
FIG. 21(b) is an explanatory diagram in which the overlap of the Hansen spheres of the solid particles and the liquid in comparative example 7 is shown on a plane defined by the dipole-dipole force $\delta_p$ and hydrogen bonding force $\delta_h$, and FIG. 21(*c*) is an explanatory diagram in which the overlap of the Hansen spheres of the solid particles and the liquid in comparative example 7 is shown on a plane defined by the London dispersion force $\delta_d$ and hydrogen bonding force $\delta_h$.
Figure 21C:
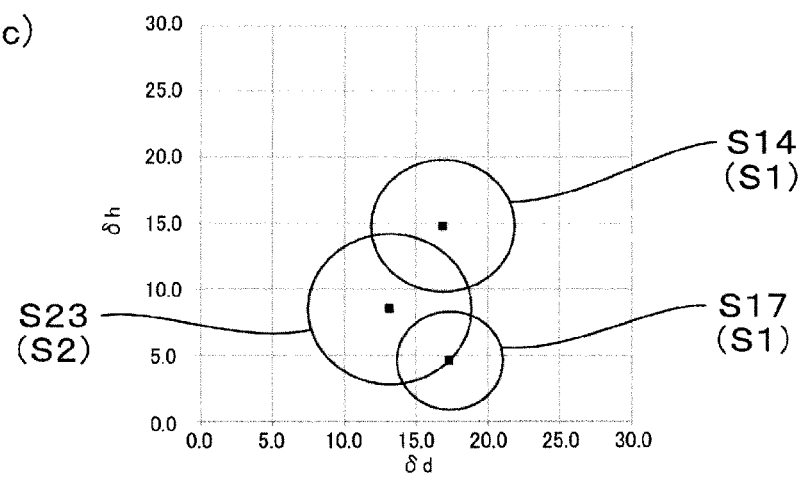
Figure 22:
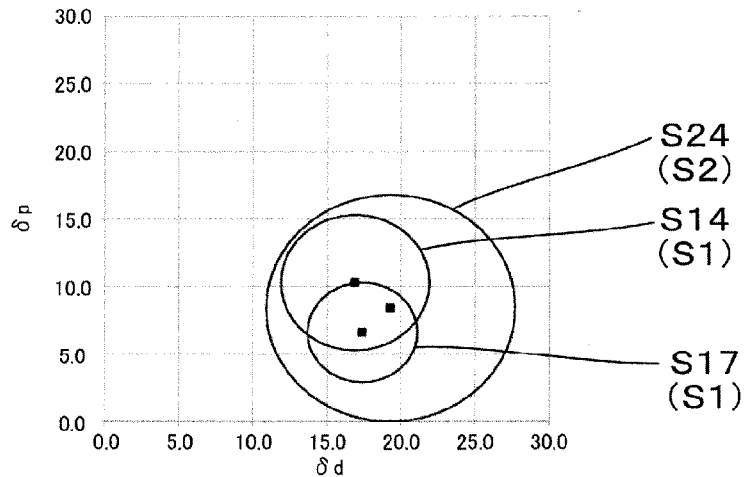
FIG. 22(*a*) is an explanatory diagram in which overlap of the Hansen spheres of solid particles and a liquid in comparative example 8 is shown on a plane defined by the London dispersion force $\delta_d$ and dipole-dipole force $\delta_p$, FIG. 22(*b*) is an explanatory diagram in which the overlap of the Hansen spheres of the solid particles and the liquid in comparative example 8 is shown on a plane defined by the dipole-dipole force $\delta_p$ and hydrogen bonding force $\delta_h$, and FIG. 22(*c*) is an explanatory diagram in which the overlap of the Hansen spheres of the solid particles and the liquid in comparative example 8 is shown on a plane defined by the London dispersion force $\delta_d$ and hydrogen bonding force $\delta_h$.
Figure 22:
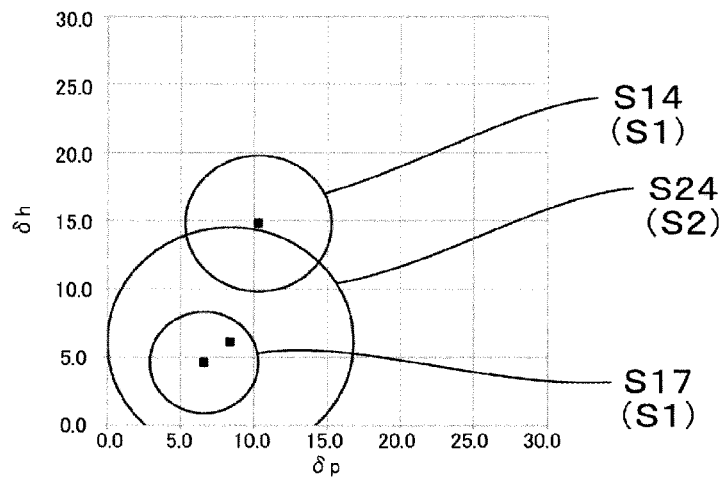
Figure 22:
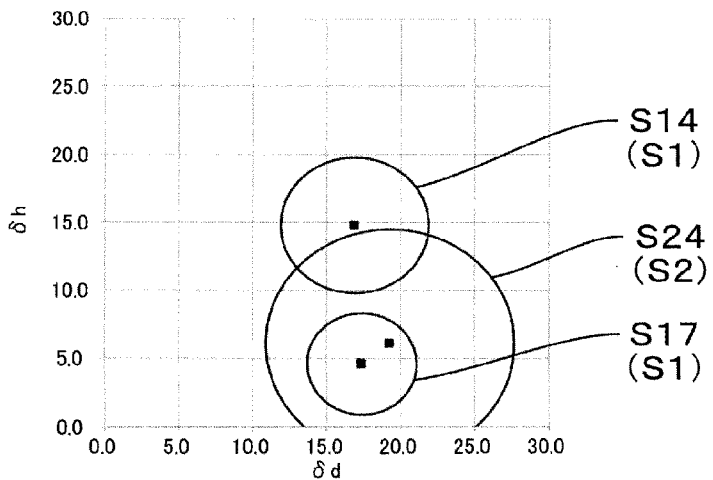
Figure 23A:
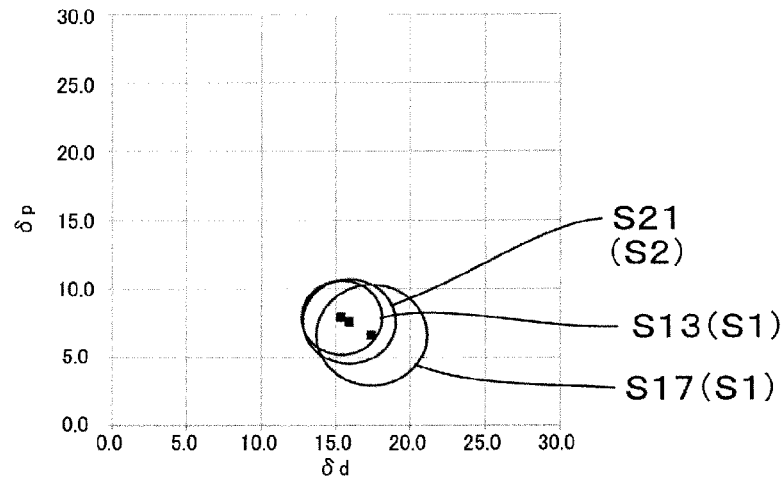
FIG. 23(*a*) is an explanatory diagram in which overlap of the Hansen spheres of solid particles and a liquid in example 12 is shown on a plane defined by the London dispersion force $\delta_d$ and dipole-dipole force $\delta_p$, FIG. 23(*b*) is an explanatory diagram in which the overlap of the Hansen spheres of the solid particles and the liquid in example 12 is shown on a plane defined by the dipole-dipole force $\delta_p$ and hydrogen bonding force $\delta_h$, and FIG. 23(*c*) is an explanatory diagram in which the overlap of the Hansen spheres of the solid particles and the liquid in example 12 is shown on a plane defined by the London dispersion force $\delta_d$ and hydrogen bonding force $\delta_h$.
Figure 23B:
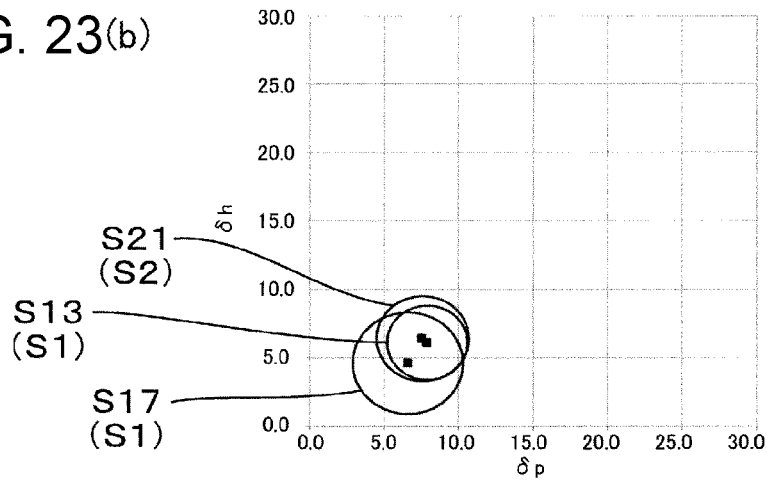
Figure 23C:
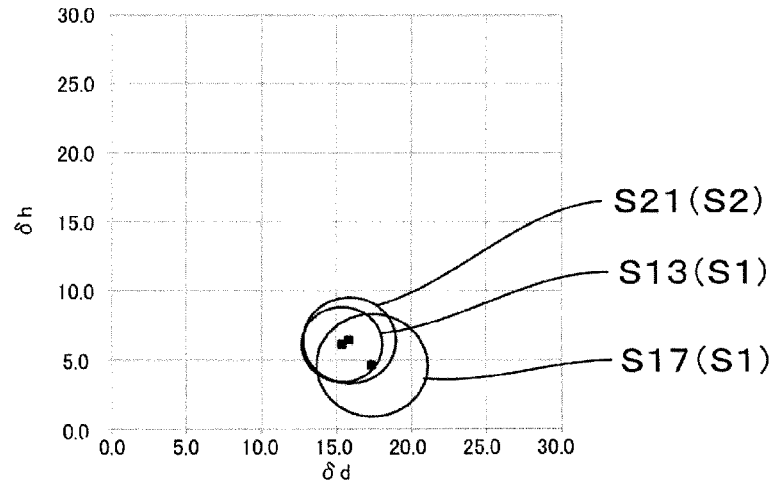
Figure 24:
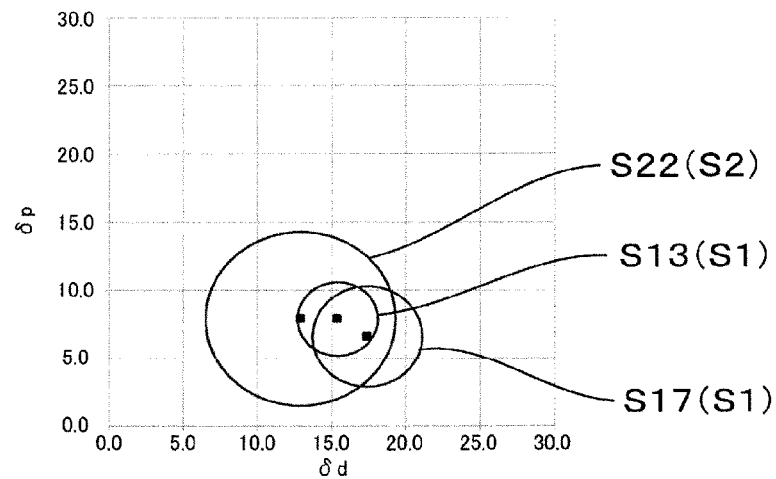
FIG. 24(*a*) is an explanatory diagram in which overlap of the Hansen spheres of solid particles and a liquid in example 13 is shown on a plane defined by the London dispersion force $\delta_d$ and dipole-dipole force $\delta_p$, FIG. 24(*b*) is an explanatory diagram in which the overlap of the Hansen spheres of the solid particles and the liquid in example 13 is shown on a plane defined by the dipole-dipole force $\delta_p$ and hydrogen bonding force $\delta_h$, and FIG. 24(*c*) is an explanatory diagram in which the overlap of the Hansen spheres of the solid particles and the liquid in example 13 is shown on a plane defined by the London dispersion force $\delta_d$ and hydrogen bonding force $\delta_h$.
Figure 24:
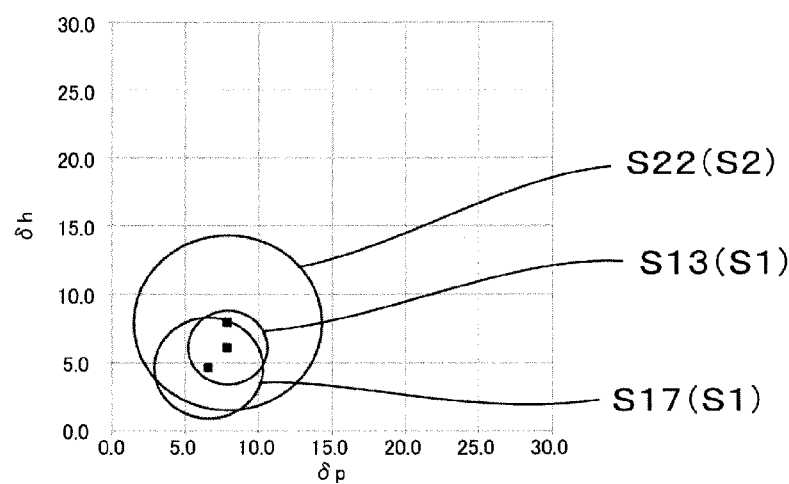
Figure 24:
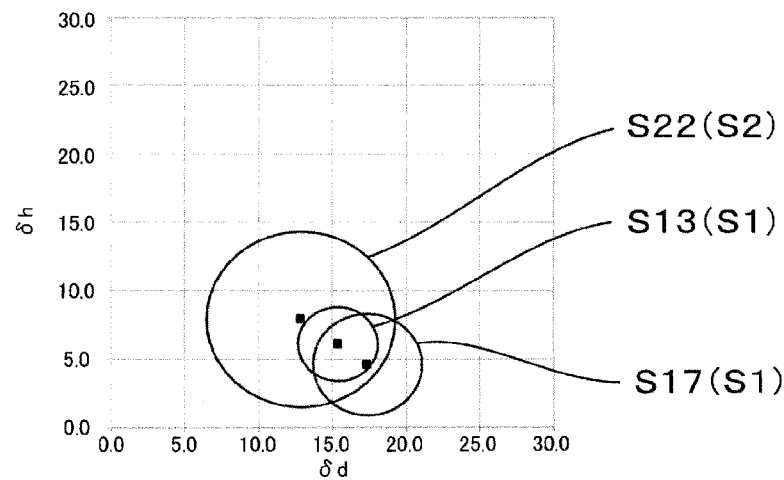
Figure 25A:
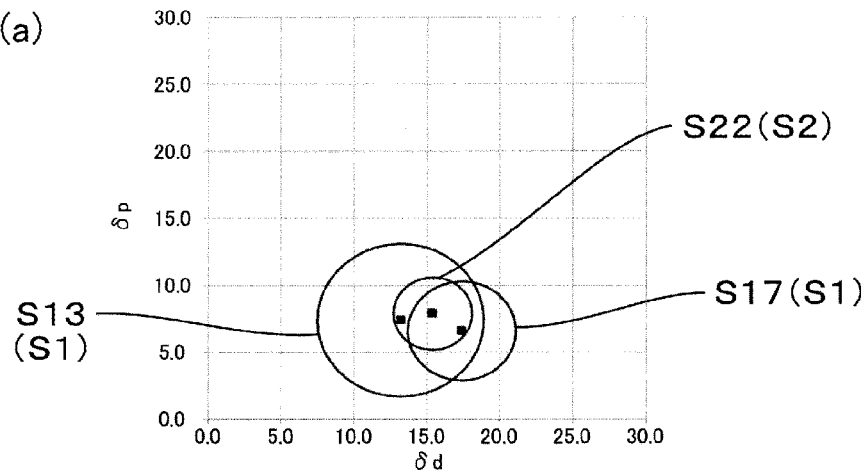
FIG. 25(*a*) is an explanatory diagram in which overlap of the Hansen spheres of solid particles and a liquid in example 14 is shown on a plane defined by the London dispersion force $\delta_d$ and dipole-dipole force $\delta_p$, FIG. 25(*b*) is an explanatory diagram in which the overlap of the Hansen spheres of the solid particles and the liquid in example 14 is shown on a plane defined by the dipole-dipole force $\delta_p$ and hydrogen bonding force $\delta_h$, and FIG. 25(*c*) is an explanatory diagram in which the overlap of the Hansen spheres of the solid particles and the liquid in example 14 is shown on a plane defined by the London dispersion force $\delta_d$ and hydrogen bonding force $\delta_h$.
Figure 25B:
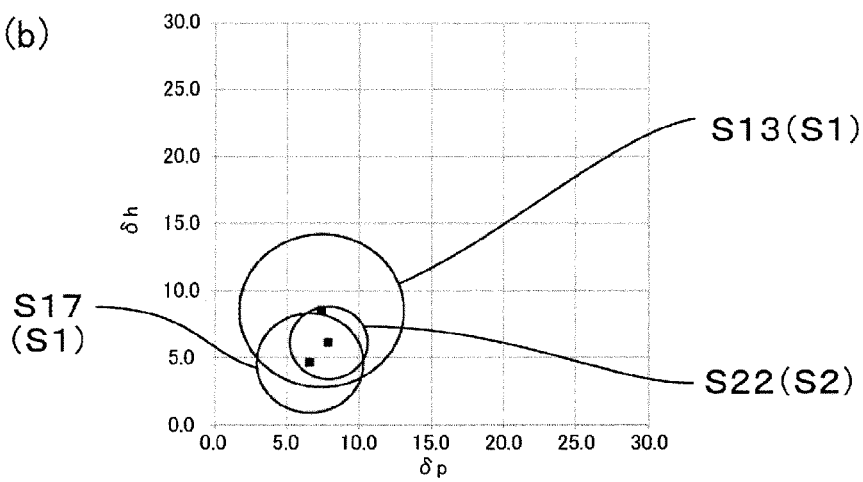
Figure 25C:
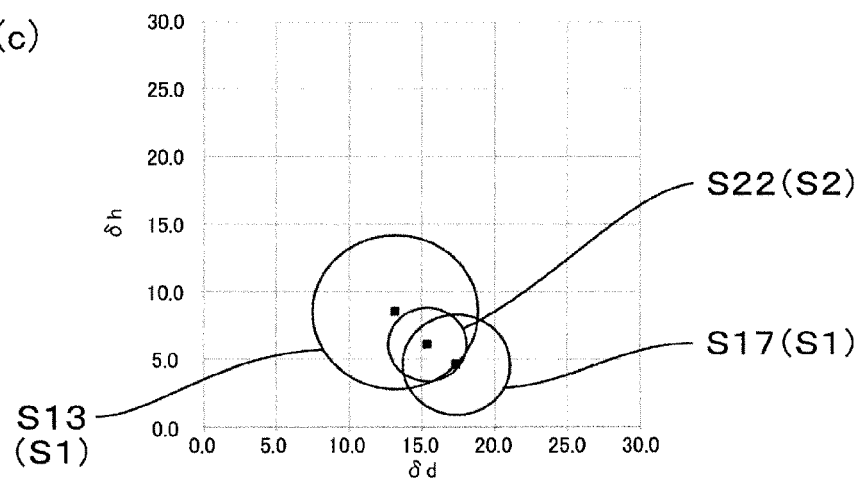
Figure 26A:
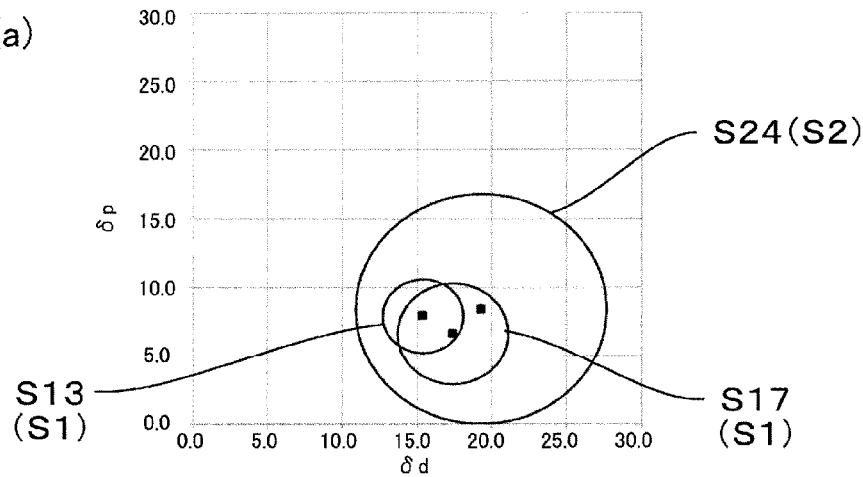
FIG. 26(*a*) is an explanatory diagram in which overlap of the Hansen spheres of solid particles and a liquid in example 15 is shown on a plane defined by the London dispersion force $\delta_d$ and dipole-dipole force $\delta_p$, FIG. 26(*b*) is an explanatory diagram in which the overlap of the Hansen spheres of the solid particles and the liquid in example 15 is shown on a plane defined by the dipole-dipole force $\delta_p$ and hydrogen bonding force $\delta_h$, and FIG. 26(*c*) is an explanatory diagram in which the overlap of the Hansen spheres of the solid particles and the liquid in example 15 is shown on a plane defined by the London dispersion force $\delta_d$ and hydrogen bonding force $\delta_h$.
Figure 26B:
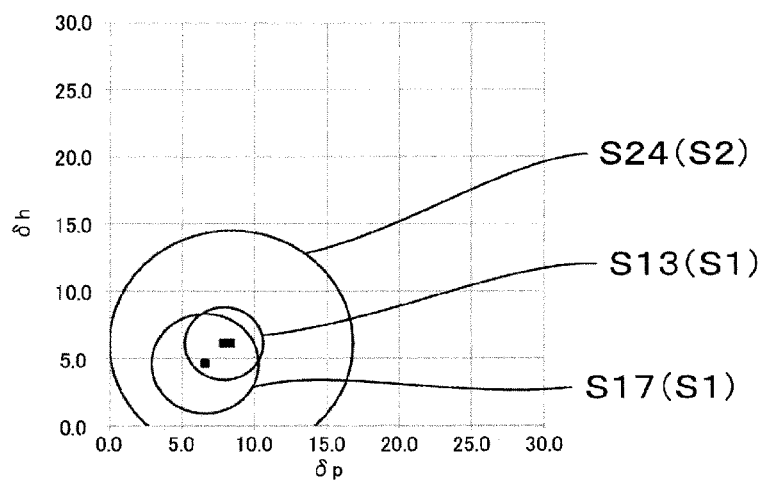
Figure 26C:
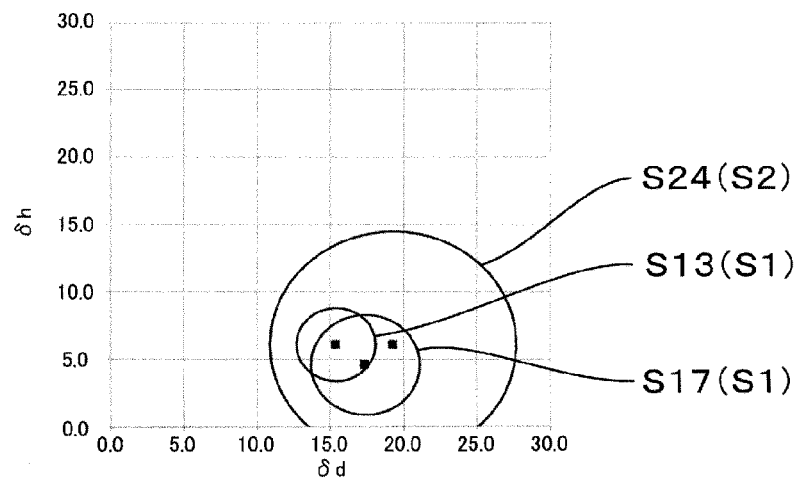

An embodiment in which a honeycomb structure 2 is manufactured as a ceramic sintered body 1 using a dispersion body will be described. As shown in FIG. 3, for example, the honeycomb structure 2 has a circular cylindrical outer skin 21 and partition walls 23 that partition an interior of the outer skin 21 into numerous cells 22. The partition walls 23 are provided in a lattice shape. The cell 22 extends along an axial direction X of the outer skin 21. The axial direction X of the outer skin 21 is also an axial direction X of the honeycomb structure 2.

As the honeycomb structure 2, there is a monolith substrate that is used to carry an exhaust gas purification catalyst such as a noble metal catalyst, and an exhaust gas purification filter that forms a sealing portion and is used to collect particulate matter in the exhaust gas. Although illustration of the sealing portion is omitted, the sealing portion is formed on both ends 28 and 29 in the axial direction X of the honeycomb structure 2. In each cell 22, a first end 28 or a second end 29 is sealed by the sealing portion. In the first end 28 or the second end 29, the sealing portions and open portions that are not sealed by the sealing portion are arranged in a checkerboard pattern. Hereafter, the honeycomb structure for the monolith substrate is referred to as a "first honeycomb structure" and the honeycomb structure for the exhaust gas purification filter is referred to as a "second honeycomb structure."

The first honeycomb structure and the second honeycomb structure both have the honeycomb structure shown in FIG. 3, and are composed of cordierite, SiC, aluminum titanate, or the like. For example, even in the case of a same cordierite, because required performance, such as heat resistance, strength, and porosity, differs between the first honeycomb structure and the second honeycomb structure, differing raw materials are used.

When the first honeycomb structure is composed of cordierite, the raw material is selected from kaolin, aluminum hydroxide, silica, alumina, talc, and a pore-forming material. In addition, when the second honeycomb structure is composed of cordierite, the raw material is selected from silica, such as porous silica, aluminum hydroxide, talc, and a pore-forming material. Meanwhile, to improve wettability between the raw material and water, and improve dispersibility, a lubricating oil or a dispersant is used as the non-aqueous liquid.

A manufacturing method for the honeycomb structure is as follows. First, the solid particles of the raw material that is selected from a candidate group, the non-aqueous liquid that is selected from a candidate group, and water are mixed and kneaded, and a green body is thereby prepared. This green body is the dispersion body. Next, the green body is extruded into a honeycomb shape and a molded body is obtained. As a result of the molded body being dried and fired, the honeycomb structure is obtained.

A green body that has favorable dispersibility can be obtained by the solid particles and the non-aqueous liquid being selected and the green body being prepared as according to the first and second embodiments. As a result, occurrence of defects, such as cracks and distortion of cells, after firing can be prevented. As a result of the dispersion body according to the first embodiment and the second embodiment being used, even in cases in which the ceramic sintered body 1 has a thin portion, such as the partition wall 23 of the honeycomb structure 2, occurrence of an abnormality in shape in the thin portion after molding or after firing can be prevented. In addition, a dispersion body that is in a high-dispersion state can be obtained even when the amount of non-aqueous liquid is reduced. Therefore, imbalance in a non-aqueous liquid component within the green body is reduced. Consequently, stress during firing is suppressed, and defects that may occur in the sintered body can be further prevented.

Experiment Example 1

A present example is an example in which solid particles and a non-aqueous liquid that are used to manufacture a honeycomb structure that is composed of cordierite are selected from candidate groups. Specifically, the solid particles and the non-aqueous liquid that are used to manufacture the first honeycomb structure for the monolith substrate are selected.

In the present example, in the manufacturing of the first honeycomb structure, aluminum hydroxide, alumina, silica, and talc were used as the solid particles of the raw material of the first honeycomb structure. In addition, a dispersion body was manufactured by these raw materials, water, and a liquid dispersant being mixed. The dispersion body was then molded, dried, and fired and the honeycomb structure was thereby manufactured. First, the HSP values of the solid particles and the non-aqueous liquid that are used as the raw materials of the honeycomb structure were measured using the method described according to the first embodiment.

Tables 2 to 4 show measurement targets for the HSP value, and the solvent reagents that were used for the measurement. A circle mark in the table indicates that the corresponding solvent reagent was used. A blank field indicates that the corresponding solvent reagent was not used. Here, Tables 2 to 4 also show measurement targets that serve as the manufacturing raw materials of the second honeycomb structure for the exhaust gas purification filter, described in experiment example 2, and the solvent reagents. Here, in the tables, the measurement targets to which a letter of the alphabet is attached indicate measurement targets that differ in manufacturer, place of production, product name (product number), and the like.

TABLE 2

| Reagent No. | Category | Solvent reagent | Aluminum hydroxide A | Aluminum hydroxide D | Alumina | Silica | Talc A | Kaolin |
|---|---|---|---|---|---|---|---|---|
| R1 | First Group | 1-Butanol | ○ | ○ | ○ | ○ | ○ | ○ |
| R2 | First Group | Tetrahydrofuran (THF) | ○ | ○ | ○ | ○ | ○ | ○ |
| R3 | Second Group | Acetic Acid | ○ | | ○ | ○ | ○ | ○ |
| R4 | First Group | 1,4-Dioxane | ○ | ○ | ○ | ○ | ○ | ○ |
| R5 | Second Group | Dimethyl Formamide (DMF) | ○ | ○ | ○ | ○ | ○ | ○ |
| R6 | First Group | Ethanol | ○ | ○ | ○ | ○ | ○ | ○ |
| R7 | Second Group | N-Methyl Formamide | ○ | ○ | ○ | ○ | ○ | ○ |
| R8 | Second Group | 2-Propanol | ○ | | ○ | ○ | ○ | ○ |
| R9 | First Group | Dimethyl Sulfoxide (DMSO) | ○ | ○ | ○ | ○ | ○ | ○ |
| R10 | Second Group | Methyl Isobutyl Ketone (MIBK) | ○ | | | ○ | | ○ |
| R11 | Second Group | Cyclohexane | ○ | | ○ | ○ | ○ | ○ |
| R12 | First Group | Acetone | ○ | ○ | ○ | ○ | ○ | ○ |
| R13 | First Group | Toluene | ○ | ○ | ○ | ○ | ○ | ○ |
| R14 | First Group | Methyl Ethyl Ketone (MEK) | ○ | ○ | ○ | ○ | ○ | ○ |
| R15 | First Group | Ethyl Acetate | ○ | ○ | ○ | ○ | ○ | ○ |
| R16 | Third Group | 1-Methyl Imidazole | | ○ | | | | |
| R17 | Third Group | Benzyl Alcohol | | ○ | | | | |
| R18 | Third Group | N-Methyl-2-Pyrrolidone (NMP) | | ○ | | | | |
| R19 | Third Group | Hexane | | ○ | | | | |
| R20 | Third Group | Ethylene Glycol Monomethyl Ether | | ○ | | | | |
| R21 | Third Group | Quinoline | | ○ | | | | |
| R22 | Second Group | Diacetone Alcohol | | | ○ | ○ | ○ | ○ |

TABLE 3

| Reagent No. | Category | Solvent reagent | Talc D | Talc C | Talc D | Aluminum hydroxide B | Aluminum hydroxide C | Silica C |
|---|---|---|---|---|---|---|---|---|
| R1 | First Group | 1-Butanol | ○ | ○ | ○ | ○ | ○ | ○ |
| R2 | First Group | Tetrahydrofuran (THF) | ○ | ○ | ○ | ○ | ○ | ○ |
| R3 | Second Group | Acetic Acid | ○ | ○ | ○ | ○ | ○ | |
| R4 | First Group | 1,4-Dioxane | ○ | ○ | ○ | ○ | ○ | ○ |
| R5 | Second Group | Dimethyl Formamide (DMF) | ○ | ○ | ○ | ○ | ○ | |
| R6 | First Group | Ethanol | ○ | ○ | ○ | ○ | ○ | ○ |
| R7 | Second Group | N-Methyl Formamide | ○ | ○ | ○ | ○ | ○ | |
| R8 | Second Group | 2-Propanol | ○ | | | ○ | ○ | |
| R9 | First Group | Dimethyl Sulfoxide (DMSO) | ○ | ○ | ○ | ○ | ○ | ○ |
| R10 | Second Group | Methyl Isobutyl Ketone (MIBK) | | | ○ | | ○ | ○ |
| R11 | Second Group | Cyclohexane | ○ | | ○ | ○ | ○ | |
| R12 | First Group | Acetone | ○ | ○ | ○ | ○ | ○ | ○ |
| R13 | First Group | Toluene | ○ | ○ | ○ | ○ | ○ | ○ |
| R14 | First Group | Methyl Ethyl Ketone (MEK) | ○ | ○ | ○ | ○ | ○ | ○ |
| R15 | First Group | Ethyl Acetate | ○ | ○ | ○ | ○ | ○ | ○ |
| R18 | Third Group | N-Methyl-2-Pyrrolidone (NMP) | | | | | | ○ |
| R22 | Third Group | Diacetone Alcohol | | | ○ | ○ | ○ | |
| R25 | Third Group | o-Dichlorobenzene | | | | | | ○ |
| R26 | Third Group | 1-Methoxy-2-Propanol | | | | | | ○ |
| R27 | Third Group | Bromobenzene | | | | | | ○ |
| R28 | Third Group | Pyridine | | | | | | ○ |
| R29 | Third Group | Benzyl Benzoate | | | | | | ○ |
| R30 | Third Group | N,N-Diethyl Formamide | | | | | | ○ |
| R31 | Third Group | γ-Butyrolactone (GBL) | | | | | | ○ |

TABLE 4

| Reagent No. | Category | Solvent reagent | Canola oil | Dispersant A | Dispersant B | Dispersant C |
|---|---|---|---|---|---|---|
| R1 | First Group | 1-Butanol | ○ | ○ | ○ | ○ |
| R2 | First Group | Tetrahydrofuran (THF) | ○ | ○ | ○ | ○ |

TABLE 4-continued

| Reagent No. | Category | Solvent reagent | Measurement target (solid particles) | | | |
|---|---|---|---|---|---|---|
| | | | Canola oil | Dispersant A | Dispersant B | Dispersant C |
| R3 | Second Group | Acetic Acid | ○ | ○ | ○ | |
| R4 | First Group | 1,4-Dioxane | ○ | ○ | ○ | ○ |
| R5 | Second Group | Dimethyl Formamide (DMF) | ○ | ○ | ○ | ○ |
| R6 | First Group | Ethanol | ○ | ○ | ○ | ○ |
| R7 | Second Group | N-Methyl Formamide | ○ | ○ | ○ | |
| R8 | Second Group | 2-Propanol | ○ | ○ | ○ | ○ |
| R9 | First Group | Dimethyl Sulfoxide (DMSO) | ○ | ○ | ○ | ○ |
| R10 | Second Group | Methyl Isobutyl Ketone (MIBK) | ○ | ○ | ○ | ○ |
| R11 | Second Group | Cyclohexane | ○ | ○ | ○ | ○ |
| R12 | First Group | Acetone | ○ | ○ | ○ | ○ |
| R13 | First Group | Toluene | ○ | ○ | ○ | ○ |
| R14 | First Group | Methyl Ethyl Ketone (MEK) | ○ | ○ | ○ | ○ |
| R15 | First Group | Ethyl Acetate | ○ | ○ | ○ | ○ |
| R19 | Third Group | Hexane | | ○ | ○ | |
| R22 | Third Group | Diacetone Alcohol | ○ | ○ | ○ | ○ |
| R23 | Third Group | Propylene Carbonate | ○ | ○ | ○ | ○ |
| R24 | Third Group | Ethanolamine | ○ | | | ○ |

Table 5 shows measurement results of the HSP values of the solid particles and the HSP distance Ra to water. Table 6 shows measurement results of the HSP values of the non-aqueous liquids. In addition, Table 7 to Table 22 show classification results of the solvent reagents that are used for measurement of the HSP values of the solid particles and the non-aqueous liquids that serve as the measurement targets. Score 1 indicates a good solvent and a score 0 indicates a poor solvent. Here, "-" in Table 7, Table 8, and Table 10 to Table 14 indicates that determination was made based on visual observation. Illustration of the three-dimensional Hansen sphere for each measurement target is omitted. However, for example, a Hansen sphere similar to that in FIG. 1 can be obtained through software.

TABLE 5

| Measurement target No. | Measurement target | Manufacturer, place of production | HSP value | | | Fitting value | Measurement method | HSP distance Ra to water |
|---|---|---|---|---|---|---|---|---|
| | | | $\delta_d$ [MPa$^{1/2}$] | $\delta_p$ [MPa$^{1/2}$] | $\delta_h$ [MPa$^{1/2}$] | | | |
| S1 | Aluminum hydroxide A | Manufacturer A | 16.7 | 4.6 | 12.0 | 1.000 | Stokes' method | 32.5 |
| S2 | Aluminum hydroxide D | Manufacturer B | 16.1 | 7.0 | 15.5 | 1.000 | Concentrated particle size analyzer | 28.3 |
| S3 | Alumina | Manufacturer C | 15.9 | 7.4 | 13.5 | 1.000 | Visual observation method | 30.1 |
| S4 | Silica | Manufacturer D | 15.1 | 8.4 | 16.6 | 1.000 | Stokes' method | 26.8 |
| S5 | Kaolin | Manufacturer E | 16.6 | 12.4 | 16.1 | 1.000 | Stokes' method | 26.5 |
| S6 | Talc A | Manufacturer F | 15.4 | 7.9 | 6.1 | 1.000 | Stokes' method | 37.1 |
| S7 | Talc B | Manufacturer G Place of production A | 16.9 | 10.5 | 14.8 | 1.000 | Stokes' method | 28.2 |
| S8 | Talc C | Manufacturer G Place of production B | 14.8 | 7.7 | 6.5 | 1.000 | Stokes' method | 36.8 |
| S9 | Talc D | Manufacturer G Place of production C | 18.8 | 12.0 | 13.0 | 0.857 | Visual observation method | 30.3 |
| S10 | Aluminum hydroxide B | Manufacturer H | 12.6 | 15.2 | 14.8 | 0.822 | Visual observation method | 28.1 |
| S11 | Aluminum hydroxide C | Manufacturer I | 16.7 | 12.3 | 15.8 | 1.000 | Visual observation method | 26.9 |
| S12 | Porous silica | Manufacturer J | 17.4 | 6.6 | 4.6 | 0.993 | Permeation speed method | 39.0 |

TABLE 6

| Measurement target No. | Measurement target | Product number | HSP value | | | Fitting value | Measurement method |
|---|---|---|---|---|---|---|---|
| | | | $\delta_d$ [MPa$^{1/2}$] | $\delta_p$ [MPa$^{1/2}$] | $\delta_h$ [MPa$^{1/2}$] | | |
| L1 | Canola oil | — | 15.9 | 7.6 | 6.4 | 0.822 | Visual observation method |
| L2 | Dispersant A | Unilube* 50MB-26 | 12.9 | 7.9 | 7.9 | 1.000 | Visual observation method |
| L3 | Dispersant B | Unilube* 750E-25 | 13.2 | 7.4 | 8.5 | 0.993 | Visual observation method |
| L4 | Dispersant C | Unilube* 25TG-55 | 19.3 | 8.4 | 6.1 | 0.993 | Visual observation method |

*Unilube is a registered trademark.

TABLE 7

Aluminum hydroxide A

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m³] | Solvent viscosity [Pa·s] | Average particle size [nm] | Score |
|---|---|---|---|---|---|---|---|---|---|
| R1 | First Group | 1-Butanol | 16.0 | 5.7 | 15.8 | 810 | 0.002571 | 6784 | 1 |
| R2 | First Group | Tetrahydrofuran (THF) | 16.8 | 5.7 | 8.0 | 886 | 0.00046 | 8660 | 1 |
| R3 | Second Group | Acetic Acid | 14.5 | 8.0 | 13.5 | 1050 | 0.001066 | 9709 | 0 |
| R4 | First Group | 1,4-Dioxane | 17.5 | 1.8 | 9.0 | 1030 | 0.001204 | 12120 | 0 |
| R5 | Second Group | Dimethyl Formamide (DMF) | 17.4 | 13.7 | 11.3 | 944 | 0.000802 | 12168 | 0 |
| R6 | First Group | Ethanol | 15.8 | 8.8 | 19.4 | 789 | 0.001082 | 13653 | 0 |
| R7 | Second Group | N-Methyl Formamide | 17.4 | 18.8 | 15.9 | 1011 | 0.00165 | 19031 | 0 |
| R8 | Second Group | 2-Propanol | 15.8 | 6.1 | 16.4 | 786 | 0.00255 | 20932 | 0 |
| R9 | First Group | Dimethyl Sulfoxide (DMSO) | 18.4 | 16.4 | 10.2 | 1101 | 0.001991 | 21435 | 0 |
| R10 | Second Group | Methyl Isobutyl Ketone (MIBK) | 15.3 | 6.1 | 4.1 | 802 | 0.0005463 | — | 0 |
| R11 | Second Group | Cyclohexane | 16.8 | 0.0 | 0.2 | 779 | 0.000629 | — | 0 |
| R12 | First Group | Acetone | 15.5 | 10.4 | 7.0 | 788 | 0.000303 | — | 0 |
| R13 | First Group | Toluene | 18.0 | 1.4 | 2.0 | 867 | 0.0005525 | — | 0 |
| R14 | First Group | Methyl Ethyl Ketone (MEK) | 16.0 | 9.0 | 5.1 | 805 | 0.00078 | — | 0 |
| R15 | First Group | Ethyl Acetate | 15.8 | 5.3 | 7.2 | 902 | 0.000426 | — | 0 |

TABLE 8

Aluminum hydroxide D

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Average particle size [nm] | Score |
|---|---|---|---|---|---|---|---|
| R12 | First Group | Acetone | 15.5 | 10.4 | 7.0 | — | 0 |
| R16 | Third Group | 1-Methyl Imidazole | 19.7 | 15.6 | 11.2 | — | 0 |
| R17 | Third Group | Benzyl Alcohol | 18.4 | 6.3 | 13.7 | 1428.2 | 0 |
| R9 | First Group | Dimethyl Sulfoxide (DMSO) | 18.4 | 16.4 | 10.2 | 1167.8 | 0 |
| R5 | Second Group | Dimethyl Formamide (DMF) | 17.4 | 13.7 | 11.3 | 1119.7 | 0 |
| R18 | Third Group | N-Methyl-2-Pyrrolidone (NMP) | 18.0 | 12.3 | 7.2 | 1673.2 | 0 |
| R2 | First Group | Tetrahydrofuran (THF) | 16.8 | 5.7 | 8.0 | — | 0 |
| R13 | First Group | Toluene | 18.0 | 1.4 | 2.0 | — | 0 |
| R4 | First Group | 1,4-Dioxane | 17.5 | 1.8 | 9.0 | — | 0 |
| R19 | Third Group | Hexane | 14.9 | 0.0 | 0.0 | — | 0 |
| R1 | First Group | 1-Butanol | 16.0 | 5.7 | 15.8 | 970.4 | 1 |
| R6 | First Group | Ethanol | 15.8 | 8.8 | 19.4 | 1160.1 | 0 |
| R7 | Second Group | N-Methyl Formamide | 17.4 | 18.8 | 15.9 | 1306.2 | 0 |
| R15 | First Group | Ethyl Acetate | 15.8 | 5.3 | 7.2 | — | 0 |
| R20 | Third Group | Ethylene Glycol Monomethyl Ether | 16.0 | 8.2 | 15.0 | 1055.9 | 1 |
| R21 | Third Group | Quinoline | 20.5 | 5.6 | 5.7 | — | 0 |
| R14 | First Group | Methyl Ethyl Ketone (MEK) | 16.0 | 9.0 | 5.1 | — | 0 |

TABLE 9

Alumina

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m³] | Solvent viscosity [Pa·s] | Score |
|---|---|---|---|---|---|---|---|---|
| R1 | First Group | 1-Butanol | 16.0 | 5.7 | 15.8 | 810 | 0.002571 | 1 |
| R22 | Third Group | Diacetone Alcohol | 15.8 | 8.2 | 10.8 | 938 | 0.003193 | 1 |
| R3 | Second Group | Acetic Acid | 14.5 | 8.0 | 13.5 | 1050 | 0.001066 | 1 |
| R8 | Second Group | 2-Propanol | 15.8 | 6.1 | 16.4 | 786 | 0.00255 | 0 |
| R6 | First Group | Ethanol | 15.8 | 8.8 | 19.4 | 789 | 0.001082 | 0 |

TABLE 9-continued

Alumina

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa·s] | Score |
|---|---|---|---|---|---|---|---|---|
| R9 | First Group | Dimethyl Sulfoxide (DMSO) | 18.4 | 16.4 | 10.2 | 1101 | 0.001991 | 0 |
| R5 | Second Group | Dimethyl Formamide (DMF) | 17.4 | 13.7 | 11.3 | 944 | 0.000802 | 0 |
| R7 | Second Group | N-Methyl Formamide | 17.4 | 18.8 | 15.9 | 1011 | 0.00165 | 0 |
| R11 | Second Group | Cyclohexane | 16.8 | 0.0 | 0.2 | 779 | 0.000629 | 0 |
| R12 | First Group | Acetone | 15.5 | 10.4 | 7.0 | 788 | 0.000303 | 0 |
| R13 | First Group | Toluene | 18.0 | 1.4 | 2.0 | 867 | 0.0005525 | 0 |
| R4 | First Group | 1,4-Dioxane | 17.5 | 1.8 | 9.0 | 1030 | 0.001204 | 0 |
| R2 | First Group | Tetrahydrofuran (THF) | 16.8 | 5.7 | 8.0 | 886 | 0.00046 | 0 |
| R14 | First Group | Methyl Ethyl Ketone (MEK) | 16.0 | 9.0 | 5.1 | 805 | 0.00078 | 0 |
| R15 | First Group | Ethyl Acetate | 15.8 | 5.3 | 7.2 | 902 | 0.000426 | 0 |

TABLE 10

Silica

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa·s] | Average particle size [nm] | Score |
|---|---|---|---|---|---|---|---|---|---|
| R8 | Second Group | 2-Propanol | 15.8 | 6.1 | 16.4 | 786 | 0.00255 | 3576 | 1 |
| R3 | Second Group | Acetic Acid | 14.5 | 8.0 | 13.5 | 1050 | 0.001066 | 4872 | 1 |
| R6 | First Group | Ethanol | 15.8 | 8.8 | 19.4 | 789 | 0.001082 | 6391 | |
| R22 | Third Group | Diacetone Alcohol | 15.8 | 8.2 | 10.8 | 938 | 0.003193 | 7685 | 0 |
| R14 | First Group | Methyl Ethyl Ketone (MEK) | 16.0 | 9.0 | 5.1 | 805 | 0.00078 | 7750 | 0 |
| R1 | First Group | 1-Butanol | 16.0 | 5.7 | 15.8 | 810 | 0.002571 | 8150 | 0 |
| R10 | Second Group | Methyl Isobutyl Ketone (MIBK) | 15.3 | 6.1 | 4.1 | 802 | 0.0005463 | — | 0 |
| R11 | Second Group | Cyclohexane | 16.8 | 0.0 | 0.2 | 779 | 0.000629 | — | 0 |
| R12 | First Group | Acetone | 15.5 | 10.4 | 7.0 | 788 | 0.000303 | — | 0 |
| R13 | First Group | Toluene | 18.0 | 1.4 | 2.0 | 867 | 0.0005525 | — | 0 |
| R4 | First Group | 1,4-Dioxane | 17.5 | 1.8 | 9.0 | 1030 | 0.001204 | — | 0 |
| R2 | First Group | Tetrahydrofuran (THF) | 16.8 | 5.7 | 8.0 | 886 | 0.00046 | — | 0 |
| R5 | Second Group | Dimethyl Formamide (DMF) | 17.4 | 13.7 | 11.3 | 944 | 0.000802 | — | 0 |
| R15 | First Group | Ethyl Acetate | 15.8 | 5.3 | 7.2 | 902 | 0.000426 | — | 0 |
| R9 | First Group | Dimethyl Sulfoxide (DMSO) | 18.4 | 16.4 | 10.2 | 1101 | 0.001991 | — | 0 |
| R7 | Second Group | N-Methyl Formamide | 17.4 | 18.8 | 15.9 | 1011 | 0.00165 | — | 0 |

TABLE 11

Kaolin

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa·s] | Average particle size [nm] | Score |
|---|---|---|---|---|---|---|---|---|---|
| R6 | First Group | Ethanol | 15.8 | 8.8 | 19.4 | 786 | 0.001082 | 2510 | 1 |
| R5 | Second Group | Dimethyl Formamide (DMF) | 17.4 | 13.7 | 11.3 | 1050 | 0.000802 | 3209 | 1 |
| R7 | Second Group | N-Methyl Formamide | 17.4 | 18.8 | 15.9 | 789 | 0.00165 | 3742 | 1 |
| R8 | Second Group | 2-Propanol | 15.8 | 6.1 | 16.4 | 938 | 0.00255 | 4837 | 1 |
| R22 | Third Group | Diacetone Alcohol | 15.8 | 8.2 | 10.8 | 805 | 0.003193 | 5078 | 0 |
| R9 | First Group | Dimethyl Sulfoxide (DMSO) | 18.4 | 16.4 | 10.2 | 810 | 0.001991 | 5480 | 0 |

TABLE 11-continued

| | | | Kaolin | | | | | | |
|---|---|---|---|---|---|---|---|---|---|
| | | | HSP value | | | Solvent | Solvent | Average | |
| Reagent No. | Category | Solvent reagent | $\delta_d$ [MPa$^{1/2}$] | $\delta_p$ [MPa$^{1/2}$] | $\delta_h$ [MPa$^{1/2}$] | density [kg/m$^3$] | viscosity [Pa · s] | particle size [nm] | Score |
| R1 | First Group | 1-Butanol | 16.0 | 5.7 | 15.8 | 802 | 0.002571 | 13547 | 0 |
| R3 | Second Group | Acetic Acid | 14.5 | 8.0 | 13.5 | 779 | 0.001066 | 19878 | 0 |
| R11 | Second Group | Cyclohexane | 16.8 | 0.0 | 0.2 | 788 | 0.000629 | — | 0 |
| R12 | First Group | Acetone | 15.5 | 10.4 | 7.0 | 867 | 0.000303 | — | 0 |
| R13 | First Group | Toluene | 18.0 | 1.4 | 2.0 | 1030 | 0.0005525 | — | 0 |
| R4 | First Group | 1,4-Dioxane | 17.5 | 1.8 | 9.0 | 886 | 0.001204 | — | 0 |
| R2 | First Group | Tetrahydrofuran (THF) | 16.8 | 5.7 | 8.0 | 786 | 0.00046 | — | 0 |
| R14 | First Group | Methyl Ethyl Ketone (MEK) | 16.0 | 9.0 | 5.1 | 1050 | 0.00078 | — | 0 |
| R15 | First Group | Ethyl Acetate | 15.8 | 5.3 | 7.2 | 789 | 0.000426 | — | 0 |

TABLE 12

| | | | Talc A | | | | | | |
|---|---|---|---|---|---|---|---|---|---|
| | | | HSP value | | | Solvent | Solvent | Average | |
| Reagent No. | Category | Solvent reagent | $\delta_d$ [MPa$^{1/2}$] | $\delta_p$ [MPa$^{1/2}$] | $\delta_h$ [MPa$^{1/2}$] | density [kg/m$^3$] | viscosity [Pa · s] | particle size [nm] | Score |
| R12 | First Group | Acetone | 15.5 | 10.4 | 7.0 | 788 | 0.000303 | 2298 | 1 |
| R10 | Second Group | Methyl Isobutyl Ketone (MIBK) | 15.3 | 6.1 | 4.1 | 802 | 0.0005463 | 3216 | 1 |
| R14 | First Group | Methyl Ethyl Ketone (MEK) | 16.0 | 9.0 | 5.1 | 802 | 0.0005463 | 3719 | 1 |
| R6 | First Group | Ethanol | 15.8 | 8.8 | 19.4 | 789 | 0.001082 | 4186 | 0 |
| R5 | Second Group | Dimethyl Formamide (DMF) | 17.4 | 13.7 | 11.3 | 944 | 0.000802 | 4870 | 0 |
| R8 | Second Group | 2-Propanol | 15.8 | 6.1 | 16.4 | 786 | 0.00255 | 6165 | 0 |
| R1 | First Group | 1-Butanol | 16.0 | 5.7 | 15.8 | 810 | 0.002571 | 6267 | 0 |
| R7 | Second Group | N-Methyl Formamide | 17.4 | 18.8 | 15.9 | 1011 | 0.00165 | 6913 | 0 |
| R9 | First Group | Dimethyl Sulfoxide (DMSO) | 18.4 | 16.4 | 10.2 | 1101 | 0.001991 | 8309 | 0 |
| R22 | Third Group | Diacetone Alcohol | 15.8 | 8.2 | 10.8 | 938 | 0.003193 | 8927 | 0 |
| R2 | First Group | Tetrahydrofuran (THF) | 16.8 | 5.7 | 8.0 | 836 | 0.00046 | 18094 | 0 |
| R3 | Second Group | Acetic Acid | 14.5 | 8.0 | 13.5 | 1050 | 0.001066 | 18776 | 0 |
| R15 | First Group | Ethyl Acetate | 15.8 | 5.3 | 7.2 | 902 | 0.000426 | — | 0 |
| R4 | First Group | 1,4-Dioxane | 17.5 | 1.8 | 9.0 | 1030 | 0.001204 | — | 0 |
| R13 | First Group | Toluene | 18.0 | 1.4 | 2.0 | 867 | 0.0005525 | — | 0 |
| R11 | Second Group | Cyclohexane | 16.8 | 0.0 | 0.2 | 779 | 0.000629 | — | 0 |

TABLE 13

| | | | Talc B | | | | | | |
|---|---|---|---|---|---|---|---|---|---|
| | | | HSP value | | | Solvent | Solvent | Average | |
| Reagent No. | Category | Solvent reagent | $\delta_d$ [MPa$^{1/2}$] | $\delta_p$ [MPa$^{1/2}$] | $\delta_h$ [MPa$^{1/2}$] | density [kg/m$^3$] | viscosity [Pa · s] | particle size [nm] | Score |
| R8 | Second Group | 2-Propanol | 15.8 | 6.1 | 16.4 | 786 | 0.00255 | 486 | 1 |
| R5 | Second Group | Dimethyl Formamide (DMF) | 17.4 | 13.7 | 11.3 | 944 | 0.000802 | 510 | 1 |
| R7 | Second Group | N-Methyl Formamide | 17.4 | 18.8 | 15.9 | 1011 | 0.00165 | 619 | 0 |
| R12 | First Group | Acetone | 15.5 | 10.4 | 7.0 | 788 | 0.000303 | 629 | 0 |
| R6 | First Group | Ethanol | 15.8 | 8.8 | 19.4 | 789 | 0.001082 | 673 | 0 |
| R14 | First Group | Methyl Ethyl Ketone (MEK) | 16.0 | 9.0 | 5.1 | 805 | 0.00078 | 675 | 0 |
| R9 | First Group | Dimethyl Sulfoxide (DMSO) | 18.4 | 16.4 | 10.2 | 1101 | 0.001991 | 804 | 0 |

TABLE 13-continued

Talc B

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa·s] | Average particle size [nm] | Score |
|---|---|---|---|---|---|---|---|---|---|
| R1 | First Group | 1-Butanol | 16.0 | 5.7 | 15.8 | 810 | 0.002571 | 814 | 0 |
| R2 | First Group | Tetrahydrofuran (THF) | 16.8 | 5.7 | 8.0 | 886 | 0.00046 | — | 0 |
| R3 | Second Group | Acetic Acid | 14.5 | 8.0 | 13.5 | 1050 | 0.001066 | — | 0 |
| R4 | First Group | 1,4-Dioxane | 17.5 | 1.8 | 9.0 | 1030 | 0.001204 | — | 0 |
| R11 | Second Group | Cyclohexane | 16.8 | 0.0 | 0.2 | 779 | 0.000629 | — | 0 |
| R13 | First Group | Toluene | 18.0 | 1.4 | 2.0 | 867 | 0.0005525 | — | 0 |
| R15 | First Group | Ethyl Acetate | 15.8 | 5.3 | 7.2 | 902 | 0.000426 | — | 0 |

TABLE 14

Talc C

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa·s] | Average particle size [nm] | Score |
|---|---|---|---|---|---|---|---|---|---|
| R10 | Second Group | Methyl Isobutyl Ketone (MIBK) | 15.3 | 6.1 | 4.1 | 802 | 0.000546 | 695 | 1 |
| R12 | First Group | Acetone | 15.5 | 10.4 | 7.0 | 788 | 0.000303 | 702 | 1 |
| R5 | Second Group | Dimethyl Formamide (DMF) | 17.4 | 13.7 | 11.3 | 944 | 0.000802 | 851 | 0 |
| R6 | First Group | Ethanol | 15.8 | 8.8 | 19.4 | 789 | 0.001082 | 900 | 0 |
| R9 | First Group | Dimethyl Sulfoxide (DMSO) | 18.4 | 16.4 | 10.2 | 1101 | 0.001991 | 1137 | 0 |
| R8 | Second Group | 2-Propanol | 15.8 | 6.1 | 16.4 | 786 | 0.00255 | 1037 | 0 |
| R1 | First Group | 1-Butanol | 16.0 | 5.7 | 15.8 | 810 | 0.002571 | 1050 | 0 |
| R7 | Second Group | N-Methyl Formamide | 17.4 | 18.8 | 15.9 | 1011 | 0.00165 | 1090 | 0 |
| R14 | First Group | Methyl Ethyl Ketone (MEK) | 16.0 | 9.0 | 5.1 | 805 | 0.00078 | 1198 | 0 |
| R2 | First Group | Tetrahydrofuran (THF) | 16.8 | 5.7 | 8.0 | 886 | 0.00046 | — | 0 |
| R3 | Second Group | Acetic Acid | 14.5 | 8.0 | 13.5 | 1050 | 0.001066 | — | 0 |
| R4 | First Group | 1,4-Dioxane | 17.5 | 1.8 | 9.0 | 1030 | 0.001204 | — | 0 |
| R11 | Second Group | Cyclohexane | 16.8 | 0.0 | 0.2 | 779 | 0.000629 | — | 0 |
| R13 | First Group | Toluene | 18.0 | 1.4 | 2.0 | 867 | 0.0005525 | — | 0 |
| R15 | First Group | Ethyl Acetate | 15.8 | 5.3 | 7.2 | 902 | 0.000426 | — | 0 |

TABLE 15

Talc D

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa·s] | Score |
|---|---|---|---|---|---|---|---|---|
| R1 | First Group | 1-Butanol | 16.0 | 5.7 | 15.8 | 820 | 0.002571 | 1 |
| R22 | Third Group | Diacetone Alcohol | 15.8 | 8.2 | 10.8 | 938 | 0.003193 | 1 |
| R8 | Second Group | 2-Propanol | 15.8 | 6.1 | 16.4 | 786 | 0.00255 | 1 |
| R9 | First Group | Dimethyl Sulfoxide (DMSO) | 18.4 | 16.4 | 10.2 | 1101 | 0.001991 | 1 |
| R5 | Second Group | Dimethyl Formamide (DMF) | 17.4 | 13.7 | 11.3 | 944 | 0.000802 | 1 |
| R7 | Second Group | N-Methyl Formamide | 17.4 | 18.8 | 15.9 | 1011 | 0.00165 | 1 |
| R14 | First Group | Methyl Ethyl Ketone (MEK) | 16.0 | 9.0 | 5.1 | 805 | 0.00078 | 1 |
| R11 | Second Group | Cyclohexane | 16.8 | 0.0 | 0.2 | 779 | 0.000629 | 0 |
| R12 | First Group | Acetone | 15.5 | 10.4 | 7.0 | 788 | 0.000303 | 0 |
| R13 | First Group | Toluene | 18.0 | 1.4 | 2.0 | 867 | 0.0005525 | 0 |
| R4 | First Group | 1,4-Dioxane | 17.5 | 1.8 | 9.0 | 1030 | 0.001204 | 0 |

TABLE 15-continued

Talc D

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa · s] | Score |
|---|---|---|---|---|---|---|---|---|
| R2 | First Group | Tetrahydrofuran (THF) | 16.8 | 5.7 | 8.0 | 886 | 0.00046 | 0 |
| R15 | First Group | Ethyl Acetate | 15.8 | 5.3 | 7.2 | 902 | 0.000426 | 0 |
| R3 | Second Group | Acetic Acid | 14.5 | 8.0 | 13.5 | 1050 | 0.001066 | 0 |
| R6 | First Group | Ethanol | 15.8 | 8.8 | 19.4 | 789 | 0.001082 | 0 |

TABLE 16

Canola oil

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R12 | First Group | Acetone | 15.5 | 10.4 | 7.0 | 1 |
| R14 | First Group | Methyl Ethyl Ketone (MEK) | 16.0 | 9.0 | 5.1 | 1 |
| R15 | First Group | Ethyl Acetate | 15.8 | 5.3 | 7.2 | 1 |
| R2 | First Group | Tetrahydrofuran (THF) | 16.8 | 5.7 | 8.0 | 1 |
| R10 | Second Group | Methyl Isobutyl Ketone (MIBK) | 15.3 | 6.1 | 4.1 | 1 |
| R13 | First Group | Toluene | 18.0 | 1.4 | 2.0 | 0 |
| R4 | First Group | 1,4-Dioxane | 17.5 | 1.8 | 9.0 | 0 |
| R11 | Second Group | Cyclohexane | 16.8 | 0.0 | 0.2 | 0 |
| R22 | Third Group | Diacetone Alcohol | 15.8 | 8.2 | 10.8 | 0 |
| R3 | Second Group | Acetic Acid | 14.5 | 8.0 | 13.5 | 0 |
| R8 | Second Group | 2-Propanol | 15.8 | 6.1 | 16.4 | 0 |
| R5 | Second Group | Dimethyl Formamide (DMF) | 17.4 | 13.7 | 11.3 | 0 |
| R1 | First Group | 1-Butanol | 16.0 | 5.7 | 15.8 | 0 |
| R6 | First Group | Ethanol | 15.8 | 8.8 | 19.4 | 0 |
| R9 | First Group | Dimethyl Sulfoxide (DMSO) | 18.4 | 16.4 | 10.2 | 0 |
| R7 | Second Group | N-Methyl Formamide | 17.4 | 18.8 | 15.9 | 0 |
| R23 | Third Group | Propylene Carbonate | 20.0 | 18.0 | 4.1 | 0 |
| R24 | Third Group | Ethanolamine | 17.0 | 15.5 | 21.0 | 0 |

TABLE 17

Dispersant A

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R3 | Second Group | Acetic Acid | 14.5 | 8.0 | 13.5 | 1 |
| R10 | Second Group | Methyl Isobutyl Ketone (MIBK) | 15.3 | 6.1 | 4.1 | 1 |
| R12 | First Group | Acetone | 15.5 | 10.4 | 7.0 | 1 |
| R2 | First Group | Tetrahydrofuran (THF) | 16.8 | 5.7 | 8.0 | 1 |
| R5 | Second Group | Dimethyl Formamide (DMF) | 17.4 | 13.7 | 11.3 | 0 |
| R14 | First Group | Methyl Ethyl Ketone (MEK) | 16.0 | 9.0 | 5.1 | 0 |
| R22 | Third Group | Diacetone Alcohol | 15.8 | 8.2 | 10.8 | 0 |
| R1 | First Group | 1-Butanol | 16.0 | 5.7 | 15.8 | 0 |
| R7 | Second Group | N-Methyl Formamide | 17.4 | 18.8 | 15.9 | 0 |
| R23 | Third Group | Propylene Carbonate | 20.0 | 18.0 | 4.1 | 0 |
| R15 | First Group | Ethyl Acetate | 15.8 | 5.3 | 7.2 | 0 |
| R9 | First Group | Dimethyl Sulfoxide (DMSO) | 18.4 | 16.4 | 10.2 | 0 |
| R13 | First Group | Toluene | 18.0 | 1.4 | 2.0 | 0 |
| R4 | First Group | 1,4-Dioxane | 17.5 | 1.8 | 9.0 | 0 |
| R6 | First Group | Ethanol | 15.8 | 8.8 | 19.4 | 0 |
| R8 | Second Group | 2-Propanol | 15.8 | 6.1 | 16.4 | 0 |
| R11 | Second Group | Cyclohexane | 16.8 | 0.0 | 0.2 | 0 |
| R19 | Third Group | Hexane | 14.9 | 0.0 | 0.0 | 0 |

TABLE 18

Dispersant B

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R3 | Second Group | Acetic Acid | 14.5 | 8.0 | 13.5 | 1 |
| R12 | First Group | Acetone | 15.5 | 10.4 | 7.0 | 1 |
| R2 | First Group | Tetrahydrofuran (THF) | 16.8 | 5.7 | 8.0 | 1 |
| R5 | Second Group | Dimethyl Formamide (DMF) | 17.4 | 13.7 | 11.3 | 0 |
| R14 | First Group | Methyl Ethyl Ketone (MEK) | 16.0 | 9.0 | 5.1 | 0 |
| R22 | Third Group | Diacetone Alcohol | 15.8 | 8.2 | 10.8 | 0 |
| R1 | First Group | 1-Butanol | 16.0 | 5.7 | 15.8 | 0 |
| R7 | Second Group | N-Methyl Formamide | 17.4 | 18.8 | 15.9 | 0 |
| R23 | Third Group | Propylene Carbonate | 20.0 | 18.0 | 4.1 | 0 |
| R15 | First Group | Ethyl Acetate | 15.8 | 5.3 | 7.2 | 0 |
| R9 | First Group | Dimethyl Sulfoxide (DMSO) | 18.4 | 16.4 | 10.2 | 0 |
| R13 | First Group | Toluene | 18.0 | 1.4 | 2.0 | 0 |
| R4 | First Group | 1,4-Dioxane | 17.5 | 1.8 | 9.0 | 0 |
| R6 | First Group | Ethanol | 15.8 | 8.8 | 19.4 | 0 |
| R8 | Second Group | 2-Propanol | 15.8 | 6.1 | 16.4 | 0 |
| R10 | Second Group | Methyl Isobutyl Ketone (MIBK) | 15.3 | 6.1 | 4.1 | 0 |
| R11 | Second Group | Cyclohexane | 16.8 | 0.0 | 0.2 | 0 |
| R19 | Third Group | Hexane | 14.9 | 0.0 | 0.0 | 0 |

TABLE 19

Dispersant C

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R2 | First Group | Tetrahydrofuran (THF) | 16.8 | 5.7 | 8.0 | 1 |
| R15 | First Group | Ethyl Acetate | 15.8 | 5.3 | 7.2 | 1 |
| R5 | Second Group | Dimethyl Formamide (DMF) | 17.4 | 13.7 | 11.3 | 1 |
| R4 | First Group | 1,4-Dioxane | 17.5 | 1.8 | 9.0 | 1 |
| R13 | First Group | Toluene | 18.0 | 1.4 | 2.0 | 1 |
| R14 | First Group | Methyl Ethyl Ketone (MEK) | 16.0 | 9.0 | 5.1 | 1 |
| R12 | First Group | Acetone | 15.5 | 10.4 | 7.0 | 1 |
| R9 | First Group | Dimethyl Sulfoxide (DMSO) | 18.4 | 16.4 | 10.2 | 0 |
| R24 | Third Group | Ethanolamine | 17.0 | 15.5 | 21.0 | 0 |
| R22 | Third Group | Diacetone Alcohol | 15.8 | 8.2 | 10.8 | 0 |
| R8 | Second Group | 2-Propanol | 15.8 | 6.1 | 16.4 | 0 |
| R10 | Second Group | Methyl Isobutyl Ketone (MIBK) | 15.3 | 6.1 | 4.1 | 0 |
| R6 | First Group | Ethanol | 15.8 | 8.8 | 19.4 | 0 |
| R23 | Third Group | Propylene Carbonate | 20.0 | 18.0 | 4.1 | 0 |
| R11 | Second Group | Cyclohexane | 16.8 | 0.0 | 0.2 | 0 |
| R1 | First Group | 1-Butanol | 16.0 | 5.7 | 15.8 | 0 |

TABLE 20

Aluminum hydroxide B

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa·s] | Score |
|---|---|---|---|---|---|---|---|---|
| R3 | Second Group | Acetic Acid | 14.5 | 8.0 | 13.5 | 1050 | 0.001066 | 1 |
| R22 | Third Group | Diacetone Alcohol | 15.8 | 8.2 | 10.8 | 938 | 0.003193 | 1 |
| R7 | Second Group | N-Methyl Formamide | 17.4 | 18.8 | 15.9 | 1011 | 0.00165 | 1 |
| R1 | First Group | 1-Butanol | 16.0 | 5.7 | 15.8 | 810 | 0.002571 | 1 |
| R10 | Second Group | Methyl Isobutyl Ketone (MIBK) | 15.3 | 6.1 | 4.1 | 802 | 0.000546 | 0 |
| R2 | First Group | Tetrahydrofuran (THF) | 16.8 | 5.7 | 8.0 | 886 | 0.00046 | 0 |
| R12 | First Group | Acetone | 15.5 | 10.4 | 7.0 | 788 | 0.000303 | 0 |

TABLE 20-continued

Aluminum hydroxide B

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa · s] | Score |
|---|---|---|---|---|---|---|---|---|
| R5 | Second Group | Dimethyl Formamide (DMF) | 17.4 | 13.7 | 11.3 | 944 | 0.000802 | 0 |
| R6 | First Group | Ethanol | 15.8 | 8.8 | 19.4 | 789 | 0.001082 | 0 |
| R8 | Second Group | 2-Propanol | 15.8 | 6.1 | 16.4 | 786 | 0.00255 | 0 |
| R9 | First Group | Dimethyl Sulfoxide (DMSO) | 18.4 | 16.4 | 10.2 | 1101 | 0.001991 | 0 |
| R14 | First Group | Methyl Ethyl Ketone (MEK) | 16.0 | 9.0 | 5.1 | 805 | 0.00078 | 0 |
| R4 | First Group | 1,4-Dioxane | 17.5 | 1.8 | 9.0 | 1030 | 0.001204 | 0 |
| R11 | Second Group | Cyclohexane | 16.8 | 0.0 | 0.2 | 779 | 0.000629 | 0 |
| R13 | First Group | Toluene | 18.0 | 1.4 | 2.0 | 867 | 0.0005525 | 0 |
| R15 | First Group | Ethyl Acetate | 15.8 | 5.3 | 7.2 | 902 | 0.000426 | 0 |

TABLE 21

Aluminum hydroxide C

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa · s] | Score |
|---|---|---|---|---|---|---|---|---|
| R1 | First Group | 1-Butanol | 16.0 | 5.7 | 15.8 | 810 | 0.002571 | 1 |
| R22 | Third Group | Diacetone Alcohol | 15.8 | 8.2 | 10.8 | 938 | 0.003193 | 1 |
| R8 | Second Group | 2-Propanol | 15.8 | 6.1 | 16.4 | 786 | 0.00255 | 1 |
| R3 | Second Group | Acetic Acid | 14.5 | 8.0 | 13.5 | 1050 | 0.001066 | 1 |
| R6 | First Group | Ethanol | 15.8 | 8.8 | 19.4 | 789 | 0.001082 | 1 |
| R5 | Second Group | Dimethyl Formamide (DMF) | 17.4 | 13.7 | 11.3 | 944 | 0.000802 | 1 |
| R7 | Second Group | N-Methyl Formamide | 17.4 | 18.8 | 15.9 | 1011 | 0.00165 | 1 |
| R9 | First Group | Dimethyl Sulfoxide (DMSO) | 18.4 | 16.4 | 10.2 | 1101 | 0.001991 | 0 |
| R14 | First Group | Methyl Ethyl Ketone (MEK) | 16.0 | 9.0 | 5.1 | 805 | 0.00078 | 0 |
| R11 | Second Group | Cyclohexane | 16.8 | 0.0 | 0.2 | 779 | 0.000629 | 0 |
| R12 | First Group | Acetone | 15.5 | 10.4 | 7.0 | 788 | 0.000303 | 0 |
| R13 | First Group | Toluene | 18.0 | 1.4 | 2.0 | 867 | 0.0005525 | 0 |
| R4 | First Group | 1,4-Dioxane | 17.5 | 1.8 | 9.0 | 1030 | 0.001204 | 0 |
| R2 | First Group | Tetrahydrofuran (THF) | 16.8 | 5.7 | 8.0 | 886 | 0.00046 | 0 |
| R15 | First Group | Ethyl Acetate | 15.8 | 5.3 | 7.2 | 902 | 0.000426 | 0 |
| R10 | Second Group | Methyl Isobutyl Ketone (MIBK) | 15.3 | 6.1 | 4.1 | 802 | 0.000546 | 0 |

TABLE 22

Porous silica

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Contact angle [°] | Score |
|---|---|---|---|---|---|---|---|
| R25 | Third Group | o-Dichlorobenzene | 19.2 | 6.3 | 3.3 | 7 | 1 |
| R2 | First Group | Tetrahydrofuran (THF) | 16.8 | 5.7 | 8.0 | 43 | 1 |
| R1 | First Group | 1-Butanol | 16.0 | 5.7 | 15.8 | 44 | 0 |
| R26 | Third Group | 1-Methoxy-2-Propanol | 15.6 | 6.3 | 11.6 | 45 | 0 |
| R6 | First Group | Ethanol | 15.8 | 8.8 | 19.4 | 46 | 0 |
| R27 | Third Group | Bromobenzene | 19.2 | 5.5 | 4.1 | 50 | 0 |
| R15 | First Group | Ethyl Acetate | 15.8 | 5.3 | 7.2 | 52 | 0 |
| R28 | Third Group | Pyridine | 19.0 | 8.8 | 5.9 | 52 | 0 |
| R29 | Third Group | Benzyl Benzoate | 20.0 | 5.1 | 5.2 | 52 | 0 |
| R4 | First Group | 1,4-Dioxane | 17.5 | 1.8 | 9.0 | 52 | 0 |

TABLE 22-continued

Porous silica

| Reagent No. | Category | Solvent reagent | HSP value | | | Contact angle [°] | Score |
|---|---|---|---|---|---|---|---|
| | | | $\delta_d$ [MPa$^{1/2}$] | $\delta_p$ [MPa$^{1/2}$] | $\delta_h$ [MPa$^{1/2}$] | | |
| R14 | First Group | Methyl Ethyl Ketone (MEK) | 16.0 | 9.0 | 5.1 | 54 | 0 |
| R12 | First Group | Acetone | 15.5 | 10.4 | 7.0 | 56 | 0 |
| R18 | Third Group | N-Methyl-2-Pyrrolidone (NMP) | 18.0 | 12.3 | 7.2 | 58 | 0 |
| R30 | Third Group | N,N-Diethyl Formamide | 16.4 | 11.4 | 9.2 | 58 | 0 |
| R31 | Third Group | γ-Butyrolactone (GBL) | 18.0 | 16.6 | 7.4 | 60 | 0 |
| R9 | First Group | Dimethyl Sulfoxide (DMSO) | 18.4 | 16.4 | 10.2 | 66 | 0 |
| R13 | First Group | Toluene | 18.0 | 1.4 | 2.0 | 74 | 0 |

As shown in Table 5 to Table 22, the classification of the solvent reagents for the solid particles and the non-aqueous liquids to be measured can be performed by the method described according to the first embodiment. Based on the results thereof, the Hansen spheres and the HSP values can be measured. In addition, the HSP distances Ra of the solid particles to water can be calculated. The Hansen sphere is ordinarily expressed within a three-dimensional space that is referred to as a Hansen space in which the London dispersion force $\delta_d$, the dipole-dipole force $\delta_p$, and the hydrogen bonding force $\delta_h$ are each a coordinate axis. However, in the present experiment example 1, as shown in FIG. 4 to FIG. 18, the Hansen spheres are respectively expressed by three two-dimensional coordinates to clarify overlap of the Hansen spheres. Here, this also similarly applies to FIG. 19 to FIG. 26 of experiment example 2.

(a) in FIG. 4 to FIG. 18 can be said to be diagrams in which the Hansen sphere that is expressed by three-dimensional coordinates of which the London dispersion force $\delta_d$, the dipole-dipole force $\delta_p$, and the hydrogen bonding force $\delta_h$ are the axes is projected onto two-dimensional coordinates of which the London dispersion force $\delta_d$ and the dipole-dipole force $\delta_p$ are the axes. That is, (a) in FIG. 4 to FIG. 18 show an outer shape of the Hansen sphere on the two-dimensional coordinates of which the London dispersion force $\delta_d$ and the dipole-dipole force $\delta_p$ are the axes. (b) in FIG. 4 to FIG. 18 can be said to be diagrams in which the Hansen sphere that is expressed by three-dimensional coordinates is projected onto two-dimensional coordinates of which the dipole-dipole force $\delta_p$ and the hydrogen bonding force $\delta_h$ are the axes. That is, (b) in FIG. 4 to FIG. 18 show an outer shape of the Hansen sphere on the two-dimensional coordinates of which the dipole-dipole force $\delta_p$ and the hydrogen bonding force $\delta_h$ are the axes. (c) in FIG. 4 to FIG. 18 can be said to be diagrams in which the Hansen sphere that is expressed by three-dimensional coordinates is projected onto two-dimensional coordinates of which the London dispersion force $\delta_d$ and the hydrogen bonding force $\delta_h$ are the axes. That is, (c) in FIG. 4 to FIG. 18 show an outer shape of the Hansen sphere on the two-dimensional coordinates of which the London dispersion force $\delta_d$ and the hydrogen bonding force $\delta_h$ are the axes. Here, this also similarly applies to FIG. 19 to FIG. 26 in experiment example 2, described hereafter.

Here, the Hansen spheres shown in FIG. 4 to FIG. 26 are those of the following solid particles and non-aqueous liquids. The Hansen sphere S11 is the Hansen sphere of aluminum hydroxide A. The Hansen sphere S12 is the Hansen sphere of aluminum hydroxide D. The Hansen sphere S13 is the Hansen sphere of talc A. The Hansen sphere S14 is the Hansen sphere of talc B. The Hansen sphere S15 is the Hansen sphere of talc C. The Hansen sphere S16 is the Hansen sphere of talc D. The Hansen sphere S17 is the Hansen sphere of porous silica. The Hansen sphere S21 is the Hansen sphere of canola oil. The Hansen sphere S22 is the Hansen sphere of a dispersant A. The Hansen sphere S23 is the Hansen sphere of a dispersant B. The Hansen sphere S24 is the Hansen sphere of a dispersant C.

As shown in examples 1 to 12 and comparative examples 1 to 4 in Table 23 and Table 24, the solid particles and the dispersants that serve as the raw materials for the monolith substrate were selected. "∘" in a selection field indicates that the solid particles or the non-aqueous liquid is selected. A blank field indicates that the solid particles or the non-aqueous liquid is not selected. The selection was performed based on the HSP distance Ra to water and the overlap of the Hansen spheres shown in FIG. 4 to FIG. 18, based on the above-described measurement results. As shown in FIG. 8 to FIG. 18, in examples 1 to 12, the selection of the solid particles was performed such that the Hansen spheres S1 of two solid particles and the Hansen sphere S2 of one type of non-aqueous liquid mutually overlap. As shown in FIG. 4 to FIG. 7, in the solid particles and the non-aqueous liquids used in the comparative examples 1 to 4, a combination in which the Hansen spheres S1 and S2 do not overlap is present. Here, in FIG. 4 to FIG. 18, the Hansen spheres are shown as two-dimensional circles as described above. Therefore, the overlap of Hansen spheres is expressed as overlap of circles. This also similarly applies to FIG. 19 to FIG. 26 in experiment example 2, described hereafter.

The two types of solid particles and the one type of non-aqueous liquid of the combinations shown in Table 23, Table 24, and FIG. 4 to FIG. 18, as well as kaolin, silica, alumina, and water were mixed, and a green body for the first honeycomb structure was prepared. The raw material that has a greatest mixing amount (that is, mass ratio) among the solid particles that are used in the manufacturing of the dispersion body (specifically, the green body for the monolith) of the present example is talc, and the raw material that has a second greatest mixing amount is aluminum hydroxide. In addition, as shown in Table 23 and Table 24, the raw material of which the HSP distance to water is the greatest in the solid particle candidate group is talc A, and the raw material of which the HSP distance is second greatest is talc D. Here, "∘" in a Hansen sphere overlap field in Table 23, Table 24, and Table 25, described hereafter, indicates that both of the Hansen spheres S1 of the two solid particles overlap the Hansen sphere S2 of the non-aqueous liquid. An "x" indicates that one of the Hansen spheres S1 of the two solid particles does not overlap the Hansen sphere S2 of the non-aqueous liquid.

Next, to study dispersibility in the green bodies in examples 1 and 2 and comparative examples 1 and 2, variations in green body density were measured. Specifically, the green body after kneading and before molding was removed, and measurement samples were obtained by the green body being scooped out from eight random positions. The measurement sample was placed in a measurement tool that has a diameter of 25 mm and a length of 20 mm, and compressed under conditions of a pressing speed of 1 mm/min and pressure of 1 kN. Subsequently, height and weight of the measurement sample removed from the measurement tool were measured, and the density was calculated from the results. Next, a difference of an actual measurement value of the green body density in relation to a theoretical green body density that can be calculated based on a composition of the raw materials in advance was calculated. When the measurement value is less than the theoretical green body density and a width of variance is large, this means that wettability of the measurement sample is poor. In this case, air is present on a particle surface and, for example, cracks and the like may occur as a result of firing. Meanwhile, if the theoretical green body density and the measurement value are similar values, it can be said that dispersibility is good. Results thereof are shown in Table 23.

TABLE 23

| Measurement target No. | Material name | Manufacturer, place of production or product name, product number | HSP distance Ra to water | Compar. example 1 Selection | Compar. example 2 Selection | Compar. example 3 Selection | Compar. example 4 Selection | Example 1 Selection |
|---|---|---|---|---|---|---|---|---|
| S1 | Aluminum hydroxide A | Manufacturer A | 32.5 | ○ | | | | ○ |
| S2 | Aluminum hydroxide D | Manufacturer B | 29.3 | | ○ | ○ | ○ | |
| S3 | Alumina | Manufacturer C | 30.1 | | | | | |
| S4 | Silica | Manufacturer D | 26.8 | | | | | |
| S5 | Kaolin | Manufacturer E | 26.5 | | | | | |
| S6 | Talc A | Manufacturer F | 37.1 | | | | | ○ |
| S7 | Talc B | Manufacturer G Place of production A | 28.2 | ○ | | ○ | | |
| S8 | Talc C | Manufacturer G Place of production B | 36.8 | | ○ | | ○ | |
| S9 | Talc D | Manufacturer G Place of production C | 30.3 | | | | | |
| L1 | Canola oil | — | | ○ | | ○ | ○ | ○ |
| L2 | Dispersant A | Unilube* 50MB-26 | | | | | | |
| L3 | Dispersant B | Unilube* 750E-25 | | | | | | |
| L4 | Dispersant C | Unilube* 25TG-55 | | | | | | |
| Result of overlap of Hansen spheres | | | | x | x | x | x | ○ |
| Variations in density relative to theoretical density of dispersion body (green body) | | | | about 10% | about 10% | about 10% | about 10% | 5% or less |

| Measurement target No. | Material name | Manufacturer, place of production or product name, product number | HSP distance Ra to water | Example 2 Selection | Example 3 Selection | Example 4 Selection | Example 5 Selection |
|---|---|---|---|---|---|---|---|
| S1 | Aluminum hydroxide A | Manufacturer A | 32.5 | ○ | ○ | ○ | ○ |
| S2 | Aluminum hydroxide D | Manufacturer B | 29.3 | | | | |
| S3 | Alumina | Manufacturer C | 30.1 | | | | |
| S4 | Silica | Manufacturer D | 26.8 | | | | |
| S5 | Kaolin | Manufacturer E | 26.5 | | | | |
| S6 | Talc A | Manufacturer F | 37.1 | | ○ | ○ | ○ |
| S7 | Talc B | Manufacturer G Place of production A | 28.2 | | | | |
| S8 | Talc C | Manufacturer G Place of production B | 36.8 | | | | |
| S9 | Talc D | Manufacturer G Place of production C | 30.3 | ○ | | | |
| L1 | Canola oil | — | | ○ | | | |

TABLE 23-continued

| | | | | | | | |
|---|---|---|---|---|---|---|---|
| L2 | Dispersant A | Unilube* 50MB-26 | | ○ | | | |
| L3 | Dispersant B | Unilube* 750E-25 | | | ○ | | |
| L4 | Dispersant C | Unilube* 25TG-55 | | | | ○ | |
| Result of overlap of Hansen spheres | | | ○ | ○ | ○ | ○ | |
| Variations in density relative to theoretical density of dispersion body (green body) | | | 5% or less | 5% or less | 5% or less | 5% or less | |

*Unilube is a registered trademark.

TABLE 24

| Measurement target No. | Material name | Manufacturer, place of production or product name, product number | HSP distance Ra to water | Example 6 Selection | Example 7 Selection | Example 8 Selection | Example 9 Selection | Example 10 Selection | Example 11 Selection |
|---|---|---|---|---|---|---|---|---|---|
| S1 | Aluminum hydroxide A | Manufacturer A | 32.5 | ○ | ○ | ○ | ○ | ○ | ○ |
| S2 | Aluminum hydroxide D | Manufacturer B | 29.3 | | | | | | |
| S3 | Alumina | Manufacturer C | 30.1 | | | | | | |
| S4 | Silica | Manufacturer D | 26.8 | | | | | | |
| S5 | Kaolin | Manufacturer E | 26.5 | | | | | | |
| S6 | Talc A | Manufacturer F | 37.1 | | | | | | |
| S7 | Talc B | Manufacturer G Place of production A | 28.2 | ○ | ○ | ○ | | | |
| S8 | Talc C | Manufacturer G Place of production B | 36.8 | | | | ○ | ○ | ○ |
| S9 | Talc D | Manufacturer G Place of production C | 30.3 | | | | | | |
| L1 | Canola oil | — | — | | | | ○ | | |
| L2 | Dispersant A | Unilube* 50MB-26 | — | ○ | | | | ○ | |
| L3 | Dispersant B | Unilube* 750E-25 | — | | ○ | | | | |
| L4 | Dispersant C | Unilube* 25TG-55 | — | | | ○ | | | ○ |
| Result of overlap of Hansen spheres | | | | ○ | ○ | ○ | ○ | ○ | ○ |
| Variations in density relative to theoretical density of dispersion body (green body) | | | | | | | | | |

*Unilube is a registered trademark.

As is clear from Table 23 and Table 24, in the comparative examples, an average value of the results of the green body density that have actually been measured is about 15% lower than the theoretical green body density in each case. In addition, although not shown in the tables, variations based on the extraction location of the green body were significant, and a location in which the actual measurement value of the green body density was 17% lower compared to the theoretical value was present. In contrast, in the examples, the variance from the theoretical value was equal to or less than 5% in terms of average value, specifically low-valued locations were not present, and variations were small.

Furthermore, honeycomb structures were manufactured by molding, drying, and firing being performed in a manner similar to that according to the third embodiment using the green bodies of the examples and comparative examples. As a result of a premise that changes are not made to temperature increase-speed conditions, in the examples, a rate of defects during firing was less than half in each case, in relation to the comparative examples.

Experiment Example 2

A present example is an example in which solid particles and a non-aqueous liquid that are used to manufacture a honeycomb structure that is composed of cordierite are selected. Specifically, the solid particles and the non-aqueous liquid that are used to manufacture the second honeycomb structure for the exhaust gas purification filter are selected. The second honeycomb structure has a structure that is similar to that of the first honeycomb structure. The exhaust gas purification filter is formed by a sealing portion that alternately seals the cells of the second honeycomb structure on both ends in the axial direction thereof being formed.

In the manufacturing of the second honeycomb structure for the exhaust gas purification filter, porous silica, aluminum hydroxide, and talc are used such that a desired cordierite composition is obtained. Then, a dispersion body is manufactured by these raw materials, water, and a liquid dispersant being mixed. The dispersion body was then molded, dried, and fired and the honeycomb structure was thereby manufactured.

The raw materials for the exhaust gas purification filter were selected based on the HSP values, the HSP distances Ra to water, and the Hansen spheres of the measurement targets that were measured in experiment example 1. The results are shown in Table 24 and FIG. 19 to FIG. 26. The solid particles and the non-aqueous liquids were selected in combinations shown in Table 25 and FIG. 19 to FIG. 16. These solid particles and non-aqueous liquids, as well as aluminum hydroxide and water were mixed, and a green body for the second honeycomb structure was prepared. The raw material that has the greatest mixing amount (that is, mass ratio) among the solid particles that are used in the manufacturing of the dispersion body (specifically, the green body for the exhaust gas purification filter) of the present example is aluminum hydroxide, and the raw material that has the second greatest mixing amount is talc. In addition, the solid particles of which the HSP distance to water is the greatest in the solid particle candidate group is porous silica, and the solid particles of which the HSP distance is the second greatest is talc A.

ogy is widely applied to products that include a sintered body such as ceramics.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

TABLE 25

| Measurement target No. | Material name | Manufacturer, place of production or product name, product number | HSP distance Ra to water | Compar. example 5 Selection | Compar. example 6 Selection | Compar. example 7 Selection | Compar. example 8 Selection | Example 12 Selection | Example 13 Selection | Example 14 Selection | Example 15 Selection |
|---|---|---|---|---|---|---|---|---|---|---|---|
| S10 | Aluminum hydroxide B | Manufacturer A | 28.1 | | | | | | | | |
| S11 | Aluminum hydroxide C | Manufacturer B | 26.9 | | | | | | | | |
| S12 | Talc A | Manufacturer F | 37.1 | | | | | ○ | ○ | ○ | ○ |
| S13 | Talc B | Manufacturer G Place of production A | 28.2 | ○ | ○ | ○ | ○ | | | | |
| S14 | Porous silica | Manufacturer H | 39.0 | ○ | ○ | ○ | ○ | ○ | ○ | ○ | ○ |
| L1 | Canola oil | — | — | ○ | | | | ○ | | | |
| L2 | Dispersant A | Unilube* 50MB-26 | — | | ○ | | | | ○ | | |
| L3 | Dispersant B | Unilube* 750E-25 | — | | | ○ | | | | ○ | |
| L4 | Dispersant C | Unilube* 25TG-55 | — | | | | ○ | | | | ○ |
| | Result of overlap of Hansen spheres | | | x | x | x | x | ○ | ○ | ○ | ○ |

*Unilube is a registered trademark.

As is clear from Table 25, the HSP distance Ra of porous silica to water is 39.0. This value is the greatest among the solid particles that are used. Furthermore, as shown in Table 25 and FIG. 23 to FIG. 26, in example 12 to example 15, the Hansen spheres S1 of the two types of solid particles both overlap the Hansen sphere S2 of the non-aqueous liquid. Therefore, the green bodies of the examples can be said to have favorable dispersibility based on the results of experiment example 2. Meanwhile, as shown in Table 25 and FIG. 19 to FIG. 22, in comparative example 5 to comparative example 8, at least one of the Hansen spheres S1 of the two types of solid particles does not overlap the Hansen sphere S2 of the non-aqueous liquid. Therefore, the green bodies in comparative example 5 to comparative example 8 can be said to have poor dispersibility based on the results of experiment example 2.

The present disclosure is not limited to the above-described embodiments and examples and can be applied to various embodiments without departing from the spirit of the invention. According to the embodiments and in the examples, as the dispersion body, the green body that is used in the manufacturing of the honeycomb structure is mainly described. However, the present disclosure can also be applied to other technical fields in which solid particles such as ceramic raw materials, water, and a non-aqueous liquid are mixed. Specifically, gas sensors, solid-state batteries, and spark plugs can be used as examples. The present technol-

What is claimed is:

1. A manufacturing method for manufacturing a dispersion body by mixing a plurality of types of solid particles, water, and a liquid other than water, the manufacturing method comprising:
    selecting the solid particles and the liquid such that Hansen spheres of at least two types of the solid particles and a Hansen sphere of at least one type of the liquid mutually overlap, and a Hansen solubility parameter distance to water of at least one type of the solid particles of which the Hansen spheres overlap that of the liquid is greatest among all solid particles used in manufacturing of the dispersion body; and
    using the solid particles and the liquid to manufacture the dispersion body.

2. The manufacturing method for a dispersion body according to claim 1, further comprising:
    selecting the solid particles such that a mixing ratio of one type of the solid particles of which the Hansen spheres overlap that of the liquid is greatest in mass ratio among all solid particles that are used in the manufacturing of the dispersion body; and
    using the solid particles to manufacture the dispersion body.

3. The manufacturing method for a dispersion body according to claim 1, further comprising:
    selecting the solid particles of which the Hansen solubility parameter distance is the greatest is first solid particles, and the first solid particles as the solid particles of which the Hansen solubility parameter distance is the greatest in a solid particle candidate group that can be used in the manufacturing of the dispersion body; and using the solid particles to manufacture the dispersion body.

4. The manufacturing method for a dispersion body according to claim 2, further comprising:

selecting the solid particles of which the Hansen solubility parameter distance is the greatest is first solid particles, and the first solid particles as the solid particles of which the Hansen solubility parameter distance is the greatest in a solid particle candidate group that can be used in the manufacturing of the dispersion body; and using the solid particles to manufacture the dispersion body.

5. The manufacturing method for a dispersion body according to claim 3, further comprising:

selecting second solid particles that are solid particles other than the first solid particles among the solid particles of which the Hansen spheres overlap that of the liquid as the solid particles of which the Hansen solubility parameter distance is second greatest in the solid particle candidate group; and using the second solid particles to manufacture the dispersion body.

6. The manufacturing method for a dispersion body according to claim 4, further comprising:

selecting second solid particles that are solid particles other than the first solid particles among the solid particles of which the Hansen spheres overlap that of the liquid as the solid particles of which the Hansen solubility parameter distance is second greatest in the solid particle candidate group; and using the second solid particles to manufacture the dispersion body.

7. The manufacturing method for a dispersion body according to claim 3, further comprising:

selecting second solid particles that are solid particles other than the first solid particles among the solid particles of which the Hansen spheres overlap that of the liquid as the solid particles of which the mixing ratio is greatest or second greatest in mass ratio among all solid particles that are used in the manufacturing of the dispersion body; and using the second solid particles to manufacture the dispersion body.

8. The manufacturing method for a dispersion body according to claim 4, further comprising:

selecting second solid particles that are solid particles other than the first solid particles among the solid particles of which the Hansen spheres overlap that of the liquid as the solid particles of which the mixing ratio is greatest or second greatest in mass ratio among all solid particles that are used in the manufacturing of the dispersion body; and using the second solid particles to manufacture the dispersion body.

9. A manufacturing method for manufacturing a dispersion body by mixing a plurality of types of solid particles, water, and a liquid other than water, the manufacturing method comprising:

selecting at least two types of solid particles from a solid particle candidate group of which a Hansen solubility parameter distance to water is equal to or greater than 28 $MPa^{1/2}$;

selecting the solid particles and the liquid such that Hansen spheres of the solid particles and a Hansen sphere of at least one type of the liquid from a liquid candidate group mutually overlap; and using the solid particles and the liquid to manufacture the dispersion body.

10. The manufacturing method for a dispersion body according to claim 9, further comprising:

selecting the solid particles such that a mixing ratio of at least one type of the solid particles that are selected from the solid particle candidate group is greatest in mass ratio among all solid particles that are used in the manufacturing of the dispersion body; and using the solid particles to manufacture the dispersion body.

11. A manufacturing method for a ceramic sintered body, comprising:

using a ceramic raw material as the solid particles are; and molding and firing a dispersion body that is obtained by a manufacturing method for manufacturing a dispersion body by mixing a plurality of types of solid particles, water, and a liquid other than water, the manufacturing method comprising:

selecting the solid particles and the liquid such that Hansen spheres of at least two types of the solid particles and a Hansen sphere of at least one type of the liquid mutually overlap, and a Hansen solubility parameter distance to water of at least one type of the solid particles of which the Hansen spheres overlap that of the liquid is greatest among all solid particles used in manufacturing of the dispersion body; and using the solid particles and the liquid to manufacture the dispersion body.

12. A manufacturing method for a ceramic sintered body, comprising:

using a ceramic raw material as the solid particles are; and molding and firing a dispersion body that is obtained by a manufacturing method for manufacturing a dispersion body by mixing a plurality of types of solid particles, water, and a liquid other than water, the manufacturing method comprising:

selecting at least two types of solid particles from a solid particle candidate group of which a Hansen solubility parameter distance to water is equal to or greater than 28 $MPa^{1/2}$;

selecting the solid particles and the liquid such that Hansen spheres of the solid particles and a Hansen sphere of at least one type of the liquid from a liquid candidate group mutually overlap; and using the solid particles and the liquid to manufacture the dispersion body.

13. The manufacturing method for a ceramic sintered body according to claim 11, wherein:

the ceramic sintered body has a honeycomb structure.

14. The manufacturing method for a ceramic sintered body according to claim 12, wherein:

the ceramic sintered body has a honeycomb structure.

* * * * *